(12) United States Patent
Bartlett et al.

(10) Patent No.: US 12,149,134 B2
(45) Date of Patent: Nov. 19, 2024

(54) AXIAL FLUX SWITCHED RELUCTANCE MOTOR AND GENERATOR, AND RELATED SYSTEMS AND METHODS

(71) Applicant: Anthropocene Institute LLC, Palo Alto, CA (US)

(72) Inventors: Scott Bartlett, Palo Alto, CA (US); Martin Pena, Palo Alto, CA (US); Carl Page, Palo Alto, CA (US)

(73) Assignee: Anthropocene Institute LLC, Palo Alto, CA (US)

( * ) Notice: Subject to any disclaimer, the term of this patent is extended or adjusted under 35 U.S.C. 154(b) by 0 days.

(21) Appl. No.: 18/395,060

(22) Filed: Dec. 22, 2023

(65) Prior Publication Data
US 2024/0146164 A1 May 2, 2024

Related U.S. Application Data

(63) Continuation-in-part of application No. 18/214,771, filed on Jun. 27, 2023.
(Continued)

(51) Int. Cl.
*H02K 19/10* (2006.01)
*H02K 1/14* (2006.01)
(Continued)

(52) U.S. Cl.
CPC ............ *H02K 19/103* (2013.01); *H02K 1/14* (2013.01); *H02K 11/21* (2016.01); *H02K 11/33* (2016.01);
(Continued)

(58) Field of Classification Search
CPC ...... H02K 19/103; H02K 11/21; H02K 11/33; H02K 1/14; H02K 16/04
(Continued)

(56) References Cited

U.S. PATENT DOCUMENTS

| 698,640 A | 4/1902 | Duncan |
| 1,669,546 A | 5/1928 | Aalborg |

(Continued)

FOREIGN PATENT DOCUMENTS

| AU | 2010295220 B2 | 7/2012 |
| AU | 2015309162 B2 | 10/2018 |

(Continued)

OTHER PUBLICATIONS

PCTUS2023026319 International Search Report and Written Opinion dated Sep. 27, 2023, 16 pgs.
(Continued)

*Primary Examiner* — Jose A Gonzalez Quinones
(74) *Attorney, Agent, or Firm* — Bracewell LLP; Brad Y. Chin

(57) ABSTRACT

An axial flux switched reluctance motor and/or generator, and controls are provided. It includes a stator, which includes a front surface and a rear surface, and sidewalls that extend from the front surface to the rear surface. The stator includes salient stator poles positioned on the front surface. Each one of the salient stator poles including: a bobbin protruding out from the front surface in a direction along an axis of the bobbin that is perpendicular to the front surface; the bobbin comprising a bobbin front surface that is substantially parallel to the front surface of the stator; and a coil of electrically insulated wire wound around the bobbin. A rotor includes a front rotor surface and an opposite facing rear rotor surface; and further includes a plurality of rotor poles. The rotor is affixed to a shaft and rotates about an axis of rotation that is aligned with the shaft.

25 Claims, 39 Drawing Sheets

Related U.S. Application Data

(60) Provisional application No. 63/355,864, filed on Jun. 27, 2022.

(51) Int. Cl.
  *H02K 11/21* (2016.01)
  *H02K 11/33* (2016.01)
  *H02K 16/04* (2006.01)
  *H02K 19/36* (2006.01)

(52) U.S. Cl.
  CPC ............. *H02K 16/04* (2013.01); *H02K 19/36* (2013.01); *H02K 2203/12* (2013.01)

(58) Field of Classification Search
  USPC .... 310/49.08, 49.09, 49.22, 49.42, 266–268, 310/179
  See application file for complete search history.

(56) References Cited

U.S. PATENT DOCUMENTS

| | | |
|---|---|---|
| 2,215,792 A | 9/1940 | Jennings |
| 2,323,905 A | 7/1943 | Goldmark |
| 2,784,352 A | 3/1957 | Duffing |
| 2,924,633 A | 2/1960 | Sichling et al. |
| 3,435,267 A | 3/1969 | Beyersdorf et al. |
| 3,603,869 A | 9/1971 | Neuffer et al. |
| 4,283,634 A | 8/1981 | Yannone et al. |
| 4,380,146 A | 4/1983 | Yannone et al. |
| 4,550,280 A | 10/1985 | Freise |
| 4,584,513 A | 4/1986 | Freise et al. |
| 4,652,776 A | 3/1987 | George |
| 4,687,946 A | 8/1987 | Jones |
| 4,704,571 A | 11/1987 | Rosenberg |
| 4,902,970 A | 2/1990 | Suquet |
| 5,075,610 A | 12/1991 | Harris |
| 5,214,336 A | 5/1993 | Schmidt et al. |
| 5,905,642 A | 5/1999 | Hammond |
| 5,925,965 A | 7/1999 | Li et al. |
| 5,939,863 A | 8/1999 | Miller |
| 6,064,172 A | 5/2000 | Kuznetsov |
| 6,133,664 A | 10/2000 | Torok et al. |
| 6,166,472 A | 12/2000 | Pinkerton et al. |
| 6,720,684 B2 | 4/2004 | Czimmek |
| 6,750,588 B1 | 6/2004 | Gabrys |
| 6,768,220 B2 | 7/2004 | Johanning |
| 6,794,776 B1 | 9/2004 | Gabrys |
| 6,924,574 B2 | 8/2005 | Qu et al. |
| 7,026,772 B2 | 4/2006 | Quirion |
| 7,109,671 B2 | 9/2006 | Bedini |
| 7,230,360 B2 | 6/2007 | Desai et al. |
| 7,834,575 B2 | 11/2010 | Hauenstein |
| 7,956,566 B2 | 6/2011 | Hauenstein |
| 8,083,557 B2 | 12/2011 | Sullivan |
| 8,508,164 B2 | 8/2013 | Le Besnerais |
| 8,773,050 B2 | 7/2014 | Klatt |
| 9,467,009 B2 | 10/2016 | Vanderelli et al. |
| 9,530,609 B2 | 12/2016 | Deuringer et al. |
| 9,553,538 B2 | 1/2017 | Krishnamurthy et al. |
| 9,614,473 B1 | 4/2017 | Qian |
| 9,729,016 B1 | 8/2017 | Hunstable |
| 9,755,495 B2 | 9/2017 | Bachmaier et al. |
| 9,806,657 B2 | 10/2017 | Barrass |
| 9,813,006 B2 | 11/2017 | Krishnamurthy et al. |
| 9,960,662 B2 | 5/2018 | Krishnamurthy et al. |
| 10,063,097 B2 | 8/2018 | Frampton et al. |
| 10,069,449 B2 | 9/2018 | Krishnamurthy et al. |
| 10,193,485 B2 | 1/2019 | Barrass |
| 10,254,303 B2 | 4/2019 | Grambichler et al. |
| 10,270,379 B2 | 4/2019 | Creary et al. |
| 10,312,782 B2 | 6/2019 | Fahimi et al. |
| 10,411,532 B2 | 9/2019 | Lee et al. |
| 10,461,617 B2 | 10/2019 | Krishnamurthy et al. |
| 10,483,896 B2 | 11/2019 | Krishnamurthy et al. |
| 10,615,730 B2 | 4/2020 | Krishnamurthy et al. |
| 10,658,910 B2 | 5/2020 | Krishnamurthy et al. |
| 10,707,798 B2 | 7/2020 | Krishnamurthy et al. |
| 10,734,934 B2 | 8/2020 | Creary et al. |
| 10,992,247 B2 | 4/2021 | Krishnamurthy et al. |
| 11,085,450 B2 | 8/2021 | Dahouk et al. |
| 11,165,382 B2 | 11/2021 | Creary et al. |
| 11,214,149 B2 | 1/2022 | Koerner |
| 11,228,260 B2 | 1/2022 | Slater et al. |
| 11,264,932 B2 | 3/2022 | Creary et al. |
| 11,271,509 B2 | 3/2022 | Krishnamurthy et al. |
| 11,277,061 B2 | 3/2022 | Krishnamurthy et al. |
| 11,342,872 B2 | 5/2022 | Krishnamurthy et al. |
| 11,532,976 B2 | 12/2022 | Desai et al. |
| 11,601,081 B2 | 3/2023 | Creary et al. |
| 11,682,995 B2 | 6/2023 | Krishnamurthy et al. |
| 2004/0263099 A1 | 12/2004 | Maslov et al. |
| 2005/0052080 A1 | 3/2005 | Maslov et al. |
| 2006/0097596 A1 | 5/2006 | Desai et al. |
| 2007/0040659 A1 | 2/2007 | Williams et al. |
| 2011/0074231 A1 | 3/2011 | Soderberg |
| 2011/0215745 A1 | 9/2011 | Besnerais |
| 2011/0248582 A1 | 10/2011 | Desai et al. |
| 2013/0077757 A1 | 3/2013 | Deuringer et al. |
| 2013/0277974 A1 | 10/2013 | Klatt |
| 2014/0246900 A1 | 9/2014 | Klatt |
| 2014/0314597 A1 | 10/2014 | Allaire et al. |
| 2015/0061439 A1 | 3/2015 | Bachmaier et al. |
| 2016/0226418 A1 | 8/2016 | Krishnamurthy et al. |
| 2016/0285402 A1 | 9/2016 | Barrass |
| 2016/0365780 A1 | 12/2016 | Krishnamurthy et al. |
| 2017/0126087 A1 | 5/2017 | Soderberg |
| 2017/0133967 A1 | 5/2017 | Krishnamurthy et al. |
| 2017/0207692 A1 | 7/2017 | Bachmaier et al. |
| 2018/0069500 A1 | 3/2018 | Krishnamurthy et al. |
| 2018/0183373 A1 | 6/2018 | Barrass |
| 2018/0191230 A1 | 7/2018 | Krishnamurthy et al. |
| 2018/0301967 A1 | 10/2018 | Krishnamurthy et al. |
| 2018/0337582 A1 | 11/2018 | Perry |
| 2018/0367078 A1 | 12/2018 | Creary et al. |
| 2019/0036472 A1 | 1/2019 | Krishnamurthy et al. |
| 2019/0149002 A1 | 5/2019 | Kim et al. |
| 2019/0149075 A1* | 5/2019 | Van Den Bossche ....................... H02P 25/092 318/701 |
| 2019/0253013 A1 | 8/2019 | Creary et al. |
| 2019/0305697 A1 | 10/2019 | Slater |
| 2019/0337390 A1 | 11/2019 | Koerner |
| 2020/0076344 A1 | 3/2020 | Krishnamurthy et al. |
| 2020/0144950 A1 | 5/2020 | Krishnamurthy et al. |
| 2020/0177042 A1 | 6/2020 | Desai et al. |
| 2020/0212834 A1 | 7/2020 | Mazda et al. |
| 2020/0220440 A1 | 7/2020 | Krishnamurthy et al. |
| 2020/0235690 A1 | 7/2020 | Krishnamurthy et al. |
| 2020/0274431 A1 | 8/2020 | Abbott et al. |
| 2020/0350800 A1 | 11/2020 | Hurry et al. |
| 2020/0366178 A1 | 11/2020 | Desai et al. |
| 2020/0366229 A1 | 11/2020 | Creary et al. |
| 2020/0366231 A1 | 11/2020 | Krishnamurthy et al. |
| 2020/0389114 A1 | 12/2020 | Creary et al. |
| 2021/0057973 A1 | 2/2021 | Hunstable |
| 2021/0066983 A1 | 3/2021 | McSheery |
| 2021/0159829 A1 | 5/2021 | Jian |
| 2021/0242814 A1 | 8/2021 | Krishnamurthy et al. |
| 2021/0260358 A1 | 8/2021 | Korakianitis et al. |
| 2021/0358686 A1 | 11/2021 | Raminosoa et al. |
| 2022/0006340 A1 | 1/2022 | Hunstable |
| 2022/0040470 A1 | 2/2022 | Alexander et al. |
| 2022/0045559 A1 | 2/2022 | Hunstable et al. |
| 2022/0060132 A1 | 2/2022 | Creary et al. |
| 2022/0103046 A1 | 3/2022 | Jahshan |
| 2022/0123635 A1 | 4/2022 | Popov et al. |
| 2022/0127943 A1 | 4/2022 | El Tawy et al. |
| 2022/0149756 A1 | 5/2022 | Slater et al. |
| 2022/0162933 A1 | 5/2022 | El Tawy et al. |
| 2022/0190765 A1 | 6/2022 | Creary et al. |
| 2022/0190766 A1 | 6/2022 | Krishnamurthy et al. |
| 2022/0286074 A1 | 9/2022 | Krishnamurthy et al. |
| 2023/0107792 A1 | 4/2023 | Desai et al. |
| 2023/0163709 A1 | 5/2023 | Bayless et al. |

(56) References Cited

U.S. PATENT DOCUMENTS

| | | |
|---|---|---|
| 2023/0188081 A1 | 6/2023 | Geyer |
| 2023/0208336 A1 | 6/2023 | Creary et al. |
| 2023/0253904 A1 | 8/2023 | Chiba et al. |

FOREIGN PATENT DOCUMENTS

| | | | | |
|---|---|---|---|---|
| AU | 2019253808 A1 | | 11/2019 | |
| AU | 2017277293 B2 | | 10/2021 | |
| CA | 2948313 A1 | | 11/2015 | |
| CN | 101262159 A | | 9/2008 | |
| CN | 100497091 C | | 6/2009 | |
| CN | 101860302 A | * | 10/2010 | |
| CN | 101523694 B | | 12/2011 | |
| CN | 102931901 A | * | 2/2013 | |
| CN | 104737418 A | | 6/2015 | |
| CN | 105305683 A | | 2/2016 | |
| CN | 103339004 B | | 6/2016 | |
| CN | 105682358 A | | 6/2016 | |
| CN | 104245558 B | | 8/2016 | |
| CN | 107121564 A | | 9/2017 | |
| CN | 107402312 A | | 11/2017 | |
| CN | 104897942 B | | 3/2018 | |
| CN | 108475937 A | | 8/2018 | |
| CN | 109149810 A | * | 1/2019 | |
| CN | 109217853 A | | 1/2019 | |
| CN | 109471050 A | | 3/2019 | |
| CN | 106483476 B | | 6/2019 | |
| CN | 106443521 B | | 9/2019 | |
| CN | 110247607 A | | 9/2019 | |
| CN | 110501697 A | | 11/2019 | |
| CN | 111835352 A | | 10/2020 | |
| CN | 113422552 A | | 9/2021 | |
| CN | 113691092 A | | 11/2021 | |
| DE | 102007042394 A1 | | 4/2009 | |
| DE | 102007060005 A1 | | 6/2009 | |
| DE | 102014103296 A1 | | 9/2014 | |
| DE | 102013205928 A1 | | 10/2014 | |
| DE | 102016110428 A1 | * | 12/2016 | H02P 6/085 |
| DE | 102016207996 A1 | | 11/2017 | |
| DE | 112017001053 T5 | * | 12/2018 | H02K 1/12 |
| DE | 102018217737 A1 | | 4/2019 | |
| DE | 102019107398 A1 | | 10/2019 | |
| DE | 102019008752 A1 | | 6/2021 | |
| EP | 0815633 A1 | | 1/1998 | |
| EP | 0826105 B1 | | 3/2000 | |
| EP | 1026809 A2 | * | 8/2000 | H02K 1/146 |
| EP | 0811529 B1 | | 12/2010 | |
| EP | 2537702 A1 | | 12/2012 | |
| EP | 3100342 A1 | | 12/2016 | |
| EP | 3229247 A1 | | 10/2017 | |
| EP | 3519008 A1 | | 8/2019 | |
| EP | 2975746 B1 | | 11/2019 | |
| EP | 2838180 B1 | | 1/2020 | |
| EP | 3706306 A1 | | 9/2020 | |
| EP | 3827852 A1 | | 6/2021 | |
| EP | 3829050 A1 | | 6/2021 | |
| EP | 3849073 A1 | | 7/2021 | |
| FR | 2669736 A1 | | 5/1992 | |
| JP | 11196543 A | * | 7/1999 | |
| JP | 2000192830 A | | 7/2000 | |
| JP | 3103354 B2 | | 10/2000 | |
| JP | 2002527035 A | | 8/2002 | |
| JP | 2015104187 A | | 6/2015 | |
| JP | 2016536952 A | | 11/2016 | |
| JP | 2018067909 A | | 4/2018 | |
| JP | 2019122228 A | | 7/2019 | |
| JP | 2021141746 A | * | 9/2021 | |
| KR | 102312084 B1 | | 10/2021 | |
| RU | 2690666 C1 | | 6/2019 | |
| TW | 504893 B | | 10/2002 | |
| TW | I574500 B | | 3/2017 | |
| WO | 9629774 A1 | | 9/1996 | |
| WO | WO-0228356 A1 | * | 4/2002 | A61K 8/11 |
| WO | WO-02065616 A1 | * | 8/2002 | H02K 1/08 |
| WO | 2008140924 A1 | | 11/2008 | |
| WO | 2014142999 A1 | | 9/2014 | |
| WO | WO-2015116006 A1 | * | 8/2015 | H02P 25/092 |
| WO | 2015150411 A1 | | 10/2015 | |
| WO | 2015168793 A2 | | 11/2015 | |
| WO | 2016164818 A1 | | 10/2016 | |
| WO | 2018067410 A1 | | 4/2018 | |
| WO | WO-2018077788 A1 | * | 5/2018 | H02K 1/146 |
| WO | 2018209009 A1 | | 11/2018 | |
| WO | 2020200762 A1 | | 10/2020 | |
| WO | 2021170272 A1 | | 9/2021 | |
| WO | 2022060885 A1 | | 3/2022 | |

OTHER PUBLICATIONS

US Department of Energy Advanced Manufacturing Office, Premium Efficiency Motor Selection and Application Guide, DOE/GO-102014-4107 (2014), 136 pgs.
Wang, et al., Design and Analysis of Wireless Resolver for Wireless Switched Reluctance Motors, IEEE Trans on Indust Electronics, vol. 70, No. 3, pp. 2221-2230, DOI: 10.1109/TIE.2022.3169712 (2022).
PCTUS2023085860 Invitation to Pay Additional Fees and Partial International Search Report dated Apr. 22, 2024, 13 pgs.
PCTUS2023085860 International Search Report and Written Opinion dated Jul. 10, 2024, 21 pgs.

* cited by examiner

AXIAL FLUX SWITCHED RELUCTANCE MOTOR AND GENERATOR, AND RELATED SYSTEMS AND METHODS

CROSS-REFERENCE TO RELATED APPLICATIONS

This application is a United States Continuation-In-Part application of U.S. patent application Ser. No. 18/214,771, filed on Jun. 27, 2023 and titled "Axial Flux Switched Reluctance And Inductance State Machine Systems, Devices, And Methods", which claims priority to and the benefit of U.S. Provisional Patent Application No. 63/355,864, filed on Jun. 27, 2022, and titled "Axial Flux Switched Reluctance Motor Systems and Methods," the entire contents of which are incorporated herein by reference.

TECHNICAL FIELD

The disclosed exemplary embodiments relate to axial flux switched reluctance electric motors or generators, or both.

BACKGROUND

Numerous types of electric motors and generators are currently available for use in many commercial applications including electric vehicles (EVs), blowers, tools, pumps, fans, mixers, food processors, and power generators, among other applications. Motors typically include a stator that is fixed and rotor that rotates in relation to the stator. The rotor is connected to a drive shaft that drives operations associated with particular applications.

In direct current (DC) motors, a DC current is applied to windings of the rotor to generate an electromagnetic (EM) field. While the rotor is rotated, the current applied to the rotor is commutated via mechanical brushes or via electronic control in a brushless configuration. The stator of a DC motor typically includes magnets that provide magnetic fields that interact with the EM field generated by the rotor to affect rotation of the rotor. The stator magnets are typically made of rare Earth metals, such as neodymium and dysprosium that provide a high-density magnetic fields to facilitate relatively high torque for a DC motor.

In alternating current (AC) motors, such as induction motors and reluctance motors, an alternating current (AC) or sinusoidal signal is applied to the stator to generate a rotating EM field that drives rotation of an adjacent rotor. A three-phase induction motor typically has a stator with three pole pairs (i.e., six stator poles), where each pole pair includes series-connected windings that carry one of the three phases of an electrical voltage and current applied to the stator of the induction motor. Each phase of the current is offset by 120 degrees while each corresponding pole pair is physically offset by 120 degrees from each other. This physical and electrical configuration provides a rotating EM field that interacts with the rotor to drive rotation of the rotor assembly. The rotor may have a squirrel-cage configuration that enables current flow along the conduits of the squirrel-cage, resulting in the generation of an EM field that interacts with the EM field generated by the stator to, thereby, facilitate rotation of the rotor. The speed of rotation of the rotor may be controlled using various techniques such as varying the frequency of the current applied to each phase winding or varying the voltage, among other techniques.

A single-phase induction motor can be referred to as a reluctance motor. Rotation of a reluctance motor is based on the principle that rotor and stator poles will move to a position where the lines of an EM field have the lower or lowest reluctance (i.e., lower EM field resistance). A single-phase reluctance motor is not self-starting and therefore uses a secondary phase at startup to create a rotating EM field until a set speed of rotation is reached where a centrifugal switch removes the secondary phase windings from the circuit. A capacitor may be used in the secondary windings to affect a phase shift of the secondary windings to enable a rotating field during initial startup. Another type of reluctance motor is a three-phase switched reluctance motor (SRM). A SRM is self-starting because it includes three phases that are offset by 120 degrees electronically and three pole pairs that provide a physical 120 degrees offset from each other to facilitate rotation of a rotor assembly subject to the EM field generated by the stator assembly. A SRM uses an electronic controller that controls excitation of each of the phase windings to generate a rotating EM field.

Existing DC motors or generators for EVs or other applications typically use rare Earth metals that can adversely affect the environment and are becoming less available due to demand. Induction and reluctance motors can provide an alternative to DC motors to reduce the need for rare Earth metals, but typically have lower performance capabilities compared to DC motors. Accordingly, there is a need to implement motors that eliminate or reduce the use of rare Earth metals, while providing sufficient performance capabilities with respect to DC motors or AC motors using rare Earth metals.

SUMMARY

The following summary is intended to introduce the reader to various aspects of the detailed description, but not to define or delimit any invention.

The application, in various implementations, addresses deficiencies associated with existing electric motor and generator implementations.

This application describes exemplary systems, methods, and devices that implement reluctance motors capable of providing sufficient power and/or torque for a drive shaft to adequately operate within, for example, an EV. The exemplary reluctance motor or generator systems, methods, and devices can provide implementations that do not use rare Earth metals while not sacrificing performance with respect to other motors using rare Earth metals, such as DC motors. Rare earth magnets and/or copper conductors can still be utilized to amplify the performance of the reluctance motors described herein if desired. However, the motors described leverage reluctance to generate torque or electrical power. Furthermore, inventive electromagnets are described that are suitable for integration into electric motors which have flux characteristics comparable to rare Earth magnets. In some implementations, a magnetic circuit that includes the electromagnets utilizes low cost, readily available steel alloys. The aforementioned components may be packaged in such a way to optimize the flux path for each phase, resulting in reduced power consumption and increased torque. In various implementations, the heat generation of the electric motor is significantly improved due to the geometric construction of the electromagnets and control of electrical excitation.

In one aspect, a state machine (i.e., a motor and/or generator) includes a stator assembly arranged to generate a rotating electromagnetic field in response to a control signal. The state machine also includes a rotor assembly, positioned adjacent to the stator assembly, arranged to rotate in response to the rotating electromagnetic field. A first sensor is arranged to detect an angular position of the rotor assembly and output first sensor data based on the angular position of the rotor assembly. A controller is arranged to receive the first sensor data and adjust the control signal based on the angular position of the rotor assembly to adjust a torque associated with the rotor assembly when the state machine functions as a motor or to adjust a power output from the stator assembly when the state machine functions as a generator.

In some implementations, a second sensor is arranged to detect one or more state machine conditions such as, for example, a rotor assembly speed, stator current, stator voltage, and/or state machine temperature. The second sensor may output second sensor data corresponding to the one or more state machine conditions, where the controller is further arranged to receive the second sensor data and adjust the control signal based on the second sensor data.

In some cases, the control signal may include a pulse and/or square waveform. The controller may adjust the speed of rotation of the rotor assembly by adjusting a frequency associated with the control signal. The state machine may include at least one of a three-phase switched reluctance motor (SRM) and a three-phase reluctance generator. In some cases, the SRM is configured for magnetic flux to flow axially, parallel to the axis of rotation of the rotor. The state machine may include one of a single stator reluctance state machine, a single stator dual coil reluctance machine, an in-runner reluctance state machine, an out-runner dual rotor reluctance state machine, an out-runner single rotor reluctance state machine, a zero gradient-flux dual stator state machine, and a zero gradient-flux out-runner state machine.

In some cases, the state machine is configured to operate as a motor-generator. The state machine may include and/or interface with an energy storage element configured to release magnetic stored energy and/or electric stored energy based on the angular position of the rotor assembly. The magnetic stored energy may be stored in at least one transformer. The electric stored energy may be stored in at least one capacitor.

In some cases, the stator assembly may be arranged to generate an electrical signal in response to a rotating magnetic field generated by rotation of the rotor assembly. When the state machine functions as a reluctance generator, the controller is further arranged to: i) receive second sensor data from a second sensor, where the second sensor data includes rotor assembly rotational speed and ii) invert an excitation circuit for each phase of the stator to generate the electrical signal based on the rotor assembly rotational speed and rotor angular position.

In some cases, when the state machine functions as a generator, the controller may be further arranged to i) receive second sensor data from a second sensor, where the second sensor data includes rotor assembly rotational speed and ii) trigger each phase of the stator assembly in advance of the rotor assembly angular position associated with each phase to generate the electrical signal. The electrical signal may be an AC signal. The state machine may include an AC to DC inverter arranged to convert the AC signal to a DC signal. The state machine system may include a power storage and/or power source that includes one or more batteries configured to receive a DC signal and store electrical energy based on the received DC signal.

Another aspect includes a method for operating a state machine having a stator assembly arranged to generate a rotating electromagnetic field in response to a control signal and a rotor assembly, positioned adjacent to the stator assembly, arranged to rotate in response to the rotating electromagnetic field, where the method includes: detecting, via a sensor, an angular position of the rotor assembly; outputting, by the sensor, sensor data based on the angular position of the rotor assembly; and receiving the sensor data and adjusting the control signal based on the angular position of the rotor assembly to adjust a torque of associated with the rotor assembly when the state machine functions as a motor or to adjust a power output from the stator assembly when the state machine functions as a generator.

In a further aspect, an electric vehicle (EV) includes a power storage including at least one battery, where the power storage is arranged to output stored energy as an output DC electrical signal. The EV has a state machine including a stator assembly arranged to generate a rotating electromagnetic field in response to a control signal and a rotor assembly, positioned adjacent to the stator assembly, arranged to rotate in response to the rotating electromagnetic field. A first sensor is arranged to detect an angular position of the rotor assembly and output first sensor data based on the angular position of the rotor assembly. A controller is arranged to receive the first sensor data and adjust the control signal based on the angular position of the rotor assembly to adjust a torque of associated with the rotor assembly when the state machine functions as a motor or to adjust a power output from the stator assembly when the state machine functions as a generator, the power output including an AC electrical signal. The EV also includes a DC to AC inverter arranged to convert the output DC electrical signal from the power storage to the control signal. The EV further includes an AC to DC converter arranged to convert the AC electrical signal to an input DC electrical signal delivered to the power storage.

In a broad example aspect, an axial flux switched reluctance motor is provided comprising:
 a stator comprising a front surface and an opposite facing rear surface, and a plurality of sidewalls that extend from the front surface to the rear surface;
 the stator further comprising a plurality of salient stator poles positioned on the front surface; each one of the plurality of salient stator poles comprising:
  a bobbin protruding out from the front surface in a direction along an axis of the bobbin that is perpendicular to the front surface;
  the bobbin comprising a bobbin front surface that is substantially parallel to the front surface of the stator;
  a coil of electrically insulated wire wound around the bobbin;
 a rotor comprising a front rotor surface and an opposite facing rear rotor surface, and further comprising a plurality of rotor poles;
 the rotor affixed to a shaft and configured to rotate about an axis of rotation that is aligned with the shaft;
 wherein the rear rotor surface of each of the plurality of rotor poles is spaced apart from the bobbin front surface of each of the plurality of salient stator poles, to facilitate the rear rotor surface to rotate over the bobbin front surface and for magnetic flux to flow between the bobbin front surface of each of the plurality of salient stator poles and the rear rotor surface of each of the plurality of rotor poles.

In some cases, the coil defines a plane that is substantially perpendicular to the axis of rotation of the rotor.

In some cases, the axis of the bobbin is parallel to the axis of rotation of the rotor.

In some cases, each of the plurality of salient stator poles comprises a stator protrusion extending radially from a center of the stator, the stator protrusion coplanar with the front surface and the rear surface of the stator, and a given sidewall adjoins each two neighboring stator protrusions.

In some cases, the given sidewall is a continuously concave curve that curves towards the center of the stator between the each two neighboring stator protrusions.

In some cases, the stator comprises six salient stator poles and four rotor poles; the axial flux switched reluctance motor is configured to operate as a three-phase type; and each phase comprises electrically energizing a pair of diametrically positioned salient stator poles.

In some cases, the stator comprises more than six salient stator poles and more than four rotor poles.

In some cases, a magnetic flux path comprises: traveling along the axis of a first bobbin of a first stator pole, which is substantially parallel to the axis of rotation of the rotor; traveling across the bobbin front surface of the first bobbin to the rear surface of a first rotor pole: traveling along the rotor to a second rotor pole that is oppositely positioned from the first rotor pole; traveling across the rear surface of the second rotor pole to the bobbin front surface of a second bobbin and along the axis of the second bobbin, which is substantially parallel to the axis of rotation of the rotor, and wherein the second bobbin is of a second stator pole that is oppositely positioned from the first stator pole: and traveling along the stator towards the first bobbin to complete a loop.

In some cases, the coil around the first bobbin and the coil around the second bobbin are both simultaneously electrically energized; a first current direction is clockwise or counterclockwise and is substantially normal to the axis of rotation; and a second current direction is opposite to the first current direction and substantially normal to the axis of rotation.

In some cases, the bobbin has an obround profile shape with a major dimension and a minor dimension, and the major dimension extends radially from the center of the stator.

In some cases, the bobbin has an elliptical profile shape.

In some cases, the stator and the rotor each do not include a rare earth magnet.

In some cases, the axial flux switched reluctance motor further comprises a second stator with the same configuration as the stator.

In some cases, the rotor is positioned between the stator and the second stator, and a plurality of stator poles on the second stator face are aligned with and face towards the plurality of stator poles on the stator, and the shaft passes through a center of the second stator.

In some cases, the axial flux switched reluctance motor further comprises a second stator and a second rotor, and the shaft passes through a center of the second stator and a center of the second rotor, wherein the second stator has a same configuration as the stator and the second rotor has a same configuration as the rotor.

In some cases, the rotor and the second rotor are arranged in an out-runner configuration.

In some cases, a rear surface of the second stator faces the rear surface of the stator, and a front surface of the second stator faces the second rotor.

In some cases, the axial flux switched reluctance motor further comprises a control circuit configured to control electrically energizing one or more coils in the stator, and, for each phase of the axial flux switched reluctance motor, the control circuit comprising: two semiconductor power switches control current flow into the given phase and two freewheeling diodes to allow back-EMF to return to a power supply or a bypass capacitor, or both.

In some cases, the axial flux switched reluctance motor is configured to operate as a motor-generator to additionally generate electrical power by when the rotor shaft is attached to a prime mover.

In some cases, a control circuit for the axial flux switched reluctance motor is provided, comprising: a pulsed timing and trigger control circuit that comprises a plurality of transformers electrically respectively connected to the plurality of phases of the axial flux switched reluctance motor; and a plurality of electrical switches connected to the plurality of transformers to pulse electrical power to the axial flux switched reluctance motor; and a processor to control the electrical switches.

In some cases of the control circuit, it further includes a plurality of position sensors for respectively monitoring the plurality of phases, and the plurality of position sensors are electrically connected to the processor.

In some cases, control circuit for the axial flux switched reluctance motor is provided, comprising: a pulsed timing and trigger control circuit that comprises a plurality of capacitors respectively electrically connected to the plurality of phases of the axial flux switched reluctance motor; and a plurality of electrical switches connected to the plurality of capacitors to pulse electrical power to the axial flux switched reluctance motor; and a processor to control the electrical switches.

In some cases the control circuit further comprises a plurality of position sensors for respectively monitoring the plurality of phases, and the plurality of position sensors are electrically connected to the processor.

In another broad aspect, an axial flux switched reluctance generator is provided, comprising:
 a stator comprising a front surface and an opposite facing rear surface, and a plurality of sidewalls that extend from the front surface to the rear surface;
 the stator further comprising a plurality of salient stator poles positioned on the front surface, each one of the plurality of salient stator poles comprising:
  a bobbin protruding out from the front surface in a direction along an axis of the bobbin that is perpendicular to the front surface;
  the bobbin comprising a bobbin front surface that is substantially parallel to the front surface of the stator;
  a coil of electrically insulated wire wound around the bobbin;
 a rotor comprising a front rotor surface and an opposite facing rear rotor surface, and further comprising a plurality of rotor poles;
 the rotor affixed to a shaft and configured to rotate about an axis of rotation that is aligned with the shaft;
 wherein the rear rotor surface of each of the plurality of rotor poles is spaced apart from the bobbin front surface of each of the plurality of salient stator poles, to facilitate the rear rotor surface to rotate over the bobbin front surface.

In some cases of the axial flux switched reluctance generator, the coil defines a plane that is substantially perpendicular to the axis of rotation of the rotor.

Any two or more of the features described in this specification, including in this summary section, may be combined to form implementations not specifically described in this specification. Furthermore, while this specification may refer to examples of systems, methods, and devices related to electric motors, such techniques also apply equally to electric generators.

The details of one or more implementations are set forth in the accompanying drawings and the following description. Other features and advantages will be apparent from the description and drawings, and from the claims.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

In an example embodiment, a switched reluctance motor with an axial flux geometric configuration is provided. The difference between a radial flux switched reluctance motor and axial flux switched reluctance motor is the orientation of the salient stator poles. The salient stator poles in a radial flux motor are oriented parallel to the axis of rotation, where in an axial flux motor, the salient stator poles are normal to the axis of rotation. In this embodiment of a hybrid axial-flux switched reluctance motor, as with other axial flux motors, the salient poles are normal to the axis of rotation.

In a conventional radial flux switched reluctance motor, stator poles and associated coils run parallel to the axis of rotation of the motor. The new geometric configuration, of the embodiments described herein, is an axial flux switched reluctance motor (AFSRM). In some cases, the stator poles and associated coils of an AFSRM are oriented to be normal to the axis of rotation. An AFSRM does not utilize rare earth magnets or windings on the rotor. In some cases, the AFRSM described herein does not include rare earth magnets nor permanent magnets on the rotor or the stator.

In some cases, an AFSRM is adapted to industrial applications which require torque generation, including for example, screw compressors, blowers, air conditioning compressors, conveyers, and automotive vehicles. In some cases, an AFSRM is also adapted to applications for electrical power generation. In other words, an AFSRM can be configured in a system to supply electrical power when attached to a prime mover.

In some cases, a control system of an AFSRM operation provides independent control of each phase with respect to rotor angular position. Angular position of the rotor determines the inductance of each phase. As the rotor approaches the centerline of the salient stator pole it acts as a motor. As the rotor passes the centerline of the salient stator pole it acts as a generator. Someone having ordinary skill in the art will be able to operate the AFSRM utilizing a typical control circuit containing semiconductor power electronics.

In some cases, the axial flux switched reluctance motor has a geometric configuration where the stator salient poles and associated coils are normal to the axis of rotation. In some cases, the AFSRM has a 6/4 configuration indicating 6 stationary salient stator poles and 4 movable rotor poles. Other configurations with different ratios of salient stator poles to rotor poles can be applied to the AFSRM. In some cases, there are more stationary salient stator poles compared to the number of movable rotor poles.

Figure 1:
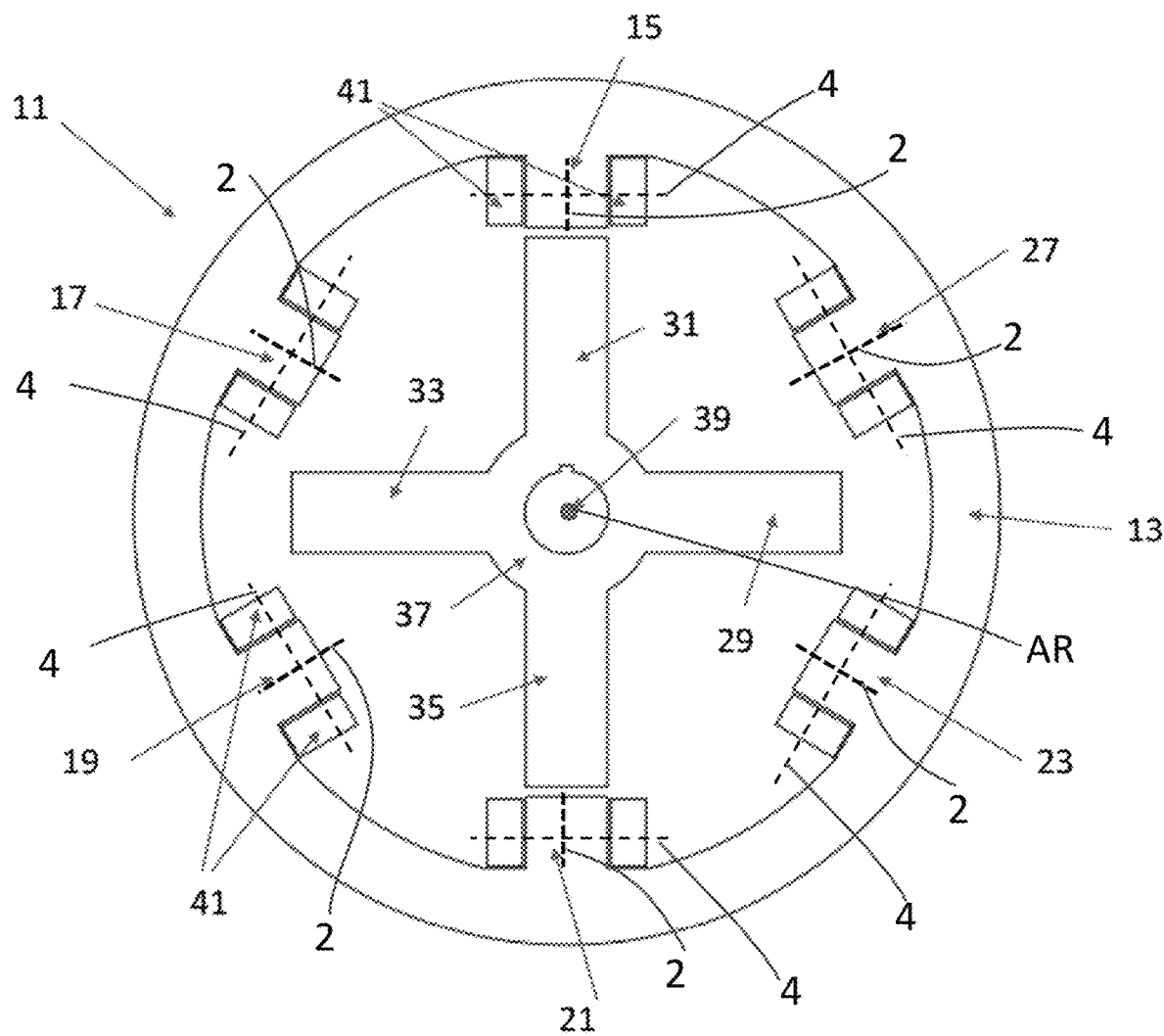
FIG. 1 is a cross-sectional view of a known radial flux three phase salient pole switched reluctance motor.

Turning to FIG. 1, a known construction of a radial flux three phase salient pole switched reluctance motor 11 is shown from a cross-sectional view. The motor 11 includes an outer stator 13 and a rotor 37 that spins about an axis of rotation AR. The axis of rotation AR of the rotor 37 is aligned with a shaft 39, whereby the rotor 37 is connected to the shaft 39, and are mechanically coupled and keyed together. In some cases, the axis of rotation of the rotor AR is illustrated in FIG. 1 as the center point of the shaft 39, and the axis or rotation of the rotor AR extends out of the page.

In some cases, as illustrated in FIG. 1, the outer stator 13 includes a ring structure with six salient poles, 15, 17, 19, 21, 23, 27 protruding inwards towards the axis of rotation AR of the rotor 37, and each salient stator pole has an electrically conductive coil 41 (e.g., an insulated wire) wrapped around itself to generate an electromagnetic force when electricity passes through the coil 41. In some cases, each coil is wound around a pole in diametrically opposed pole pairs. For example, poles 15 and 21 form a pole pair, poles 17 and 23 form a pole pair, and poles 19 and 27 form a pole pair. In some cases, the coils 41 are wound about an axis 2 of each salient pole, whereby an axis 2 of each salient stator pole is oriented normal to the axis of rotation AR of the rotor 37 and each axis 2 points radially inwards to the axis of rotation AR of the rotor 37.

It will be appreciated that the term "normal" is also herein considered to be perpendicular. For example, two lines can be perpendicular to each other; a line and a plane can be perpendicular to each other; and two planes can be perpendicular to each other. The use of "normal" and "perpendicular" in this document includes approximately normal and approximately perpendicular.

It will be appreciated that the coils 41 are illustrated as two portions on opposite sides of a salient stator pole, since a cross-section is taken through each of the stator poles. It will be appreciated that the coil is wound continuously around each protruding stator pole.

In some cases, each coil 41 is considered to define a plane 4 that is illustrated in FIG. 1 and extends out of the page. Each plane 4 corresponding to each coil 41 is parallel to the axis of rotation AR. Furthermore, for each given salient stator pole, each axis 2 of a given stator pole and each corresponding plane 4 are oriented normal to each other.

The pole pairs are connected in series to form a phase creating a three-phase machine, including Phase A formed by pole pair 15 and 21, Phase B formed by pole pair 17 and 23, and Phase C formed by pole pair 19 and 27. The rotor 37 has four rotor poles 29, 31, 33, 35 affixed to a shaft 39. Operation of a SRM motor requires each phase be connected to an electrical source through a semiconductor power stage FIG. 6. In some cases, each phase is energized when the rotor pole is at maximum magnetic reluctance and de energized at minimum magnetic reluctance.

Figure 2:
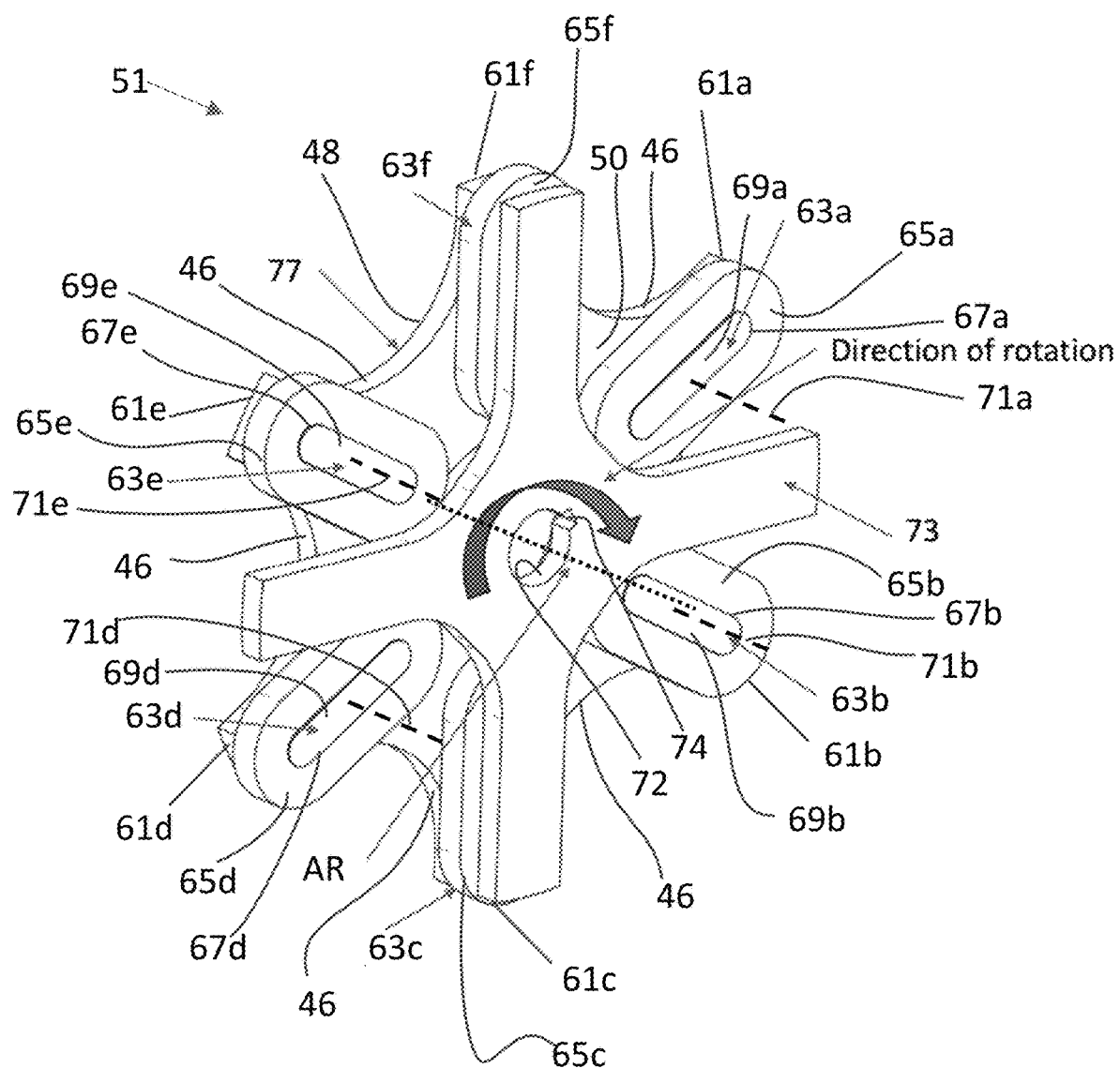
FIG. 2 is a perspective view of an axial flux switched reluctance motor and/or generator (AFSRM) in accordance with at least some embodiments.
Figure 5:
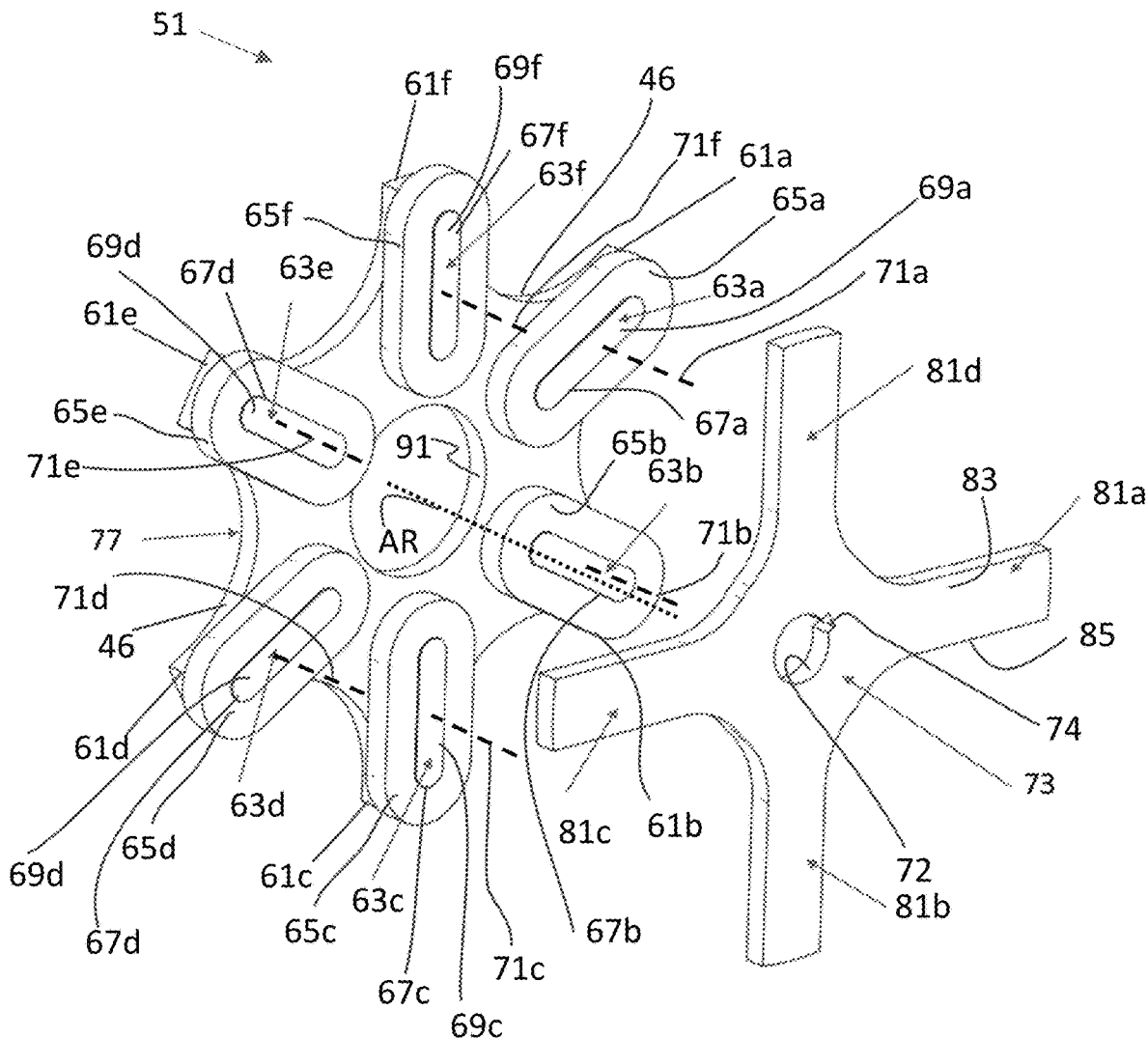
FIG. 5 is an exploded view of the AFSRM shown in FIG. 2.

Turning to FIGS. 2 to 5, various illustrations of an embodiment of an AFSRM 51 are shown. The AFSRM 51 includes a stator 77 and a rotor 73. In FIG. 5, a shaft 75 extends through a void defined by an inner wall 72 of the rotor 73 (seen best in FIG. 2). Also shown in FIGS. 5 and 2 is a keying feature 74 extends from the inner wall 72, which is configured to couple with a complementary keying feature of the shaft. The keying feature of the rotor and the complimentary keying feature of the shaft are used to mechanically transfer the rotation of the rotor to the shaft, or mechanically transfer the rotation of the shaft to the rotor.

The stator 77 includes a front surface 50 and an opposite facing rear surface 48. Side walls 46 extend between the front surface 50 and the rear surface 48. Six protrusions 61a, 61b, 61c, 61d, 61e, 61f extend radially outwards from the center of the stator, and are in plane with the front surface 50 and the back surface 48. Side walls 46 connect between each of the protrusions 61a, 61b, 61c, 61d, 61e, 61f, and each of the protrusions respectively forms a salient stator pole 63a, 63b, 63c, 63d, 63e, 63f. Each of the salient stator poles 63a, 63b, 63c, 63d, 63e, 63f respectively include a corresponding bobbin 67a, 67b, 67c, 67d, 67e, 67f that protrudes in a direction normal to the front surface 50 of the stator 77. In some cases, the direction that each bobbin protrudes from the front surface 50 respectively defines a corresponding axis 71a, 71b, 71c, 71d, 71e, 71f. Each of these axes 71a, 71b, 71c, 71d, 71e, 71f are parallel to the axis of rotation AR of the rotor 73.

The bobbins 67a, 67b, 67c, 67d, 67e, 67f each respectively have a corresponding coil 65a, 65b, 65c, 65d, 65e, 65f of electrically insulated and conductive wire wound therearound the given bobbin.

The bobbins 67a, 67b, 67c, 67d, 67e, 67f each respectively have a corresponding bobbin front surface 69a, 69b, 69c, 69d, 69e, 69f that are each oriented perpendicular to the respective axes 71a, 71b, 71c, 71d, 71e, 71f. In some cases, bobbin front surfaces 69a, 69b, 69c, 69d, 69e, 69f are flat or planar, and are coplanar with each other. As best seen in the side view in FIG. 4, the bobbin front surfaces 69a, 69b, 69c, 69d, 69e, 69f face towards a back surface 85 of the rotor 73. The bobbin front surfaces 69a, 69b, 69c, 69d, 69e, 69f and the back surface 85 of the rotor 73 are spaced such that flux linkage may occur without interference, so that the rotor 73 can spin relative to the stator 77. In some cases, the coil 65 wound around each bobbin 67 does not extend past a plane defined by the front surface 69 of the bobbins, so as not to create any mechanical obstruction when a rotor pole 81 passes over the bobbin front surface 69. In some cases, the coil 65 is wound around a bobbin 67 so that a bottom surface of the coil is bound by the front surface 50 of the stator and a top surface of the coil is coplanar with the front surface 69 of the bobbin 69.

Figure 9A:
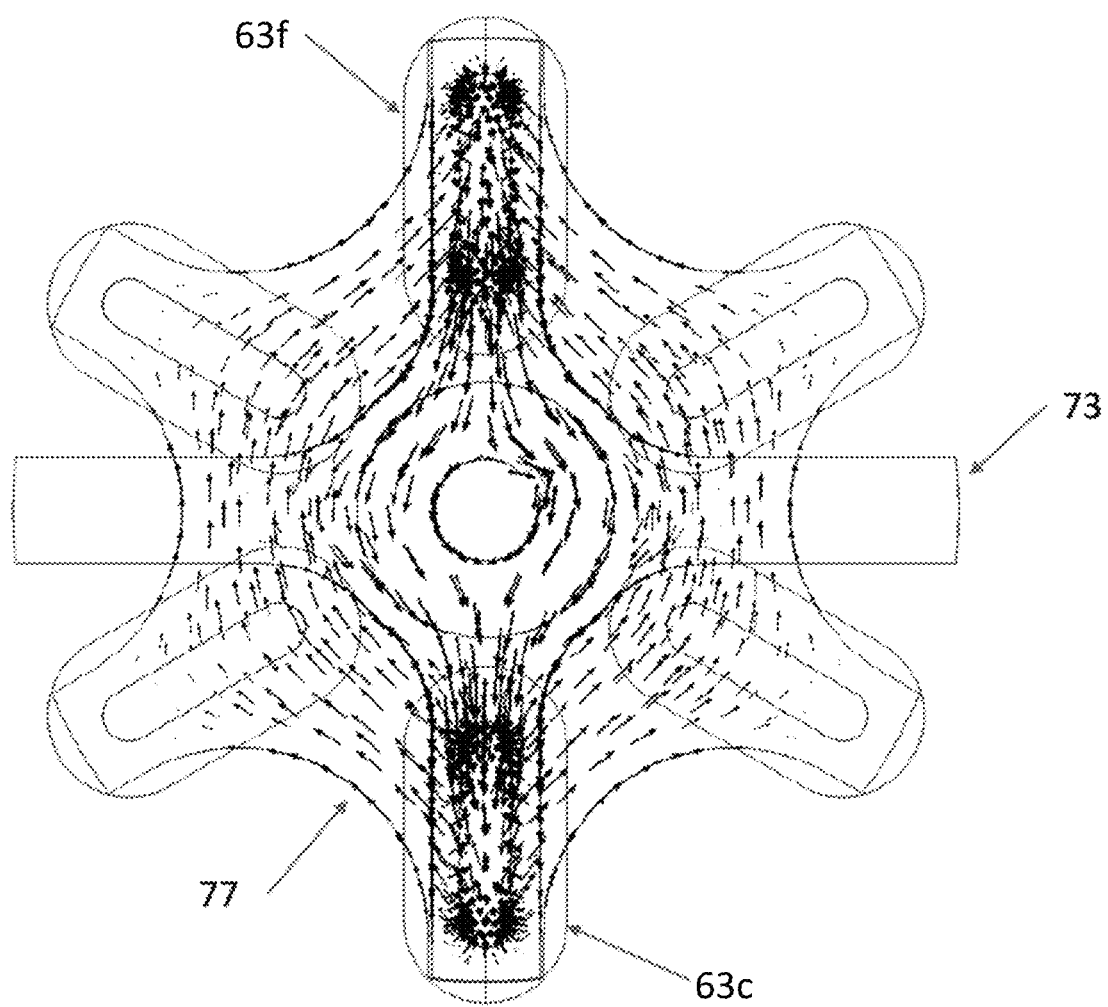
FIG. 9A is a front view showing a magnetic flux path in an AFSRM, in accordance with at least some embodiments.
Figure 9B:
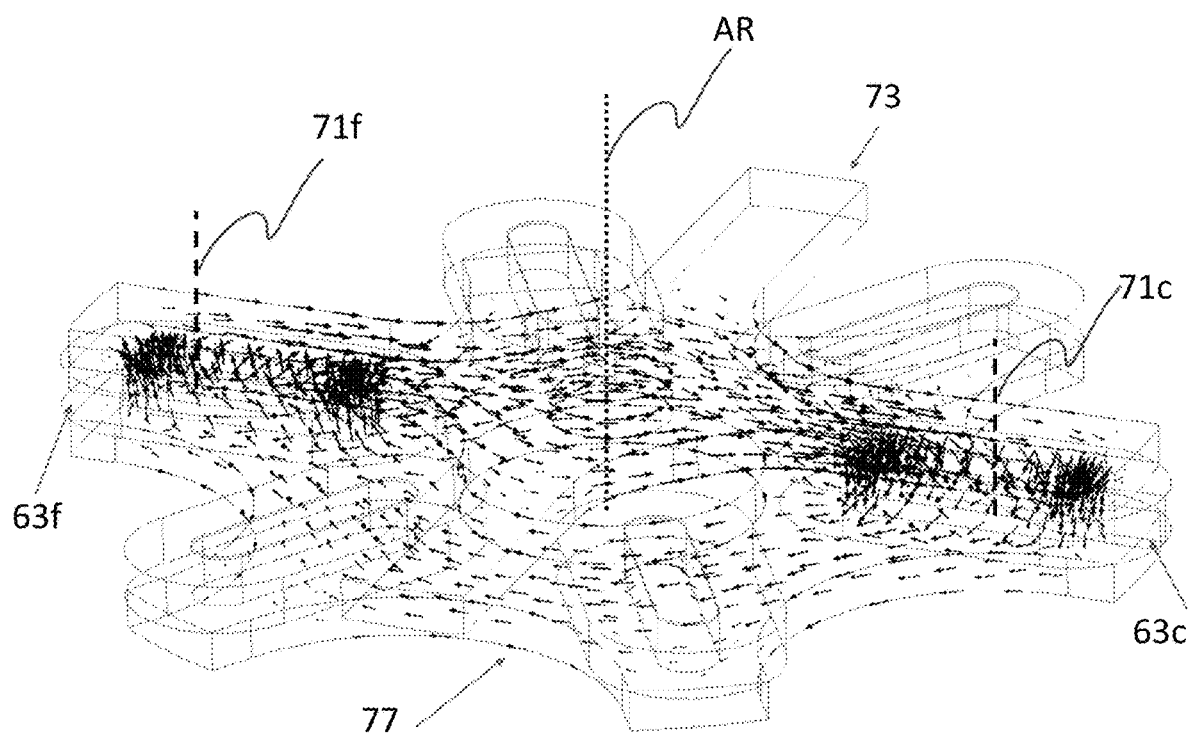
FIG. 9B is a perspective view of the magnetic flux path shown in FIG. 9A.

The term "magnetic flux" herein refers to a magnetic field passing through a given area. In some cases, the magnetic field passes through a physical material, such as metal that facilitates magnetic fields to pass therethrough. In some cases, the metal comprises ferromagnetic metal. Example embodiments of magnetic flux flow are shown in FIGS. 9A and 9B. The following section describes the mechanical design, which, in some cases, improves magnetic flux flow.

As will be described in more detail below, the bobbin front surfaces 69*a*, 69*b*, 69*c*, 69*d*, 69*e*, 69*f* and the back surface 85 of the rotor 73 should be spaced close enough together to allow the magnetic flux to flow between any given one of the rotor poles 81*a*, 81*b*, 81*c*, 81*d*, when a given rotor pole 81 passes over any of the bobbin front surfaces 69*a*, 69*b*, 69*c*, 69*d*, 69*e*, 69*f*. The rotor poles 81*a*, 81*b*, 81*c*, 81*d* may also be referred to as rotor lobes. In particular, when electricity flows through a first coil 65, a magnetic field is generated in a first bobbin 67 around which the first coil 65 is wound and magnetic flux flows axially along the first bobbin's axis 71 and parallel to the axis of rotation AR of the rotor 73, and through a back surface 85 of a first rotor pole 81 passing over the bobbin's front surface 69. The magnetic flux flows across the rotor towards a second rotor pole, whereby the first rotor pole and the second rotor pole are diametrically positioned from each other and form a rotor pole pair. The magnetic flux flows out a back surface 85 of the second rotor pole and into a front surface of a second bobbin 67 along the second bobbin's axis 71 (which is also parallel to the axis of rotation AR of the rotor 73). The second bobbin 67 and the first bobbin are part of a stator pair and are diametrically positioned opposite to each other. Furthermore, the second coil 65 wound around the second bobbin is electrically energized at the same time as the first coil around the first bobbin.

In other words, as shown in FIGS. 2 to 5, a given salient stator pole 63 includes a bobbin 67 with a front surface 69, and a coil 65 is wound around the bobbin 67. The bobbin 67 protrudes from a front surface 50 of the stator, defining an axis of the bobbin 71 that is parallel to the axis of rotation AR of the rotor 77.

In some cases, the coil 67 is wound normal about the axis of the bobbin. In other words, the coil 67 of each salient stator pole 63 is wound normal to the axis of rotation AR of the rotor 73.

The bobbin 67 in FIGS. 2 to 5 is shown to have an elongate rectangular profile with rounded ends. The coil 65 has a similar profile around the bobbin 67. It will be appreciated that other profile shapes for the bobbin 67 can be used.

Figure 7:
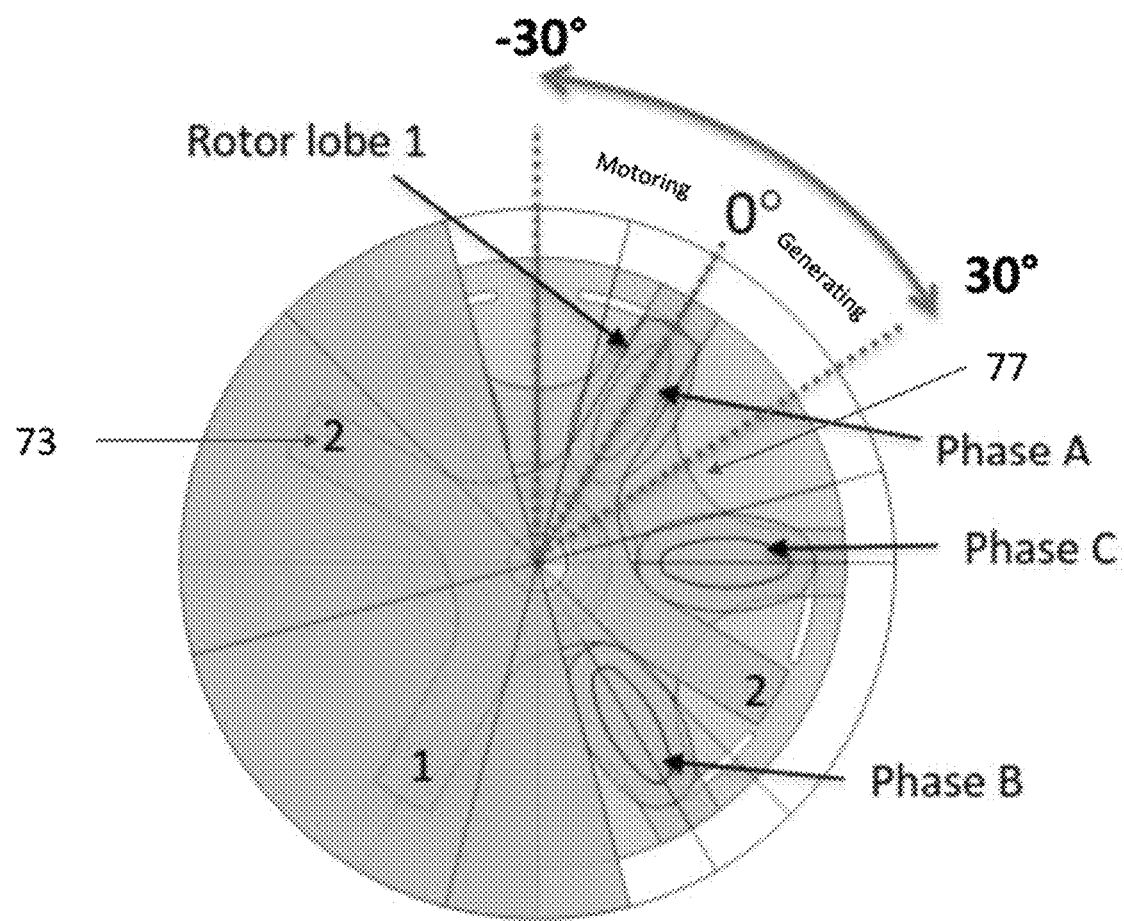
FIG. 7 is a schematic of an AFSRM showing different phases, in accordance with at least some embodiments.

In some other cases, the bobbin 67 has an oval-like profile and the coil 65 has a similar profile around the bobbin 67. An oval-like profile provides more gradual bending or curves. In some cases, this oval-like profile facilitates easier fabrication. An example of an oval-like profile for bobbins is shown in FIG. 7 and in FIGS. 17A, 17B. In some cases, the bobbins have an elliptical profile shape.

In some cases, triangular or pie-shaped bobbins and coil configurations have been used in other electrical motors to optimize use of the circular area of the motor, but this may lead to unsteady flux gradients in motor operation. In some cases, the rounded and elongate shapes described provide a smoother flux gradient as the rotor lobes pass over the salient stator poles.

In some other cases of the AFSRM, different profile shapes can be used for the bobbin and the coil wound around the bobbin. These different profile shapes include, for example, squares, polygons, pie shapes, irregular shapes, or other round or oblong shapes.

Turning back to FIGS. 2 to 5, in some cases, the profile of the bobbin is elongate and it includes a major dimension and a minor dimension, whereby the major dimension extends radially away from the center of the stator, which coincides with the axis of rotation AR of the rotor 73. The minor dimension is the width of the bobbin, and it is less than the length of the major dimension. This facilitates a greater surface area of the bobbin's front face 69 coinciding with a rotor pole 81, which is also elongate and extends radially from the axis of rotation AR, when a rotor pole 81 passes over the bobbin's front face 69.

In some cases, the stator 71 also includes an inner wall 91 that defines therein a void that is centered with the stator. For example, the void defined by the inner wall 91 is circular and is concentric with the axis of rotation AR of the rotor 73. In some cases, the shaft extends through the void of the stator 71.

In some cases, in each of a first pole pair 63*f* and 63*c*, a second pole pair 63*b* and 63*e*, and a third pole pair 63*a* and 63*d*, the poles in each pole pair are diametrically opposed and concentric to the axis of rotation. The pole pairs are connected in series creating a three-phase motor, Phase A (e.g., comprising a first pole pair 63*f* and 63*c*), Phase B (e.g., comprising a second pole pair 63*b* and 63*e*), and Phase C (e.g., comprising a third pole pair 63*a* and 63*d*). The rotor, 73, has four salient poles 81*a*, 81*b*, 81*c*, 81*d* that are affixed to a rotatable shaft 75 concentric to the axis of rotation.

Figure 3:
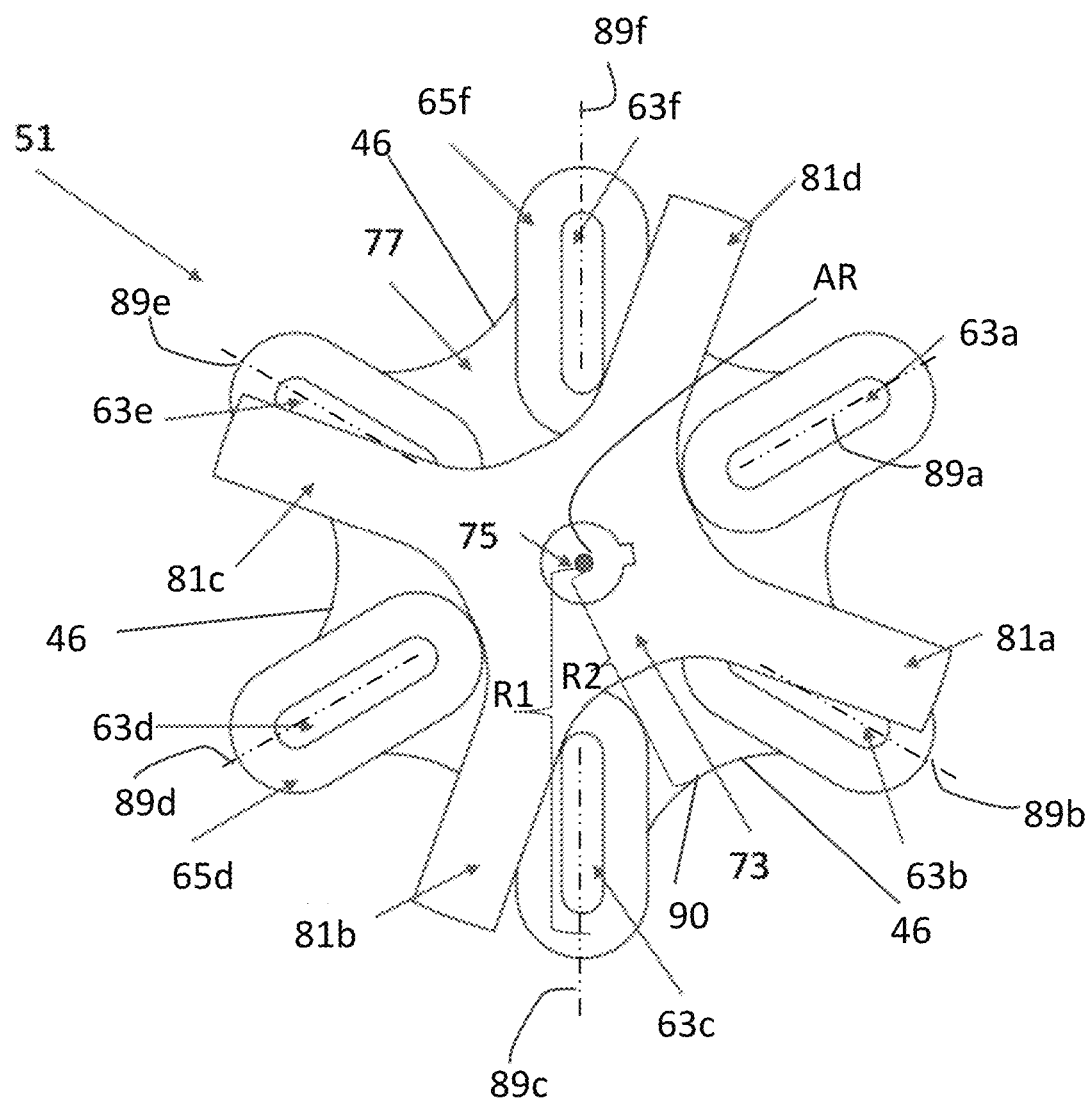
FIG. 3 is a front view of the AFSRM shown in FIG. 2.
Figure 4:
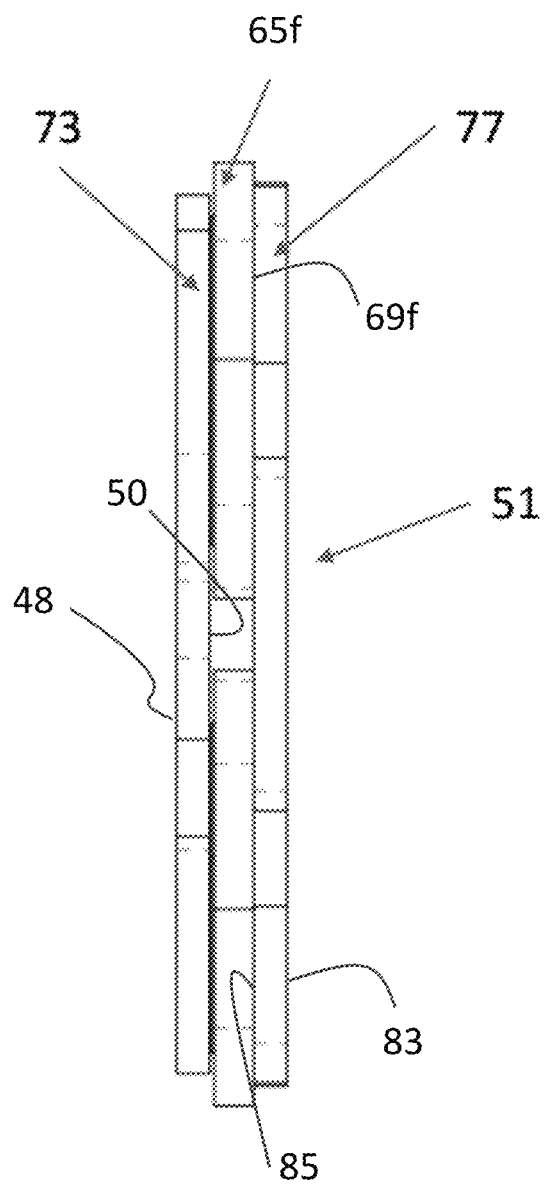
FIG. 4 is a side view of the AFSRM shown in FIG. 2.

In some cases, when operating an AFSRM, the phases are energized while the rotor and stator are at a maximum magnetic reluctance state, until a minimum magnetic reluctance state occurs between the rotor and stator, at which time the phase energization ceases. In some cases, maximum magnetic reluctance occurs at −30 degrees from the centerline of the salient stator poles. As best illustrated in FIG. 3, the center lines 89*a*, 89*b*, 89*c*, 89*d*, 89*e*, 89*f* respectively correspond to the salient stator poles 63*a*, 63*b*, 63*c*, 63*d*, 63*e*, 63*f*. Minimum reluctance is achieved when a rotor pole is perfectly aligned with the centerline a salient stator pole. In some cases, sequential electrical energization of the coils of Phase A (e.g., comprising a first pole pair 63*f* and 63*c*), Phase B (e.g., comprising a second pole pair 63*b* and 63*e*), and Phase C (e.g., comprising a third pole pair 63*a* and 63*d*), at maximum magnetic reluctance until a state of minimum magnetic reluctance causes rotation of the rotor 73 resulting in torque production transferred to the shaft.

In some cases, a three-phase AFSRM operates as a generator and, in such case, at minimum magnetic reluctance, a phase is pulse energized, creating a mutual induction condition resulting in flux linkage between the salient stator pole and the rotor pole. As a rotor pole rotates past the centerline of the salient stator pole, the energization of the phase ceases. The change in inductance as the rotor rotates past the salient stator pole centerline results in power generation in the form of back EMF voltage.

In some cases, a three-phase AFSRM operating as a generator achieves minimum magnetic reluctance when the rotor pole is perfectly aligned with the centerline of the salient stator pole. In some cases, maximum magnetic reluctance is achieved at 30 degrees past the salient stator pole centerline. Phase A (e.g., comprising a first pole pair 63*f* and 63*c*), Phase B (e.g., comprising a second pole pair 63*b* and 63*e*), and Phase C (e.g., comprising a third pole pair 63*a* and 63d), are sequentially energized with a pulse at minimum reluctance and to initiate flux linkage between the rotor pole resulting in electrical power generation through the coils.

FIG. 2 shows an example direction of rotation in the clockwise direction. However, the direction of rotation in the counterclockwise direction can also be achieved. For example, changing the sequential excitation of the phases can cause the rotor to rotate in a different direction.

In some cases, the bobbins and the stator are made of a single piece. In some other cases, the bobbins are separate pieces that are affixed or integrated with the stator, so that magnetic flux can flow through the stator and towards and through the bobbins. Different types of fasteners, screws, and other joinery mechanisms can be used to affix a bobbin to a stator.

The stator and the bobbins are made of, at least in part or entirely, a magnetically permeable material that allows the flow of magnetic flux through the material. The rotor is made of, at least in part or entirely, a magnetically permeable material that allows the flow of magnetic flux through the material. In some cases, the stator, the bobbins and the rotator are made of the same magnetically permeable material. In some cases, the metal material is a type of steel, such as a steel alloy.

Figure 6A:
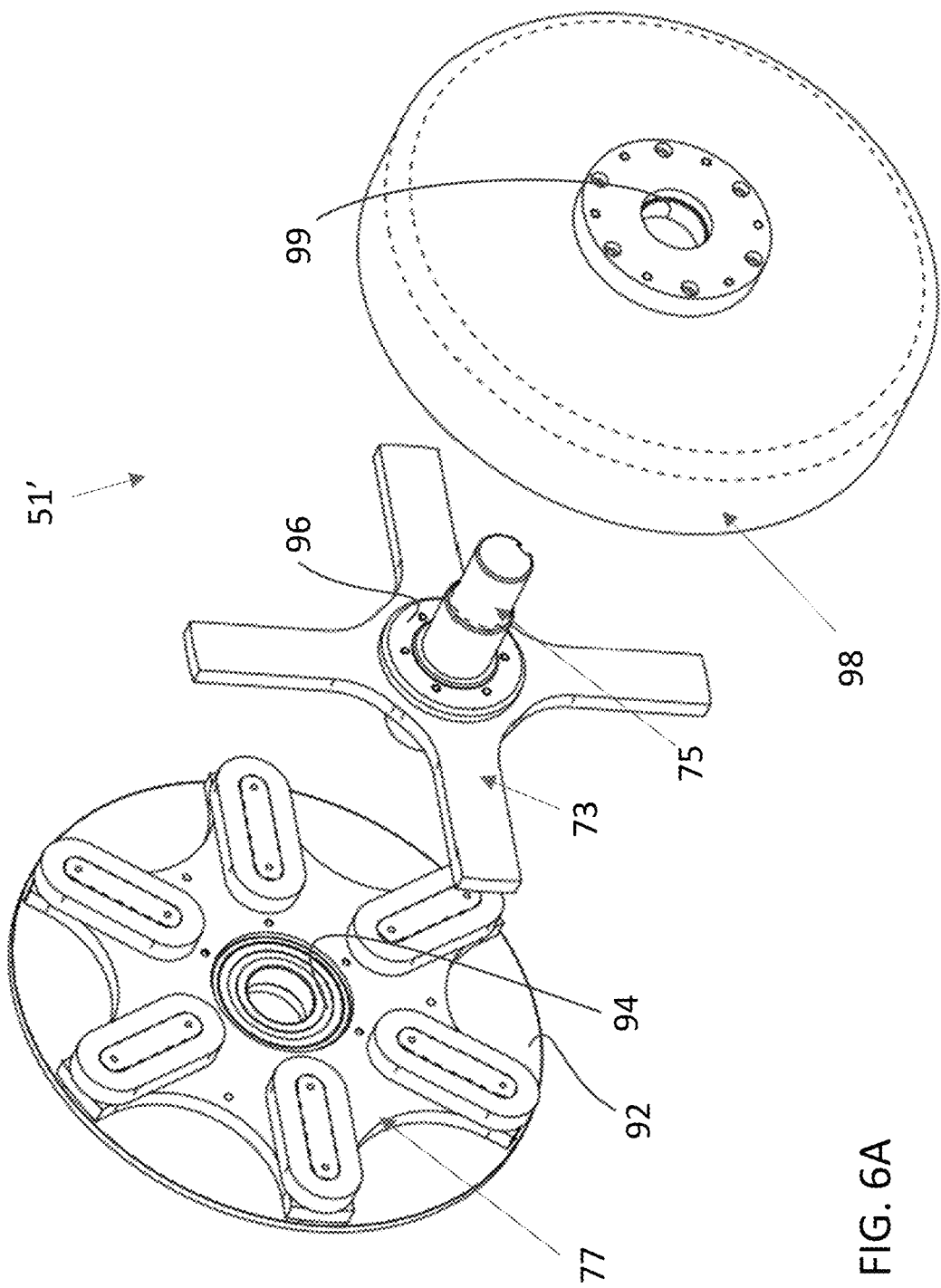
FIG. 6A is an exploded view of another embodiment of an AFSRM, in accordance with at least some embodiments.
Figure 6B:
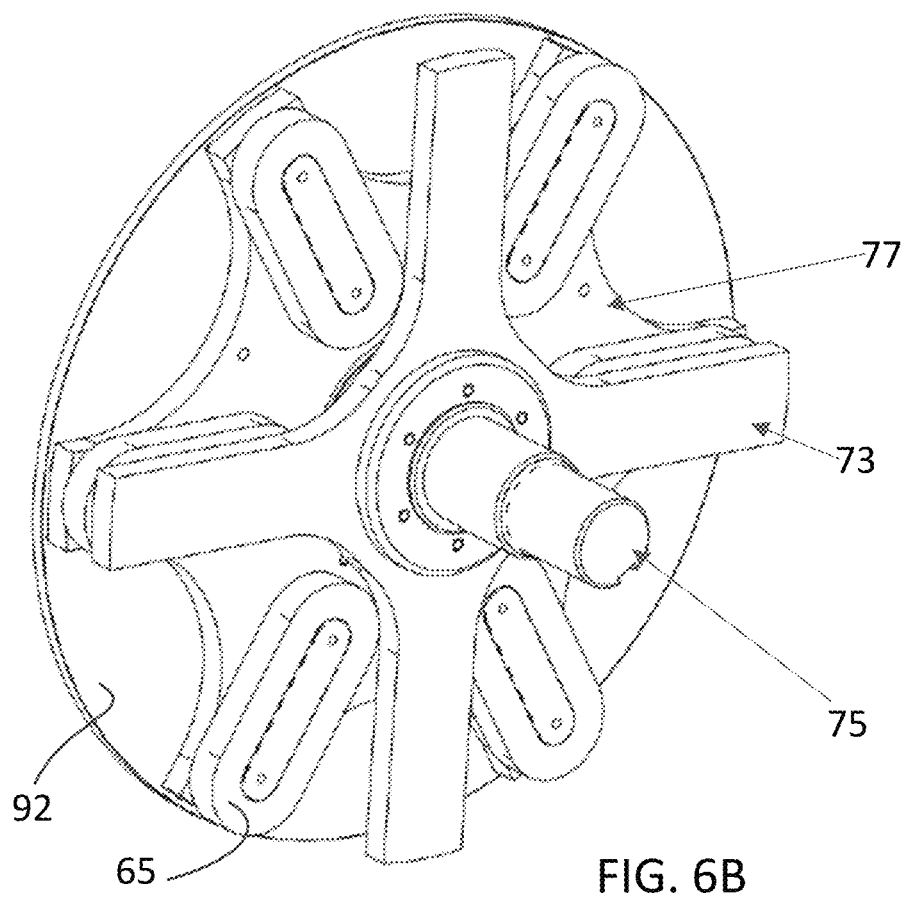
FIG. 6B is a perspective of the AFSRM in FIG. 6A, but without a cover.
Figure 6C:
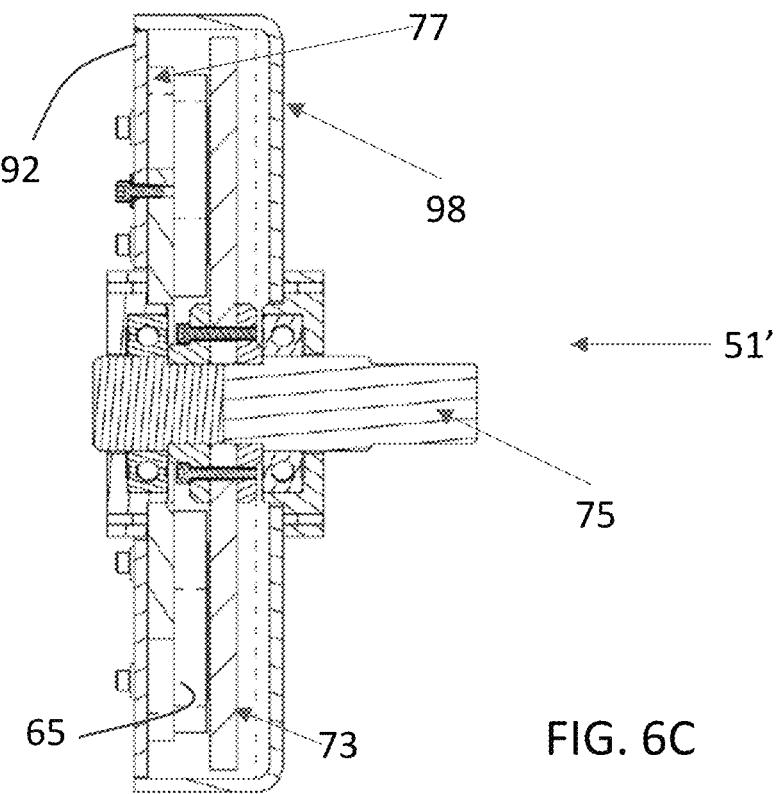
FIG. 6C is a cross-section side view of the AFSRM in FIG. 6A.

Turning to FIGS. 6A, 6B and 6C, another embodiment of an AFSRM 51' is provided, which includes a backing plate 92 affixed to the stator 77. A rotary bearing 94 is positioned at the center of the stator 77 and extends through the center of the backing plate 92. A portion of the shaft 75, which is coupled and affixed to the rotor 73, extends through the circular opening of the rotary bearing 94. In some cases, a flange 96 is used to help affix the shaft 75 to the rotor 73. The AFSRM 51' also includes a cover 98 that will house the stator 77 and the rotor 73. Another portion of the shaft 75 extends through an opening 99 defined in the center of the cover 98. It will be appreciated in FIG. 6B, the cover 98 is not shown.

FIG. 7 illustrates the phase definition of an AFSRM 51. Clockwise rotation of the rotor while sequentially energizing Phase A (e.g., comprising a first pole pair 63f and 63c), Phase B (e.g., comprising a second pole pair 63b and 63e), and Phase C (e.g., comprising a third pole pair 63a and 63d) between −30 degrees and 0 degrees will result in rotation of the rotor of the AFSRM 51, resulting in torque generation.

Clockwise rotation of the rotor while sequentially energizing Phase A (e.g., comprising a first pole pair 63f and 63c), Phase B (e.g., comprising a second pole pair 63b and 63e), and Phase C (e.g., comprising a third pole pair 63a and 63d), with a pulse as the rotor pole passes 0 degrees will result in an axial flux switched reluctance generator 51 operating to generate electrical power through its coils 67. The above example states clockwise rotation but by changing the sequential excitation order of the phases the AFSRM can operate in a counterclockwise direction.

Figure 8:
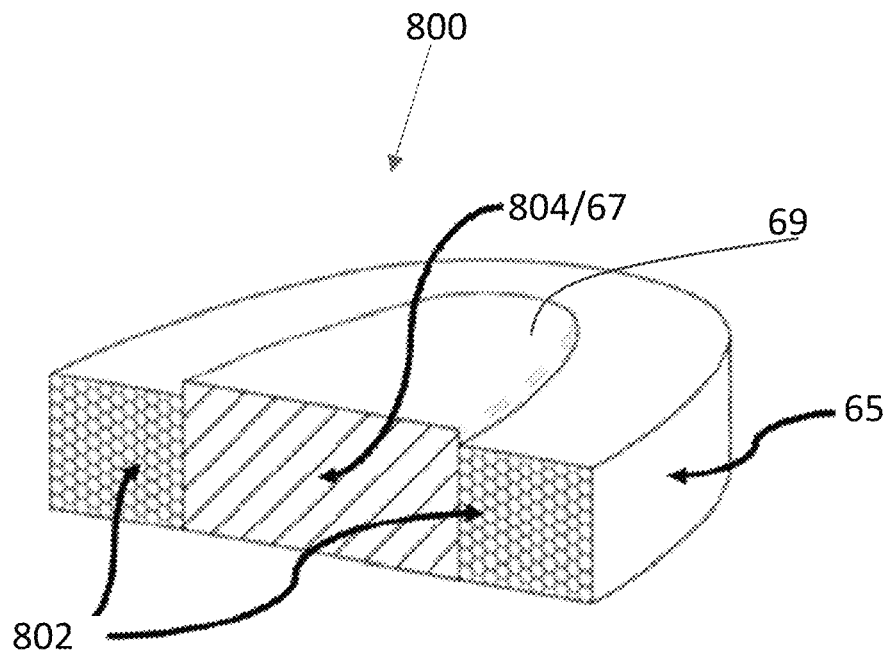
FIG. 8 is a cross-sectional view of an electromagnet used in an AFSRM, in accordance with at least some embodiments.

Turning to FIG. 8, a cross-section view of an example embodiment of an electromagnet 800 is shown within a stator pole of an AFSRM. In some cases, the electromagnet includes multiple conductor loops 802 that are wound around a magnetically permeable core 804. The magnetically permeable core 804 forms a bobbin 67. The collection of the multiple conductor loops 802 form a coil 65. In some cases, the magnetically permeable core 804 includes a metal, such as steel, M-19 electrical steel, and/or other magnetically permeable material. In some cases, the heat generation of the AFSRM is significantly improved due to the geometric construction of the electromagnets at each of the stator poles, and due to the control of electrical excitation by a controller 102.

In some cases, heat generation resulting from motor operation can be controlled in a few ways. In some cases, vertical and horizontal placement of every conductor loop 802 in the coil 65 is defined geometrically with respect to a certain local cartesian coordinate system. This ensures a defined and repeatable thermal characteristic for every coil 65. In some cases, there are very few and/or very small internal gaps between conductors 802 within a given coil 65. This results in an internal conductive thermal path versus a mix of conductive and convective thermal paths. In some other cases, the geometry of an AFSRM provides a shortened direct path for heat generated to reach ambient air and be removed via convection. Internally conduction is the dominant phenomena, while externally convection occurs from the outer surface of the coil. For example, conduction occurs through the pole of a stator and the heat is then removed via convection. In some other cases, windage resulting from rotor rotation creates a forced convection phenomena over the heat generating geometry of the coil 65. The heated air can be evacuated from the internals of the AFSRM.

In some cases, a pulsed timing and trigger controller (PTTC) controls current or voltage, whether it is an inductor or a capacitor, and thereby controls magnetism of a stator pole in a AFSRM.

Furthermore, in some cases, heat generation is controlled by controller 102 using, for example, a pulsed timing and trigger controller (PTTC) program and/or function. Heat generation within an electric motor for example is a form of input energy not used for torque or power generation. The PTTC program and/or function run by the controller 102 closely monitors heat generation resulting from motor operation. Except for the case of intermediary conditions where maximum torque or power generation is requested by the operator, heat generation has an upper boundary set by the controller 102. In some cases, the controller 102 adjusts a motor control signal based on the angular position of the rotor assembly and on the detected temperature of the motor, to adjust a torque associated with the rotor 73 to prevent the temperature of the motor from exceeding an upper temperature boundary and or limit. The upper temperature boundary and/or limit may be preset within memory and the controller 120 may compare sensed more temperature with the stored temperature limit to determine how close the present motor temperature is to the limits, and adjust a motor control signal accordingly to prevent an over temperature condition.

FIG. 9A illustrates an example embodiment of a magnetic flux path in an AFSRM 51 when Phase A (e.g., comprising a first pole pair 63f and 63c) is energized. When phase A is energized the flux travels through the rotor, 73, and stator, 77, salient stator poles, 63f and 63c, thereby forming a magnetic flux loop. The flux characteristics shown are at a minimum reluctance condition indicating the rotor poles are aligned with the energized stator poles 63f and 63c.

FIG. 9B illustrates an example embodiment of a magnetic flux path in an isometric view of an AFSRM 51, distributed through the rotor 73, the stator 77, a pair of salient stator poles 63f and 63c, when Phase A (e.g., comprising a first pole pair 63f and 63c) is energized at the minimum reluctance. FIG. 9B corresponds to FIG. 9A. As better seen in FIG. 9B, the looping path of the magnetic flux flow is illustrated from the stator to the rotor. The magnetic flux flows from the bobbin 67f in a direction along the bobbin's axis 71f, and across the front surface 69f of the bobbin to the back surface 85 of a first rotor pole. The magnetic flux path continues around the void in the rotor 73 defined by the inner wall 72 and across to a diametrically positioned second rotor pole. The magnetic flux path travels in a direction along the bobbin's axis 71c across the back surface 85 of the second rotor pole and to the front surface 69c of the bobbin 67c of the salient stator pole 63c. The magnetic flux path continues through the bobbin 67c in a direction along the bobbin's axis 71c, and then in a direction bound by the plane defined by the stator 77 back towards the salient stator pole 63f. As shown in FIG. 9B, the magnetic flux path travels in an axial direction parallel to the axis of rotation AR of the rotor 73.

In the example shown in FIG. 9B, at the stator pole 63f, the electric current flows through the coil 65f in a counterclockwise direction around the axis 71f of the bobbin 67f. At the stator pole 63c, the electric current flows through the coil 65c in a clockwise direction around the axis 71c of the bobbin 67c.

In some cases, as illustrated in the example embodiment of the AFSRM 51 in FIGS. 2 to 5, the side walls 46 between the stator protrusions 61a, 61b, 61c, 61d, 61e. 61f have a concave and curved profile. In some cases, each side wall 46 does not have any corners, but instead is a continuous concave curve. Referring to FIG. 3, in some cases, there is defined a middle point 90 of a sidewall 46, which is equidistant between two neighboring centerlines 89c and 89b of the salient stator poles 63c and 63b. The middle point 90 of the sidewall 46 is a point on the sidewall that is closest to the center of the stator, which concentric with the axis of rotation AR of the rotor 73. In some cases, the distance R1 refers to the radial distance between the center of the stator (e.g., the axis of rotation AR) to the outermost edge of a given stator protrusion 61. The distance R2 refers to the radial distance between the center of the stator and a given middle point 90 of a sidewall, which is also the closest point along the continuously concave curve sidewall to the center of the stator. In some cases, 0.5R1<R2<R1. In some cases, 0.6R1<R2<0.9R1. In some cases, R2 is approximately 0.7R1. It will be appreciated that other ratios relating R2 and R1 together can be used.

In some cases, the continuous concave curve of the sidewall 46 facilitates a higher magnetic flux density of the magnetic flux path across the stator between a pair of salient stator poles. For example, corners or angles in the profile of the sidewall 46 may cause more eddies along the magnetic flux path in the stator.

In some cases, the sidewall has a parabolic profile.

In some other cases, the sidewall 46 has a different shape. For example, the sidewall is formed by two or more straight edges connected at angles to each other. In another example, the sidewall could have a triangular profile. More generally, the profile shape of the stator 77 can vary from the example embodiments shown.

FIGS. 10 to 21 described below relate to the operation of an AFSRM 51 or ASFRM 51', or both. In some cases, some or all of the characteristics and operation information described in FIGS. 10 to 21 also apply to other embodiments of AFSRM (not limited to AFSRM 51 or ASFRM 51').

Figure 10:
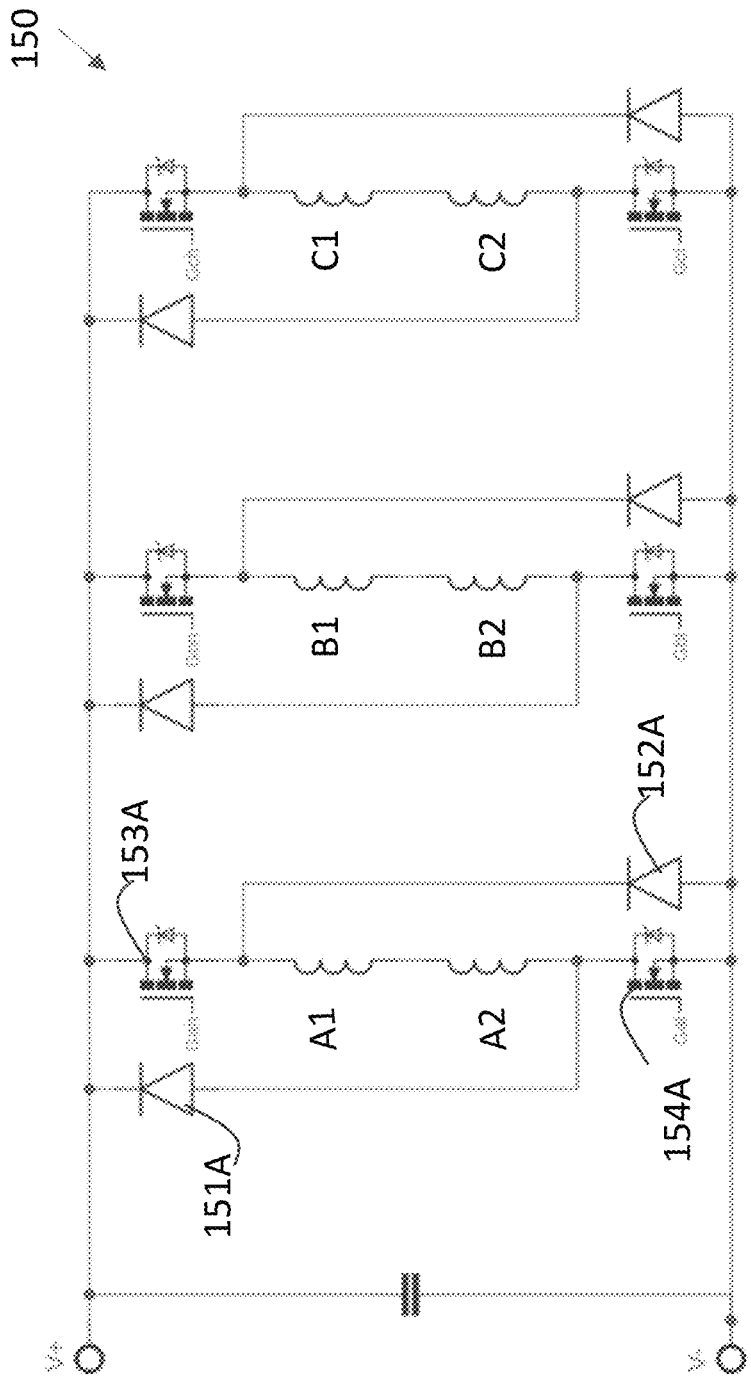
FIG. 10 is a control circuit for an AFSRM with three phases, in accordance with at least some embodiments.

FIG. 10 illustrates an example embodiment of a control circuit 150 used for the control of an AFSRM 51. Semiconductor power switches control current flow into each phase and freewheeling diodes allow back EMF to return to the power supply and the bypass capacitor. The back EMF is also sometimes referred to as counter electromotive force, which is voltage generated by a running motor that acts to counter the supplied voltage. Current flow into each phase of the motor is independently controlled to optimize performance. Other types of control circuitry can be used to control the AFSRM.

In some cases, the coils A1, A2 in FIG. 10 correspond to the coils of the salient stator pole pair for Phase A (e.g., comprising a first pole pair 63f and 63c, and the coils A1, A2 respectively corresponding to the coils 65f, 65c). The coils B1, B2 correspond to the coils of the salient stator pole pair for Phase B (e.g., comprising a second pole pair 63b and 63e, and the coils B1, B2 respectively corresponding to the coils 65b,65e). The coils C1, C2 correspond to the coils of the salient stator pole pair for Phase C (e.g., comprising a third pole pair 63a and 63d, and the coils C1,C2 respectively corresponding to the coils 65a, 65d).

In FIG. 10, for Phase A, a semiconductor power switch 153A, the coil A1, the coil A2 and another a semiconductor power switch 154A are electrically connected in series between the electrical line V+ and V−. A first end of a freewheeling diode 151A is electrically connected between the coil A2 and the semiconductor power switch 154A, and the second end of the freewheeling diode 151A is electrically connected to the electrical line V+. Current can flow from the first end to the second end of the freewheeling diode 151A. A first end of another freewheeling diode 152A is electrically connected to the electrical line V−, and the second end of the other freewheeling diode 152A is electrically connected between the semiconductor power switch 153A and the coil A1. Current can flow from the first end to the second end of the other freewheeling diode 152A.

Similar configurations for the freewheeling diodes and the semiconductor power switches are shown for Phase B, with coils B1 and B2, and Phase C, with coils C1 and C2.

Figure 11:
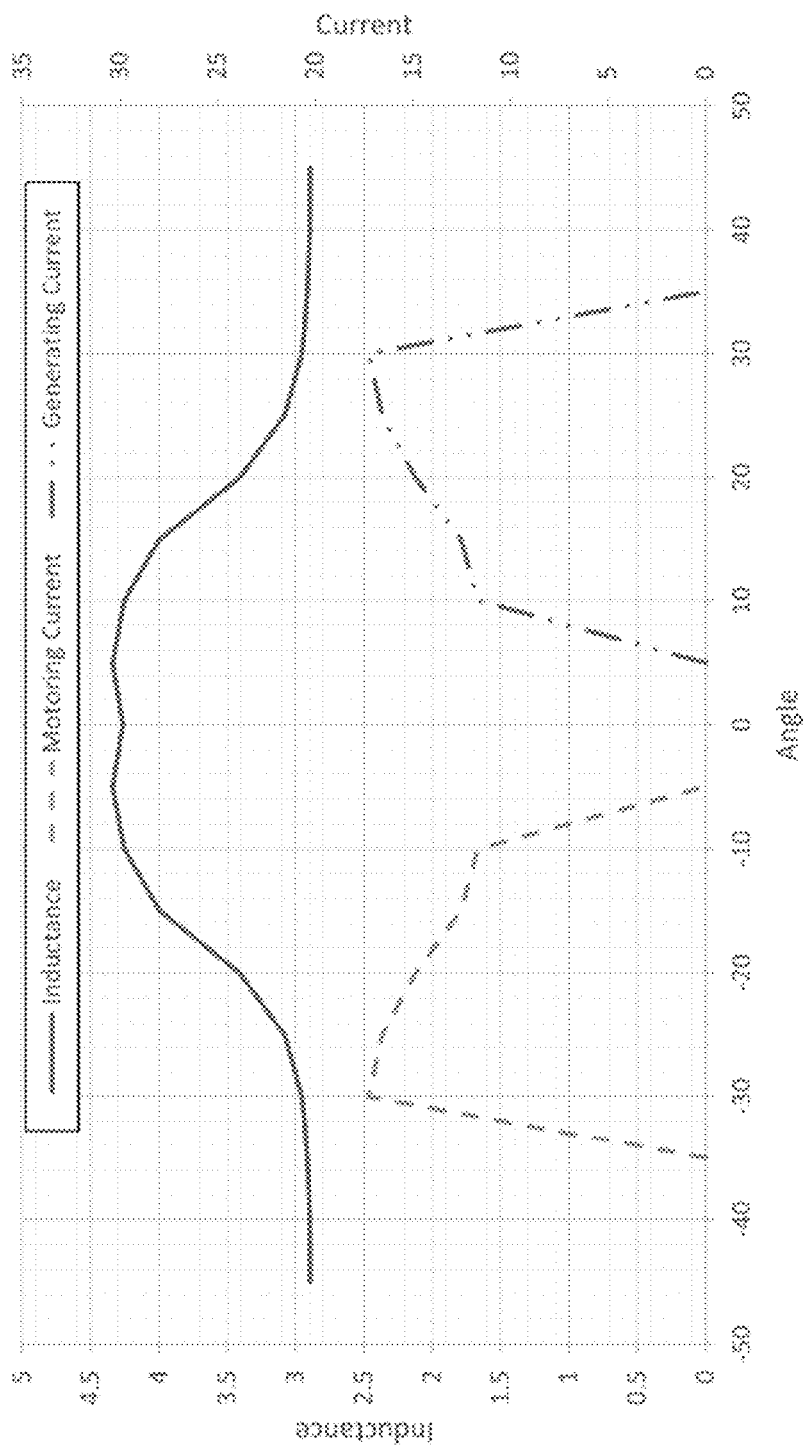
FIG. 11 is a graph of angle versus inductance/motoring current/generating current for one given phase in an AFSRM, in accordance with at least some embodiments.

FIG. 11 is a graph which illustrates an example embodiment of a relationship between inductance, angle, motoring current response and generating current response. 0 degrees represents the centerline of the salient stator pole. The AFSRM 51 acts as a motor when a voltage from the control circuit (such as the control circuit 150) energizes a phase in the negative angular region. The current response for the AFSRM is shown as the rotor lobe rotates through the angles −35 to −5 degrees. The AFSRM 51 acts as a generator when a voltage from the control circuit pulse energizes a phase as the rotor rotates passes 0 degrees and continues generating power resulting from flux linkage between the salient stator pole and the rotor pole until 35 degrees when the inductance reaches a minimum value.

Figure 12:
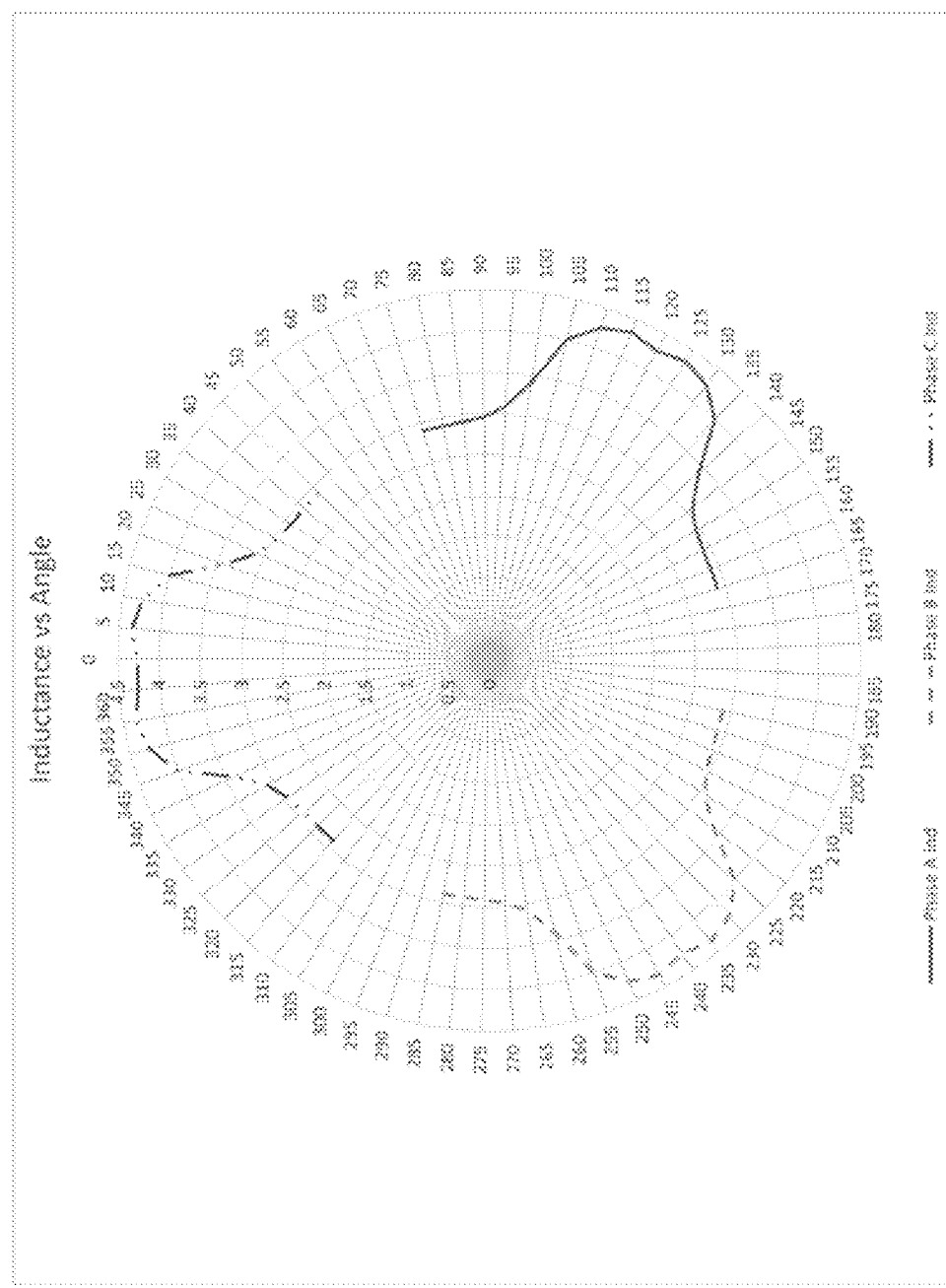
FIG. 12 is a graph of angle versus inductance for three phases in an AFSRM, in accordance with at least some embodiments.

FIG. 12 is a graph illustrating an example embodiment of a relationship between angle and inductance for Phase A (e.g., comprising a first pole pair 63f and 63c), Phase B (e.g., comprising a second pole pair 63b and 63e), and Phase C (e.g., comprising a third pole pair 63a and 63d) that occurs during a 360-degree rotation of the rotor for one rotor lobe. A positive slope of inductance for any phase indicates a motoring condition. A negative slope of inductance for any phase indicates a generating condition.

Figure 13:
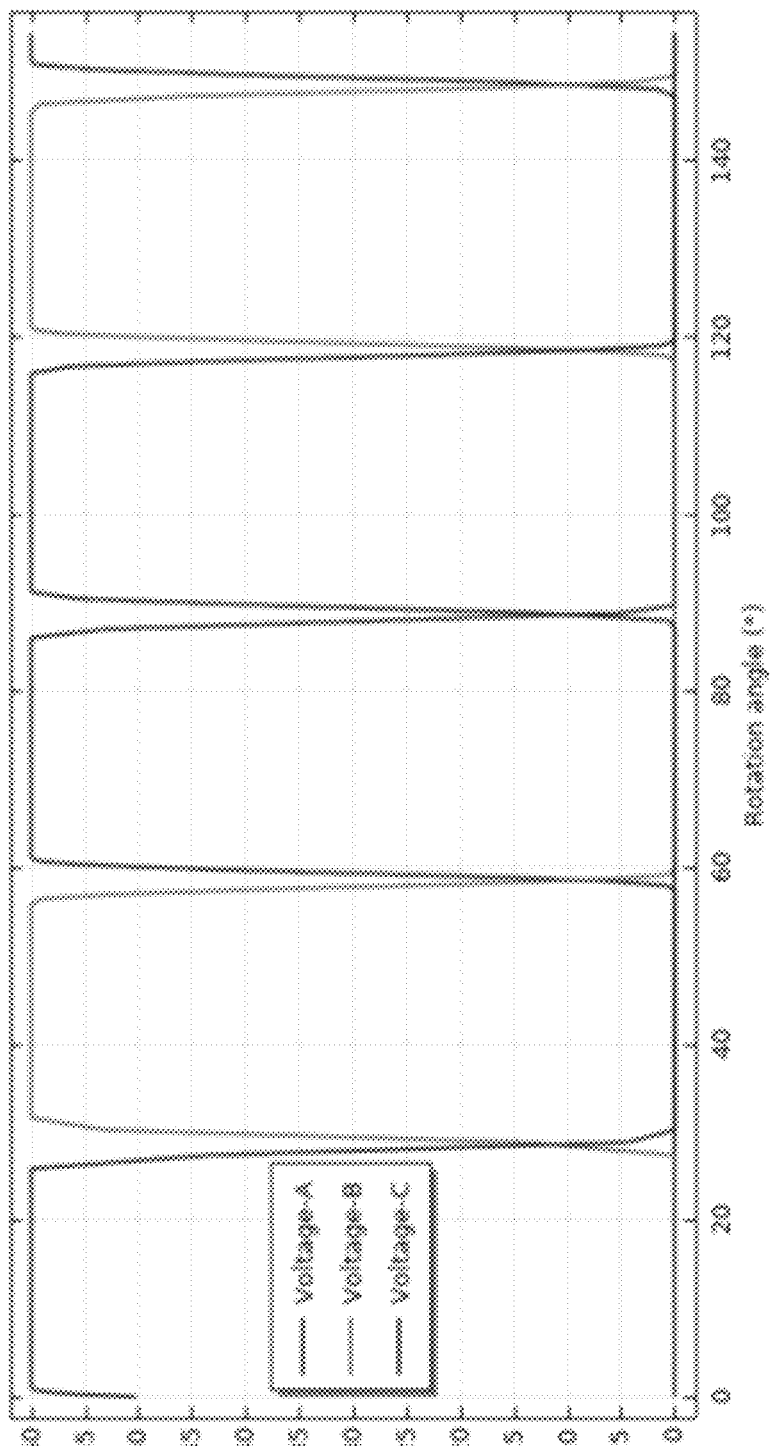
FIG. 13 is a graph of input voltage versus rotation angle for three phases in an AFSRM, in accordance with at least some embodiments.
Figure 14:
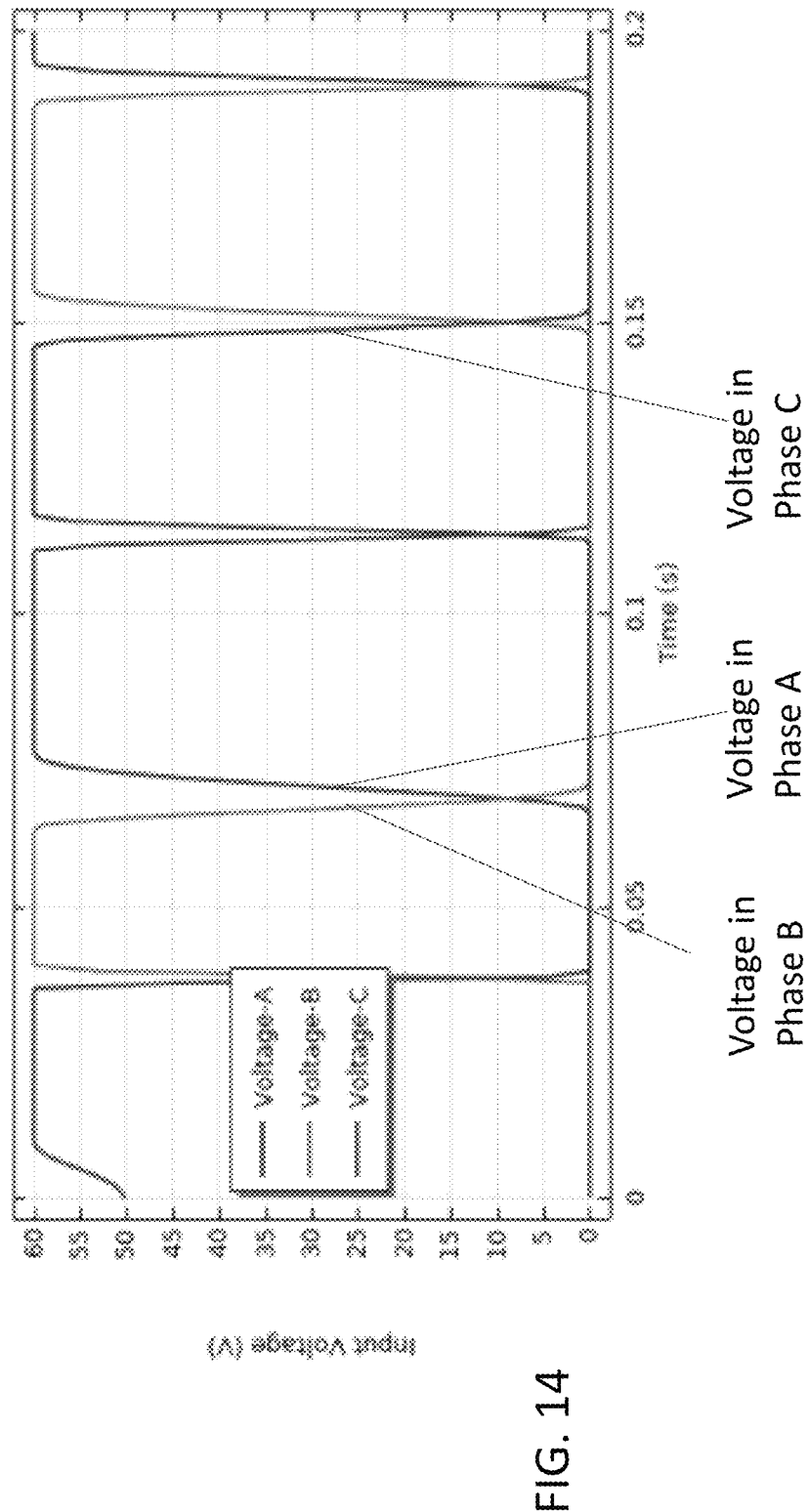
FIG. 14 is a graph of input voltage versus time for three phases in an AFSRM, in accordance with at least some embodiments.

FIG. 13 is a graph detailing the phase voltage excitation versus angular position, according to some example embodiments. The phase voltage excitation of an AFSRM 51 is a non-sinusoidal periodic waveform with fixed maximum and minimum values most closely resembling a square wave. Voltage excitation of each phase is determined by angular position of the rotor ensuring excitation occurs at the desired inductance value. FIG. 14 is a graph of phase voltage excitation versus time.

Figure 15:
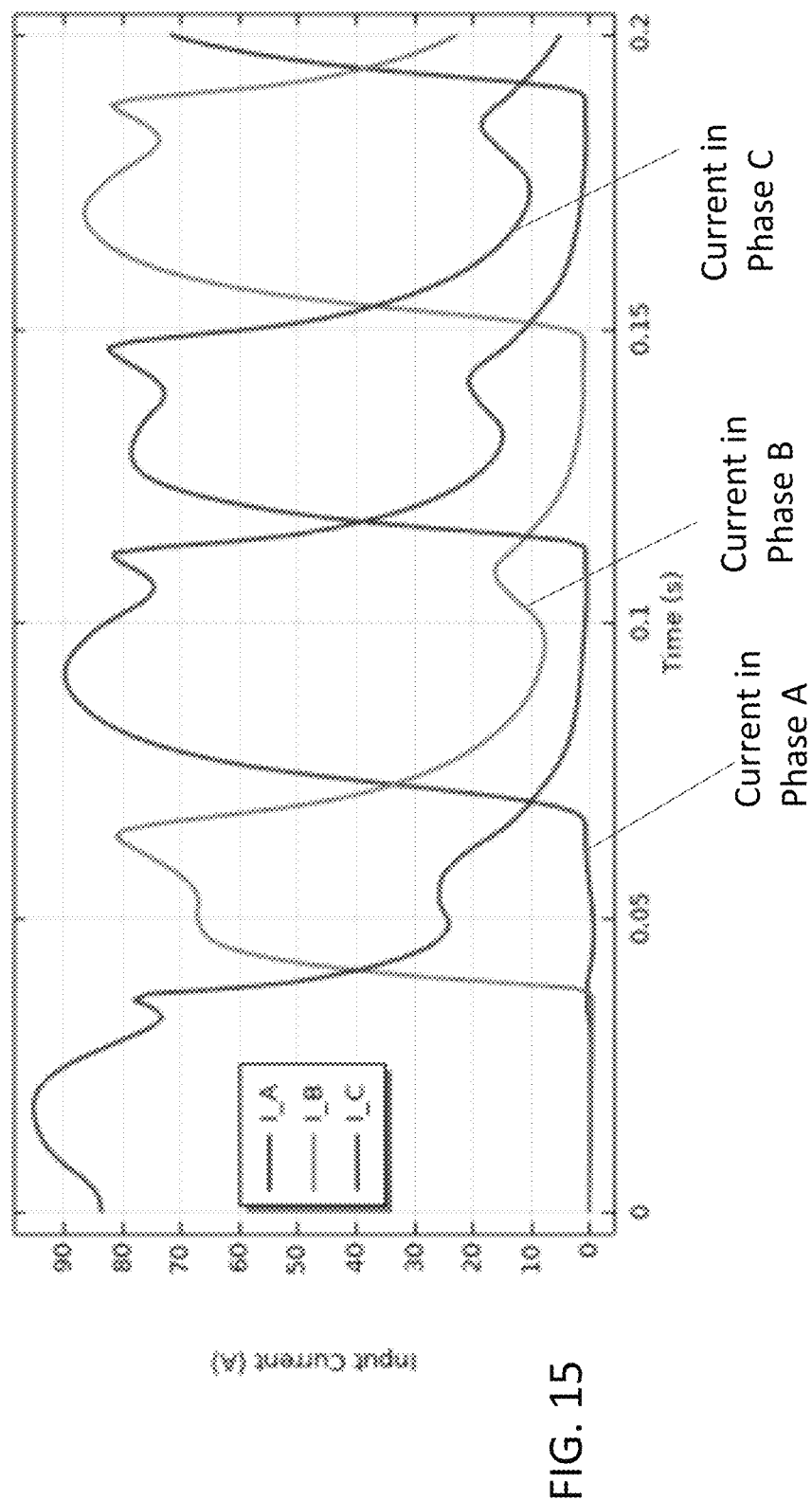
FIG. 15 is a graph of input current versus time for three phases in an AFSRM, in accordance with at least some embodiments.

FIG. 15 is a graph of an example embodiment of a phase current response to phase voltage excitation versus time. The phase current profile indicates that the current response is non-linear due to the transient behavior of the phase coils. The graph includes the current behavior at start up where the rotor transitions from stationary to rotating. The current draw for Phase A (e.g., comprising a first pole pair 63f and 63c), from time 0 s to time 0.04 s indicates a higher current draw when compared to time 0.04 s to time 0.2 s where the behavior is periodic. It can also be seen in this example embodiment graph that multiple phases can be energized simultaneously at time 0.04 s, time 0.075 s, time 0.125 s, time 0.16 s, and time 0.18 s.

Figure 16:
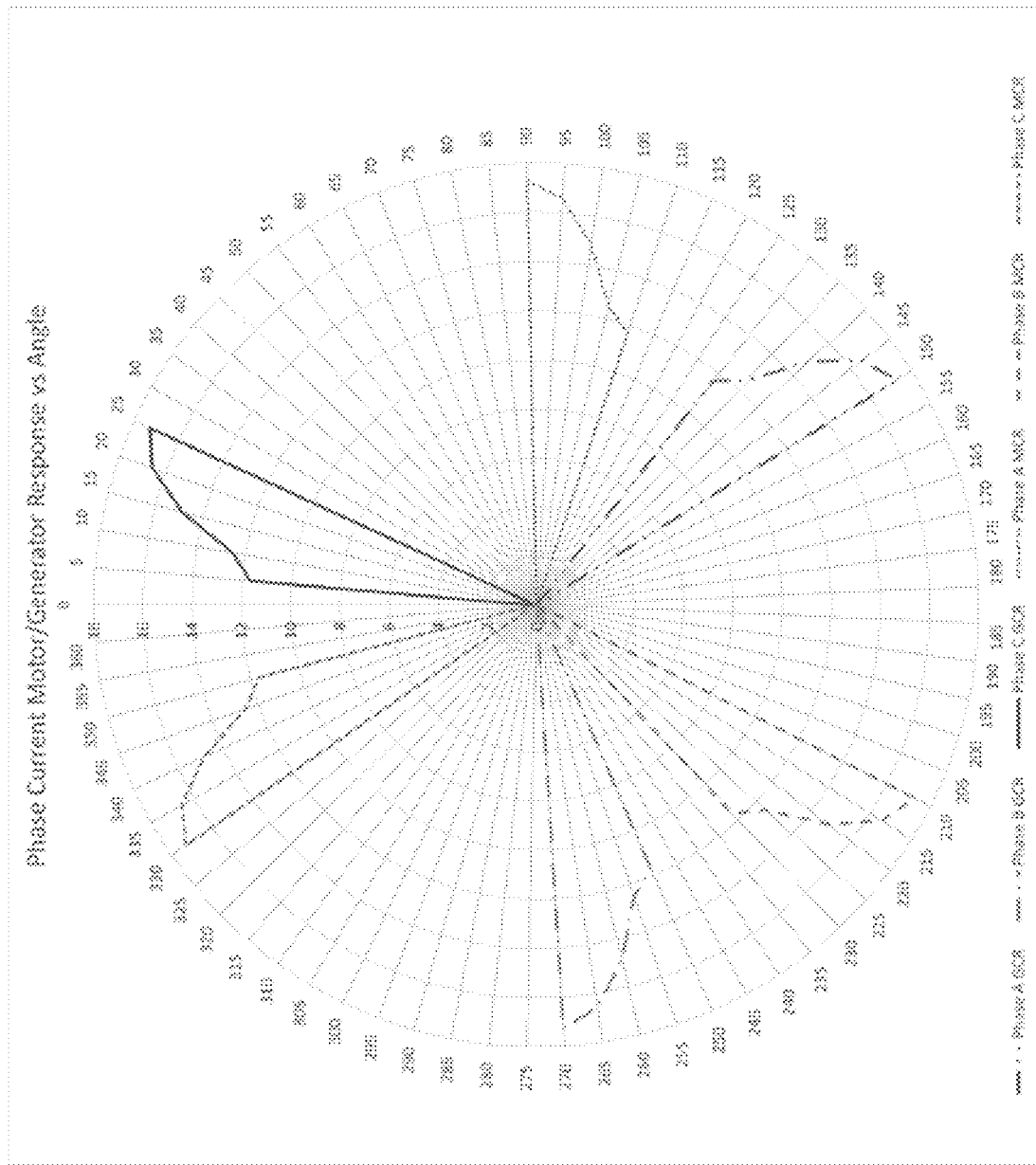
FIG. 16 is a graph of angle versus motoring current/generating current for three phases in an AFSRM, in accordance with at least some embodiments.

FIG. 16 is a graph illustrating an example embodiment of a relationship between angle and current response for Phase A (e.g., comprising a first pole pair 63f and 63c), Phase B (e.g., comprising a second pole pair 63b and 63e), and Phase C (e.g., comprising a third pole pair 63a and 63d), that occurs during a 360-degree rotation of the rotor of the AFSRM 51. The centerline for salient stator poles of Phase A are at 120 degrees, the centerline for salient stator poles for Phase B are at 240 degrees, and the centerline salient stator poles for Phase C are at 360 degrees. As a rotor lobe approaches 120, 240 and 360 degrees this is a motoring condition indicated by the current profile. FIG. 16 illustrates the motor current response (MCR) for each phase. As one rotor lobe passes 120, 240, and 360 degrees this is a generating condition indicated by the current profile. FIG. 16 also illustrates the generator current response (GCR) for each phase.

Figures 17A, 17B:
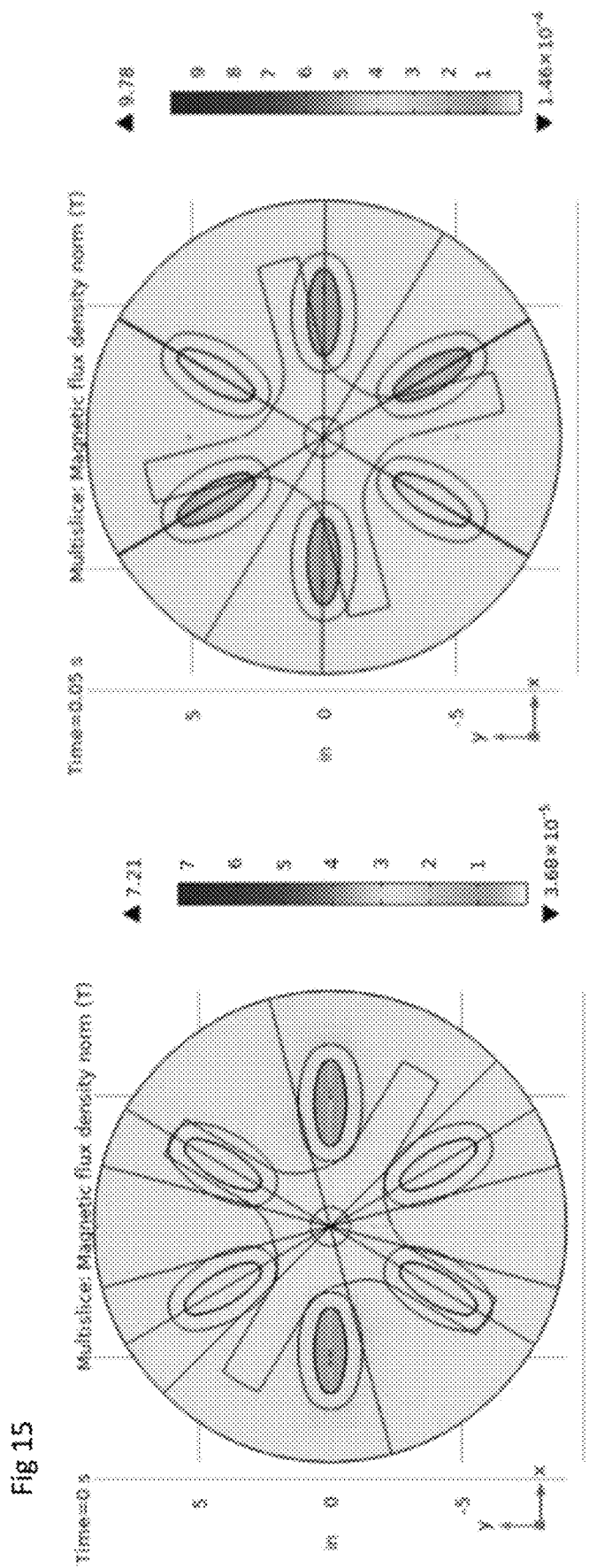
FIGS. 17A and 17B are gradient plots of magnetic flux density at different times for an AFSRM, in accordance with at least some embodiments.

FIGS. 17A and 17B show a multi-physics analysis of dynamic operation in the AFSRM, to define magnetic flux density, according to an example embodiment. At time 0 seconds, shown in FIG. 17A, the flux density shows only one phase excited as shown by a pair of diametrically positioned bobbins in the stator 77. At time 0.05 seconds, shown in FIG. 17B, multiple phases experience current in the coils as indicated by the magnetic flux density plot on the right. In this particular example embodiment, the maximum value of 9.78 T is due to the local numerical issues on the edges of the rotor 73 and the stator 77. In some cases, the average magnetic flux density is in the range of 2 T, or is approximately 2 T.

Figure 18:
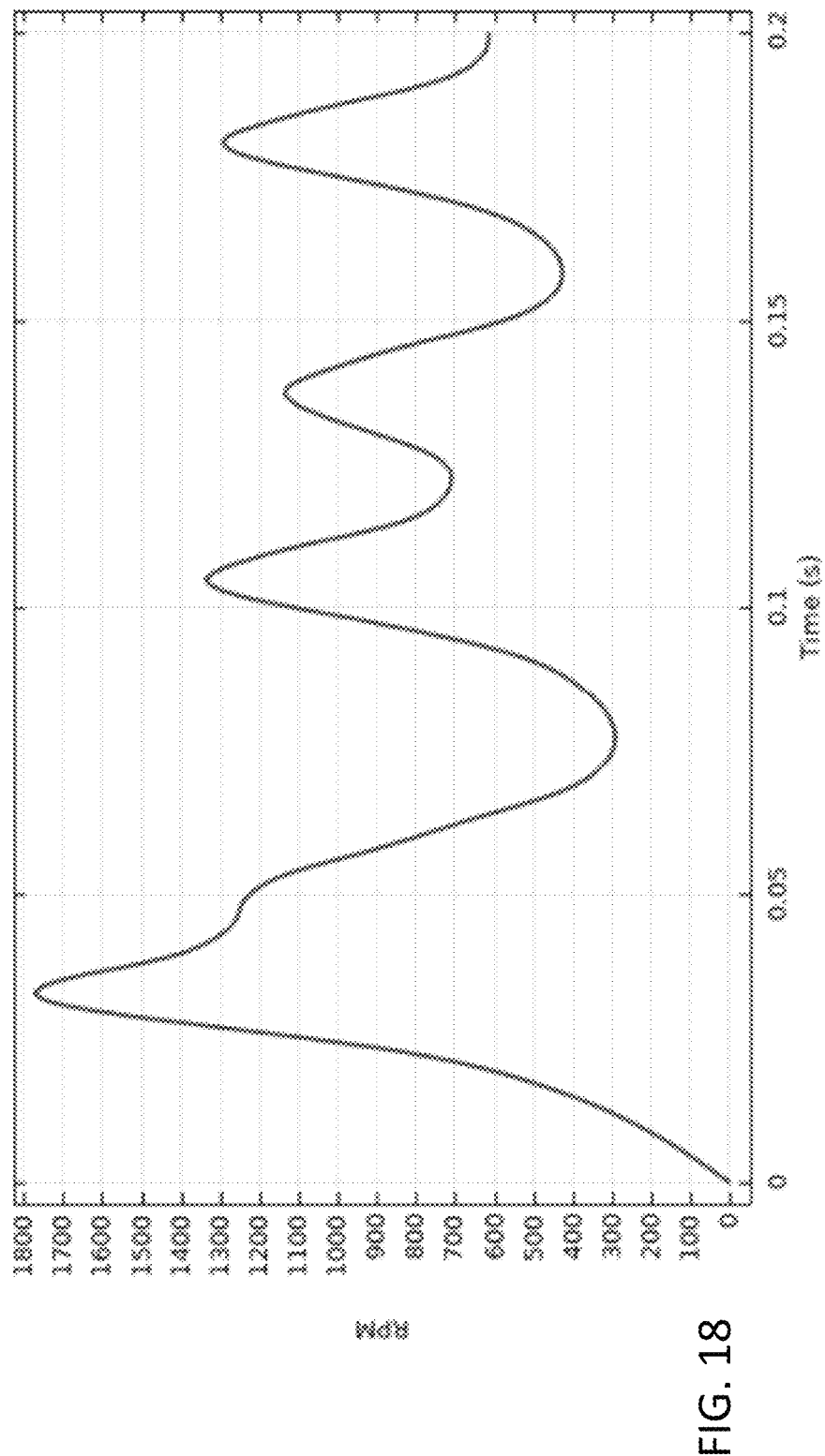
FIG. 18 is a graph of RPM versus time for an AFSRM, in accordance with at least some embodiments.
Figure 19:
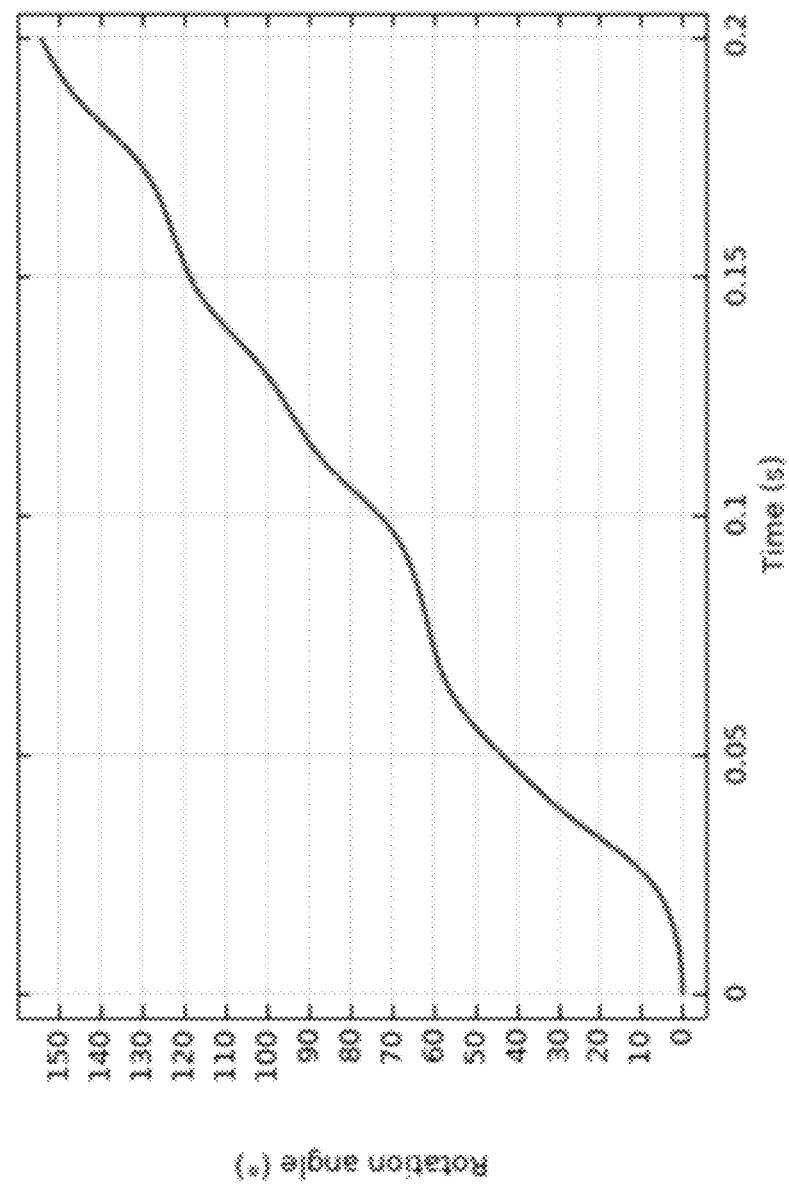
FIG. 19 is a graph of rotation angle versus time for an AFSRM, in accordance with at least some embodiments.

FIG. 18 is a graph of the AFSRM's rotor speed versus time, according to an example embodiment. The graph indicates that the rotating rotor experiences significant speed ripple. In some cases, averaging the minimums and maximums, the speed of the rotor 73 is 900 RPM. FIG. 19 is a graph rotation angle of the rotor versus time, according to an example embodiment. It will be appreciated that the rotational speed can vary depending on different factors, including but not limited to the configuration of the AFSRM, the material used, the number of windings in the coil, the amount of power supplied, and the responsiveness of the control circuitry, amongst other factors.

Figure 20:
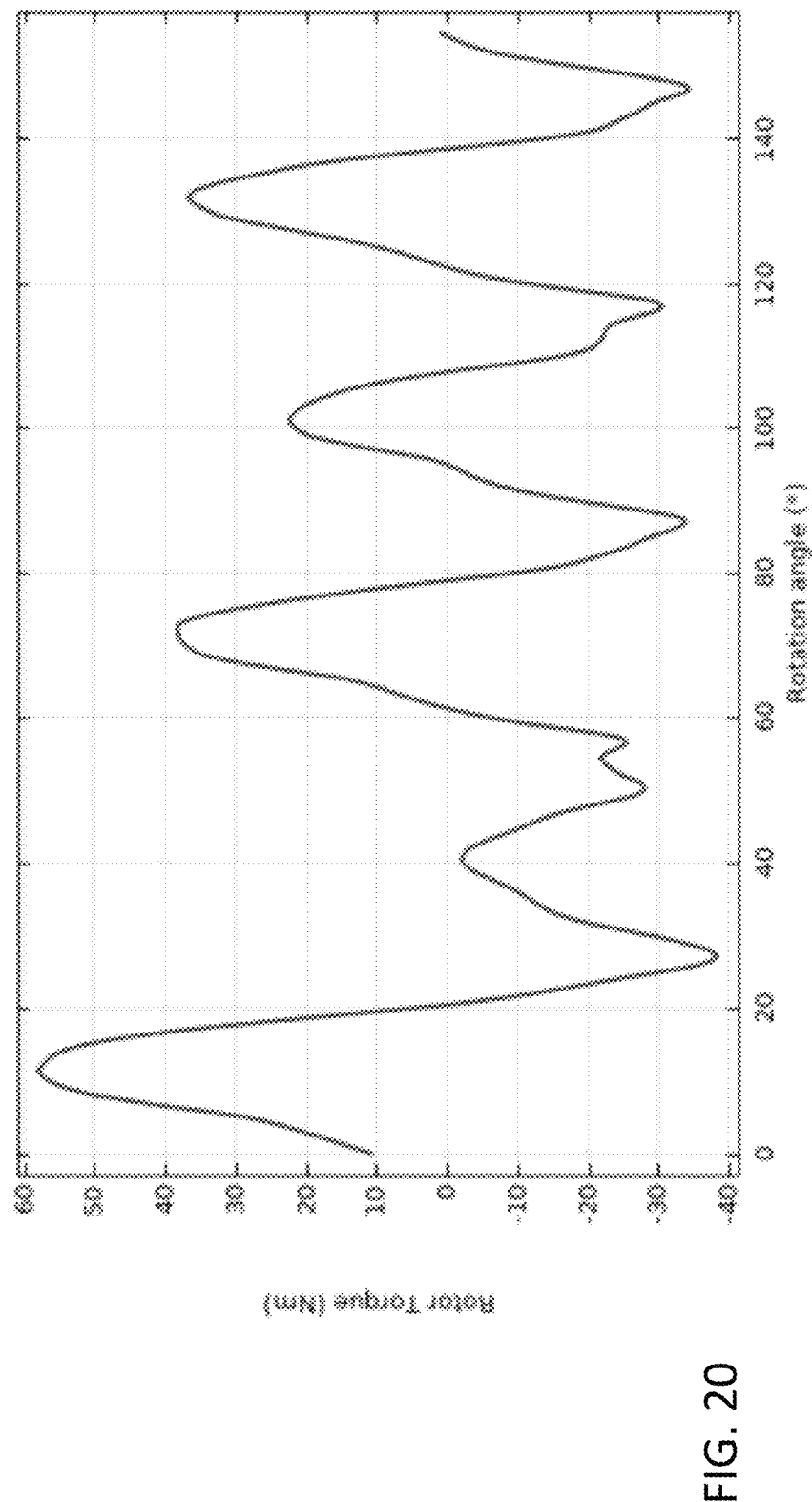
FIG. 20 is a graph of rotor torque versus rotation angle for an AFSRM, in accordance with at least some embodiments.
Figure 21:
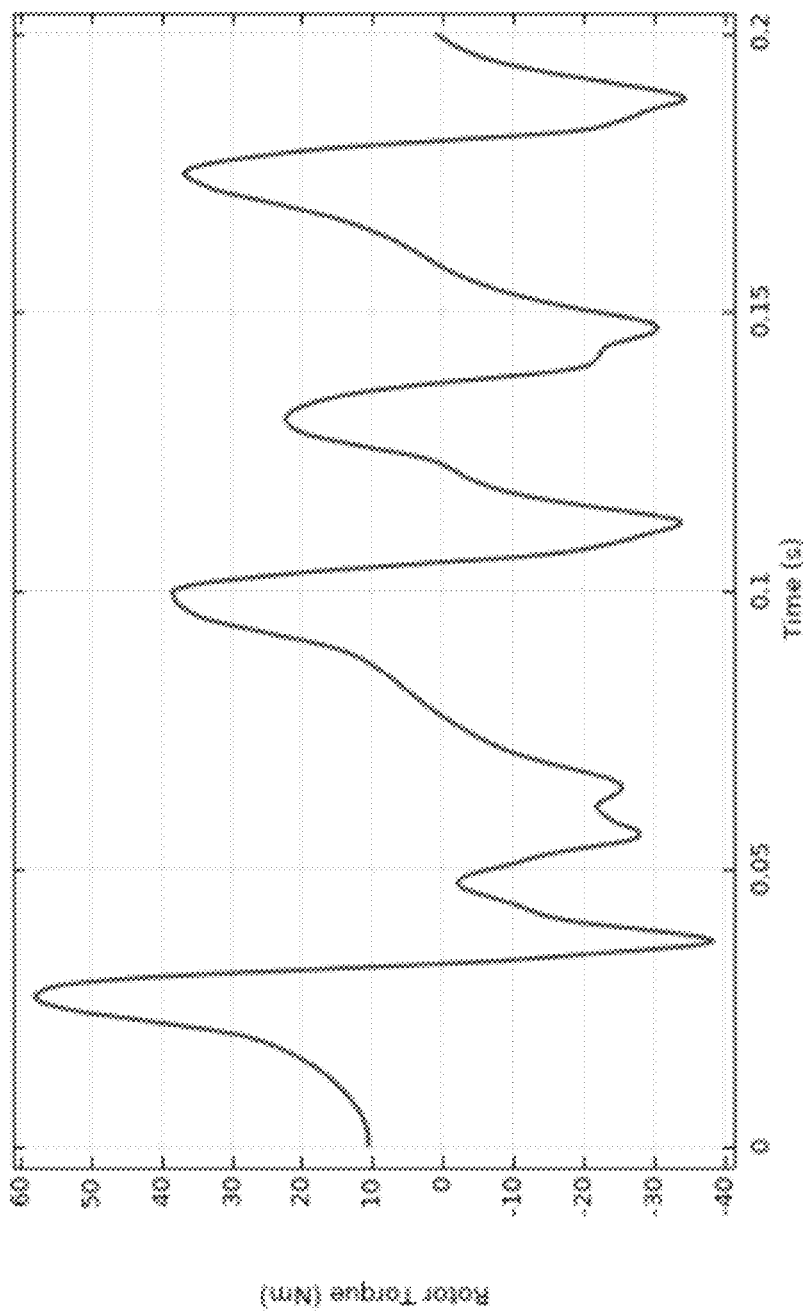
FIG. 21 is a graph of rotor torque versus time for an AFSRM, in accordance with at least some embodiments.

FIG. 20 is a graph of rotor torque versus rotation angle when the rotor 73 is operating at 900 RPM, according to an example embodiment. FIG. 21 is a graph of rotor torque versus time when the rotor 73 is operating at 900 RPM, according to an example embodiment. The graphs indicate that torque output is oscillatory with significant ripples. In some cases, as shown in the graph here, the maximum torque value is 60 Nm.

Figure 22:
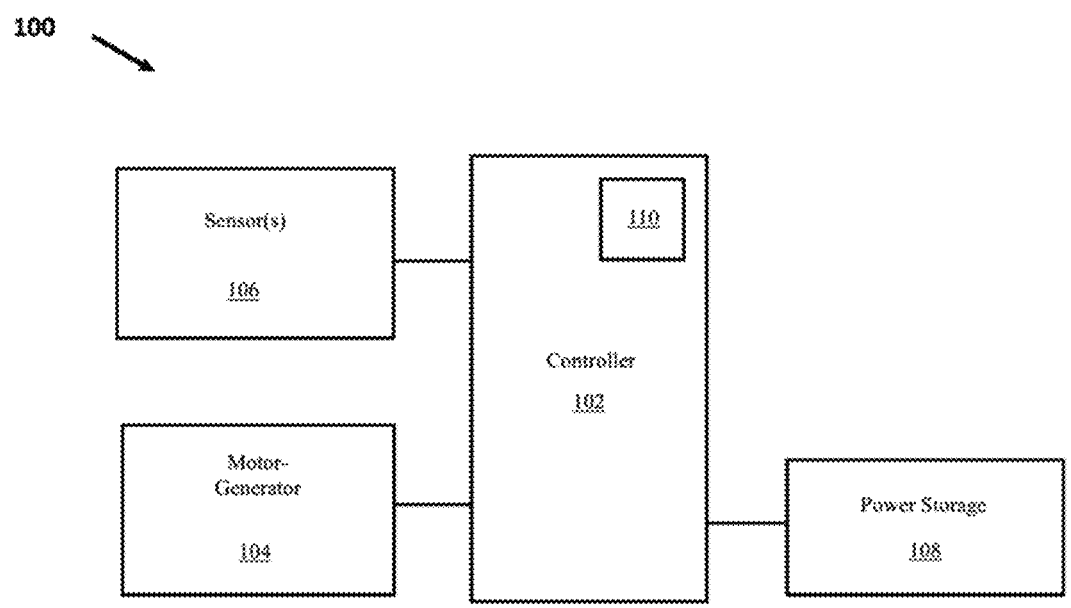
FIG. 22 is a block diagram of a system for controlling a motor and/or a generator, such as AFSRM, in accordance with at least some embodiments.

FIG. 22 is a block diagram of an axial flux switched reluctance motor/generator system 100. The axial flux switched reluctance motor/generator system 100 includes a controller 102. The controller 102 may include a processor and/or computer system 110. The system 100 may also include a power source 1 and/or storage 108 which may, for example, include one or more batteries capable to receiving and storing electrical energy when the axial flux switched reluctance motor-generator 104 operates as a generator or outputting torque power when the axial flux switched reluctance motor-generator 104 operates as a motor. The system 100 may include one or more sensors 106 configured to sensor one or more conditions associated with the motor-generator 104 such as, without limitation, the motor-generator 104 rotor assembly speed of rotation, the motor-generator 104 rotor assembly angular position, the motor-generator 104 temperature, the motor-generator 104 output or input current, and/or the motor-generator 104 voltage. The controller 102 may utilize a processor 110 to receive sensor data from the one or more sensors 106 and, based on the sensor data, control one or more operations of motor-generator 104. Further details regarding processor 110 are described with respect to FIG. 23.

The axial flux switched reluctance motor/generator system 100 may include a stator assembly arranged to generate a rotating electromagnetic field in response to a control signal from the controller 102. The system 100 may also include a rotor assembly, positioned adjacent to the stator assembly, arranged to rotate in response to the rotating electromagnetic field. One or more sensors 106 can be arranged to detect an angular position of the rotor assembly and output sensor data based on the angular position of the rotor assembly, among other conditions of motor-generator 104. The controller 102 can be arranged to receive the sensor data and adjust the control signal based on the angular position of the rotor assembly to adjust a torque associated with the rotor assembly when the system 100 functions as a motor or to adjust a power output from the stator assembly when the system 100 functions as a generator. The one or more sensors may be arranged to detect one or more additional axial flux switched reluctance motor/generator system 100 conditions including, for example, a rotor assembly speed, stator current, stator voltage, and state machine temperature. The controller 102 may be configured to adjust the control signal to, thereby, adjust an operation of axial flux switched reluctance motor-generator 104, based on the sensor data associated with multiple detected conditions of the motor-generator 104.

System 100 and various implementations of rotor-stator configurations eliminate the need for rare Earth magnets and copper conductors in, for example, an axial flux switched reluctance motor-generator 104. However, in some other cases, rare Earth magnets and/or copper conductors can still be utilized to amplify the performance of an the axial flux switched reluctance motor-generator 104. In some cases, a differentiation of motor-generator 104 with respect to conventional systems includes leveraging reluctance to generate torque or electrical power. The system, devices, and methods described herein include electromagnets suitable for integration into electric motors and/or generators which have flux characteristics comparable to rare Earth magnets. In some cases, a magnetic circuit is provided which includes the electromagnets integrated into the salient stator poles, and the electromagnets utilize low cost and readily available steel alloys. Examples of steel alloys include, without limitation, stainless steel, duplex stainless steel, maraging steel, carbon steel Vanadium, high-speed steel, Titanium, Forromolybdenum, HSLA steel, Alloy 20, Ferromanganese, Ferronickel, chrome steel, Chromium-vanadium steel, electrical steel, Damascus steel, AL-6XN, Spring steel Bulat steel, ANSI 4145, Microalloyed steel, and Moybdenum. The aforementioned components can be configured and oriented in such a way to improve the flux path for each phase resulting in reduced power consumption and increased torque. In some cases, the heat generation of, for example, the axial flux switched reluctance motor-generator 104 has been significantly improved due to the geometric construction of the electromagnets. In some cases, the method of electrical excitation also helps control the heat generation.

Figure 23:
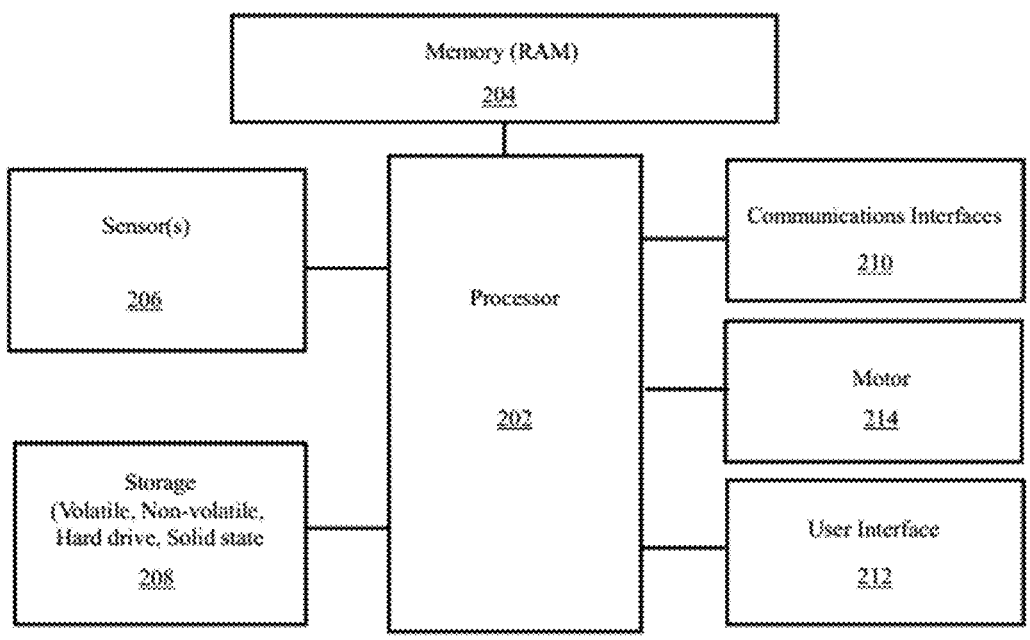
FIG. 23 is a diagram of a computer system implemented for use in the controller, in accordance with at least some embodiments.

FIG. 23 shows a diagram of a processor and/or computer system 200 that may be implemented in, for example, a controller 102. The processor system 200 could represent a processing system within a motor and/or generator controller such as described in FIG. 23, e.g., processor 110 of the controller 102. Processor and/or computer system 200 may include a microcontroller, a processor, a system-on-a-chip (SoC), a client device, and/or a physical computing device and may include hardware and/or virtual processor(s). In some implementations, processor system 200 and its elements as shown in FIG. 23 each relate to physical hardware and in some implementations one, more, or all of the elements could be implemented using emulators or virtual machines. Regardless, processor system 200 may be implemented on physical hardware.

As also shown in FIG. 23, processor system 200 may include a user interface 212, having, for example, a keyboard, keypad, touchpad, or sensor readout (e.g., biometric scanner) and one or more output devices, such as displays, speakers for audio, LED indicators, and/or light indicators. Processor and/or computer system 200 may also include communications interfaces 210, such as a network communication unit that could include a wired communication component and/or a wireless communications component, which may be communicatively coupled to one or more components of controller 102. The network communication unit may utilize any of a variety of proprietary or standardized network protocols, such as Ethernet, TCP/IP, to name a few of many protocols, to effect communications between processor 202 and another device, network, or system. Network communication units may also comprise one or more transceivers that utilize the Ethernet, power line communication (PLC), Wi-Fi, cellular, and/or other communication methods.

Processor and/or computer system 200 may include a processing element, such as controller and/or processor 202, that contains one or more hardware processors, where each hardware processor may have a single or multiple processor cores. In one implementation, the processor 202 includes at least one shared cache that stores data (e.g., computing instructions) that are utilized by one or more other components of processor 202. For example, the shared cache may be a locally cached data stored in a memory for faster access by components of the processing elements that make up processor 202. Examples of processors include, but are not limited to a central processing unit (CPU) and/or microprocessor. Controller and/or processor 202 may utilize a computer architecture base on, without limitation, the Intel® 8051 architecture, Motorola® 68HCX, Intel® 80X86, and the like. Processor 202 may include, without limitation, an 8-bit, 12-bit, 16-bit, 32-bit, or 64-bit architecture. Although not illustrated in FIG. 16, the processing elements that make up processor 202 may also include one or more other types of hardware processing components, such as graphics processing units (GPUs), application specific integrated circuits (ASICs), field-programmable gate arrays (FPGAs), and/or digital signal processors (DSPs). It may include an ASIC designed to run adaptive AI at the edge such as Google Edge TPU (Tensor Processing Unit) or other ASICs for deep learning, training, and inference, to optimize performance.

FIG. 23 illustrates that memory 204 may be operatively and communicatively coupled to processor 202. Memory 204 may be a non-transitory medium configured to store various types of data. For example, memory 204 may include one or more storage devices 208 that include a non-volatile storage device and/or volatile memory. Volatile memory, such as random-access memory (RAM), can be any suitable non-permanent storage device. The non-volatile storage devices 208 may include one or more disk drives, optical drives, solid-state drives (SSDs), tape drives, flash memory, read-only memory (ROM), and/or any other type memory designed to maintain data for a duration time after a power loss or shut down operation. In certain configurations, the non-volatile storage devices 208 may be used to store overflow data if allocated RAM is not large enough to hold all working data. The non-volatile storage devices 208 may also be used to store programs that are loaded into the RAM when such programs are selected for execution. Data store and/or storage devices 208 may be arranged to store a plurality of motor control instruction programs associated with operating a motor. Such control instruction programs may include instruction for controller and/or processor 202 to: run, adjust speed, start or stop one or more motors 104 and/or 214 (e.g., a drive motor for an electric vehicle). The motor 104 and/or 214 refer to the embodiments of the AFSRM described in this application.

Persons of ordinary skill in the art are aware that software programs may be developed, encoded, and compiled in a variety of computing languages for a variety of software platforms and/or operating systems and subsequently loaded and executed by processor 202. In some cases, the compiling process of the software program may transform program code written in a programming language to another computer language such that the processor 202 is able to execute the programming code. For example, the compiling process of the software program may generate an executable program that provides encoded instructions (e.g., machine code instructions) for processor 202 to accomplish specific, non-generic, particular computing functions.

In some cases, after the compiling process, the encoded instructions are loaded as computer executable instructions or process steps to processor 202 from storage 208, from memory 204, and/or embedded within processor 202 (e.g., via a cache or on-board ROM). Processor 202 may be configured to execute the stored instructions or process steps in order to perform instructions or process steps to transform the processor and/or computer system 200 into a non-generic, particular, specially programmed machine or apparatus. Stored data, e.g., data stored by a data store and/or storage device 208, may be accessed by processor 202 during the execution of computer executable instructions or process steps to instruct one or more components within processor system 200 and/or other components or devices external to system 200.

In some cases, a user interface 212 includes a display, positional input device (such as a mouse, touchpad, touchscreen, or the like), keyboard, keypad, one or more buttons, or other forms of user input and output devices. The user interface components may be communicatively coupled to processor 202. When the user interface output device is or includes a display, the display can be implemented in various ways, including by a liquid crystal display (LCD) or a cathode-ray tube (CRT) or light emitting diode (LED) display, such as an OLED display. Sensors 206 may include one or more sensors that detect and/or monitor conditions within or surrounding system 200 and/or within or surrounding a motor such as motor 104 and/or 214. Conditions may include, without limitation, rotation, speed of rotation, and/or movement of a device or component (e.g., a motor), temperature, pressure, current, position of a device or component (e.g., angular position of a rotor). Persons of ordinary skill in the art are aware that electronic processing systems, such as system 200, may include other components well known in the art, such as power sources, e.g., power source 108, and/or analog-to-digital converters, not explicitly shown in FIG. 23.

In some cases, processor and/or computer system 200 and/or processor 202 includes an SoC having multiple hardware components, including but not limited to:

a microcontroller, microprocessor or digital signal processor (DSP) core and/or multiprocessor SoCs (MP-SoC) having more than one processor cores;

memory blocks including a selection of read-only memory (ROM), random access memory (RAM), electronically erasable programmable read-only memory (EEPROM) and flash memory;

timing sources including oscillators and phase-docked loops;

peripherals including counter-timers, real-time timers and power-on reset generators;

external interfaces, including industry standards such as universal serial bus (USB), FireWire, Ethernet, universal synchronous/asynchronous receiver/transmitter (USART), serial peripheral interface (SPI);

analog interfaces including analog-to-digital converters (ADCs) and digital-to-analog converters (DACs); and voltage regulators and power management circuits.

In some cases, a SoC includes both the hardware, described above, and software controlling the microcontroller, microprocessor and/or DSP cores, peripherals and interfaces. Most SoCs are developed from pre-qualified hardware blocks for the hardware elements (e.g., referred to as modules or components which represent an IP core or IP block), together with software drivers that control their operation. The above listing of hardware elements is not exhaustive. A SoC may include protocol stacks that drive industry-standard interfaces like a universal serial bus (USB).

In some cases, after the overall architecture of the SoC has been defined, individual hardware elements may be described in an abstract language called RTL which stands for register-transfer level. RTL is used to define the circuit behavior. Hardware elements are connected together in the same RTL language to create the full SoC design. In digital circuit design, RTL is a design abstraction which models a synchronous digital circuit in terms of the flow of digital signals (data) between hardware registers, and the logical operations performed on those signals. RTL abstraction is used in hardware description languages (HDLs) like Verilog and VHDL to create high-level representations of a circuit, from which lower-level representations and ultimately actual wiring can be derived. Design at the RTL level is typical practice in modern digital design. Verilog is standardized as Institute of Electrical and Electronic Engineers (IEEE) 1364 and is an HDL used to model electronic systems. Verilog is most commonly used in the design and verification of digital circuits at the RTL level of abstraction. Verilog may also be used in the verification of analog circuits and mixed-signal circuits, as well as in the design of genetic circuits. In some implementations, various components of processor system 200 are implemented on a printed circuit board (PCB).

Pulsed Timing and Trigger Controller (PTTC)

In some cases, the systems, methods, and devices described herein include an axial flux switched reluctance motor and/or generator that utilizes geometry and flux generating components. In some cases, the controller 102 is configured and/or operates to complement and optimize the performance of a reluctance motor and/or generator, such as state machine system 100. Reluctance motors and/or generators can generate mechanical output (e.g., in the form of torque) or electrical output (e.g., in the form of electrical power) depending on the application.

Traditionally, reluctance motors and/or generators operating as a motor are notoriously difficult to control due to a phenomenon known as torque ripple. Torque ripple is the difference between maximum and minimum torque during one revolution. Torque ripple can result in vibration and audible noise during motor operation.

Pulsed Trigger & Timing Controller (PTTC), Magnetic Field Energy Storage Configuration (MFESC)

Figure 24:
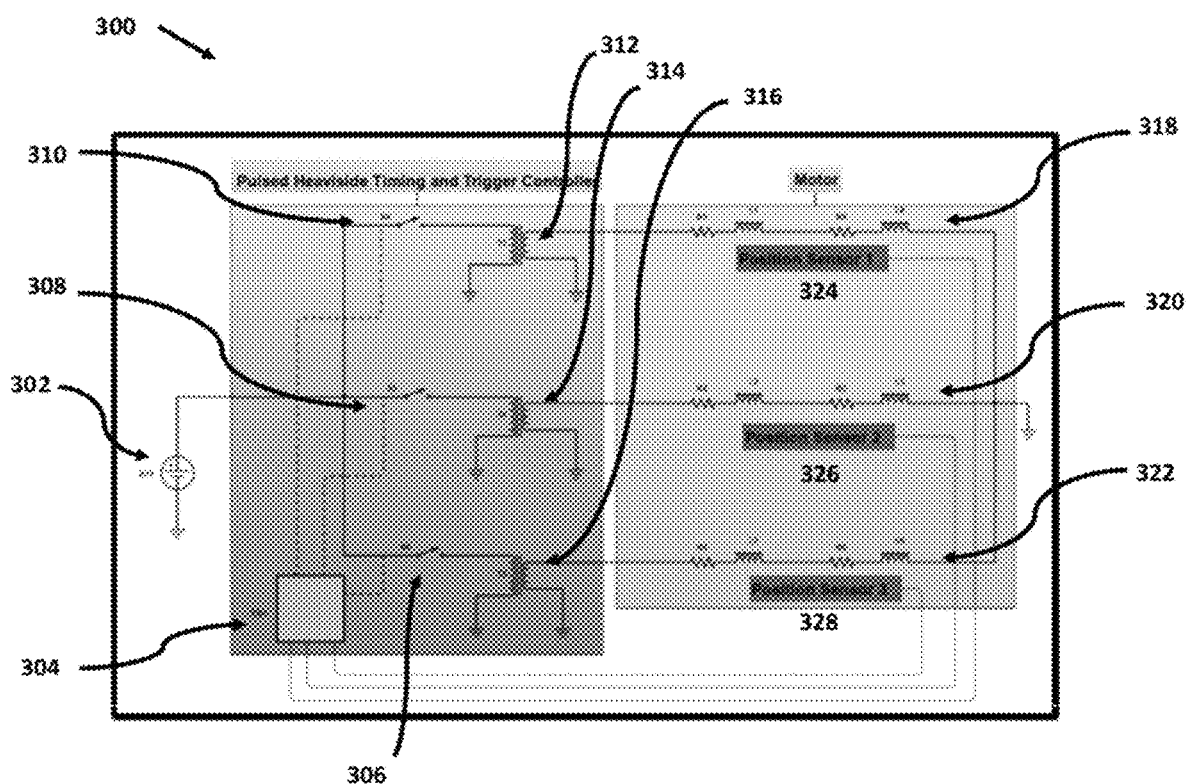
FIG. 24 is a schematic diagram of a motor control system including inductive energy storage, in accordance with at least some embodiments.

FIG. 24 shows a schematic diagram of an example embodiment of a motor control system 300 including inductive energy storage where controller 102 and/or control system 300 operates a PTTC using MFESC to compensate for torque ripple. System 300 may be coupled to each phase of a motor stator such as stator windings 318, 320, and 322. In some cases, stator winding 318 corresponds to a phase A stator pole pair and its respective coils; stator winding 320 corresponds to a phase B stator pole pair and its respective coils; and stator winding 322 corresponds to a phase C stator pole pair and its respective coils. In some cases, the system 300 includes sensors 324, 326, and 328 that are arranged to detect conditions of a motor such as rotor assembly speed of rotation, rotor assembly angular position, and/or motor temperature. Processor 304 and/or processor 110 may control switches 306, 308, and 310, each being in electrical communication with corresponding stator windings 318, 320, and 322 and transformers 312, 314, and 316. When a corresponding switch 306, 308, and/or 310 is closed, power source 302 provides a control signal including an electrical signal to transformer 312, 314, and 316 respectively to store magnetic energy in their primary windings. When a corresponding switch 306, 308, and/or 310 is opened, the magnetic field in transformer 312, 314, or 316 collapses and electrical current is discharged from the secondary windings to a corresponding stator winding 318, 320, and 322.

Processor 304 and/or 110 receives sensor data from sensors 324, 326, and 328 and, based on the sensor data, controls the operation of switches 312, 314, and 316 to determine when addition electrical current has to be supplied to each stator winding 318, 320, and 322. Although not shown in FIG. 24, processor 304 and/or 110 may also control aspects of a control signal from power source 302 to adjust frequency of the control signal and, thereby, adjust the speed of rotation of a rotor assembly. The operating principle of the MFESC PTTC 300 is the storage of electrical energy in the primary coil of a step-down transformer such as in transformer 312, 314, and 316. The energy stored in the primary coil is in the form of a magnetic field. When the current to the primary coil of the step-down transformer 312, 314, or 316 is switched off by opening switch 310, 308 or 306, the magnetic field collapses inducing a large current & voltage in the secondary coil of the step-down transformer. The electrical energy induced in the secondary coil is channeled into one of the three phases of the reluctance motor via stator windings 318, 320, and 322. The release of stored magnetic energy is triggered by the angular position of the rotor that was detected via sensor 324, 326, and/or 328. When the rotor assembly reaches a predetermined angular position, the current to the primary side coil is switched off, i.e., switch 310, 308, or 310 is opened, resulting in the corresponding motor phase winding 318, 320, and 322 being energized, resulting in flux generation. This flux generation results in torque generation that drives rotation of the rotor assembly. Such a technique can reduce torque ripple by providing a boost of electrical energy at instances when the excitation drops due to the angular position of a rotor during rotation. In some cases, the transformers 312, 314, 316 may also act to galvanically isolate the AFSRM from other electrical control devices. In some cases, the MFESC PTTC may also act to smooth the voltage and current supplied to the AFSRM. In some cases, the MFESC PTTC may facilitate rapidly digitally pulsing electrical power to the AFSRM.

Pulsed Trigger & Timing Controller (PTTC), Electric Field Energy Storage Configuration (EFESC)

Figure 25:
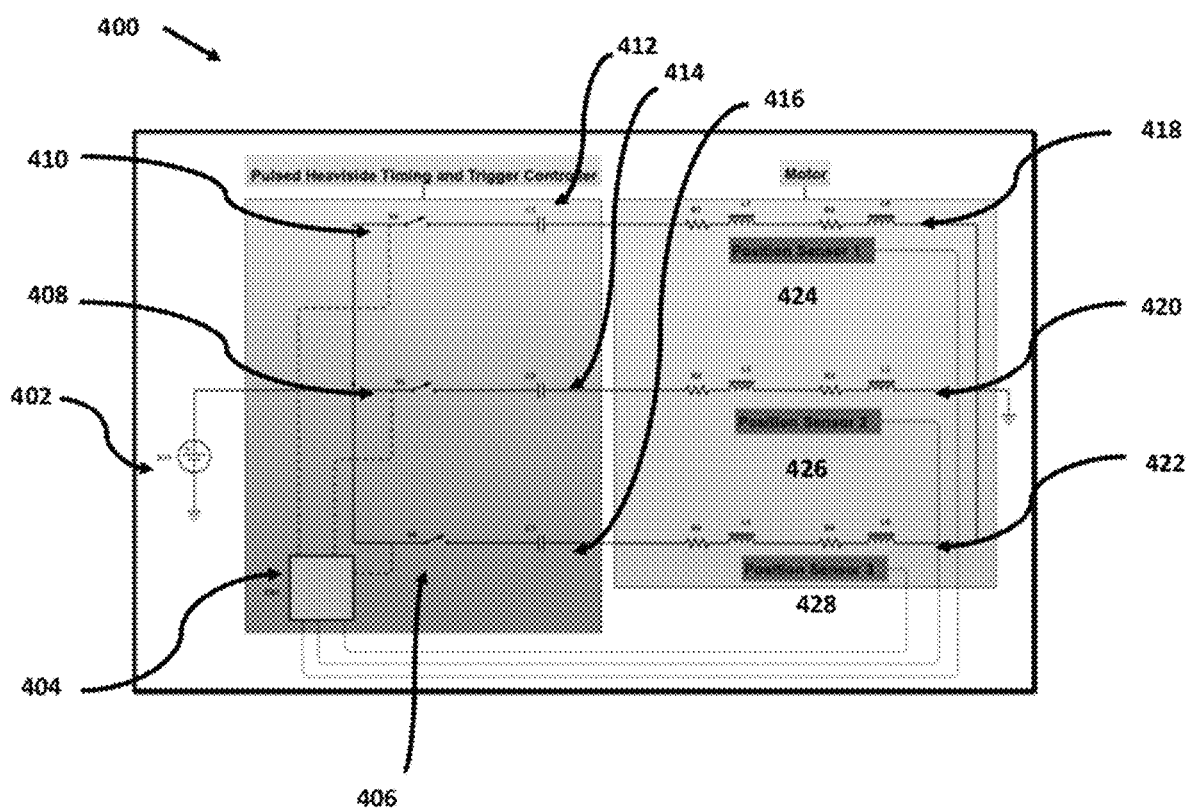
FIG. 25 is a schematic diagram of a motor control system including electrical energy storage, in accordance with at least some embodiments.

FIG. 25 shows a schematic diagram of a motor control system 400 including electrical energy storage where controller 102 and/or control system 400 operates a PTTC using EFESC to compensate for torque ripple. System 400 may be coupled to each phase of a motor stator such as stator windings 418, 420, and 422. In some cases, stator winding 418 corresponds to a phase A stator pole pair and its respective coils; stator winding 420 corresponds to a phase B stator pole pair and its respective coils; and stator winding 422 corresponds to a phase C stator pole pair and its respective coils. System 400 may include sensors 424, 426, and 428 that are arranged to detect conditions of a motor such as rotor assembly speed of rotation, rotor assembly angular position, and/or motor temperature. Processor 404 and/or processor 110 may control switches 406, 408, and 410, each being in electrical communication with corresponding stator windings 418, 420, and 422 and capacitors 412, 414, and 416. The operating principle of the EFESC PTTC 404 and/or 110 is the storage of electrical energy in a capacitor. The energy stored in the capacitor, e.g., capacitor 412, 414, and 416, is in the form of an electric field. When a capacitor, e.g., capacitor 412, is triggered a large pulse of current and voltage is channeled into one of the three phases of the reluctance motor, e.g., motor phase windings 418. The release of stored electrical energy is triggered by processor 404 and/or 110 opening switch 410 based on the angular position of the rotor. When the rotor reaches a predetermined angular position, switch 410 is opened by processor 404 and capacitor 412 is discharged resulting in the motor phase winding 418 being energized, resulting in flux generation. This flux generation results in torque generation to drive the rotor assembly. Such a technique can reduce torque ripple by providing a boost or pulse of electrical energy at instances when the excitation drops due to the angular position of a rotor during rotation.

In some cases, the transformers 312, 314, 316 may also act to galvanically isolate the AFSRM from other electrical control devices. In some cases, the EFESC PTTC may also act to smooth the voltage and current supplied to the AFSRM. In some cases, the EFESC PTTC may facilitate rapidly digitally pulsing electrical power to the AFSRM.

Pulsed Trigger & Timing Controller (PTTC), Non-Sinusoidal Rotating Magnetic Field Electric motors operate on the principle of a rotating magnetic field. As the field rotates, the rotor attempts to align itself with the rotating field resulting in rotation. Typically, this is achieved utilizing a sinusoidal input for each phase with the current & voltage alternating between positive and negative values resulting in a rotating magnetic field. The present systems, devices, and methods herein include a technique for creating rotating magnetic fields using a DC input where each half phase is excited either negatively or positively resulting in a rotating magnetic field.

Pulsed Trigger & Timing Controller (PTTC), Torque Optimization Algorithm (TOA)

For a reluctance motor, a controller such as controller 102 may implement a TOA to adjust the excitation of each phase based on rotor position, rotor speed, mechanical load, and/or heat generation. The aforementioned inputs are monitored via sensors such as sensors 106 that output corresponding sensor data. Controller 102 may, based on the sensor data, generate an optimum output excitation for each phase.

Pulsed Trigger & Timing Controller (PTTC), Power Generation Optimization Algorithm (PGOA)

For a reluctance generator, controller 102 may implement a PGOA whereby sensors 106 detect and/or monitor rotor assembly speed and position, and controller 102, based on the sensor data from sensors 106, controls inverting the excitation circuit for each phase to allow current generation. The output power can be filtered through an external DC-DC conditioner to provide the desired DC power to an energy storage device, e.g., power storage 108. For DC power generation, an AC to DC inverter may be implemented. Mechanical inputs required to spin a reluctance generator tend to be nonlinear with significant speed variation. Controller 102, implementing the PGOA algorithm, can closely monitor internal temperatures via sensor data from a sensor 106 and then adjust power output as required to prevent over temperature of the generator.

Depending on the speed of the rotor assembly, energizing of the motor phase will require timing advancement or retarding. As the rotor assembly speed increases, the electrical energy exciting the motor phase will need to increase in intensity and shorten in terms of duration by, for example, controller 102. As the rotor assembly speed decreases, the electrical energy exciting the motor phase will need to decrease in intensity and increase in terms of duration. In some implementations, controller 102 can modulate energy intensity and duration based on the requirements of the motor phase. Controlling the intensity and duration of phase excitation can also be used to balance phases and mitigate vibration and noise resulting from torque ripple.

Conventionally, this type of control strategy has been used for ignition timing in combustion engine applications for over five decades. Utilizing capacitance or inductance battery voltage is amplified many orders of magnitude to ignite combustion gasses in the cylinder at top dead center of the compression stroke. In various implementations, controller 102 can implement this type of control technique, the difference being an amplification of current instead of voltage. The amplified current is then used to generate flux in the electromagnets of a motor. The above-described motor control techniques improve motor operation by: reducing the complexity of the power timing, and control circuitry; reducing motor power consumption; improving motor thermal profile (i.e., heat generation reduction; reducing Mean Time To Repair (MTTR); and reducing Mean Down Time (MDT)

FIGS. 26 to 37 show exemplary rotor-stator assembly geometric configurations related to reluctance type motor generators which enable enhanced torque and power generators with or without the use of rare Earth metals.

Figure 26:
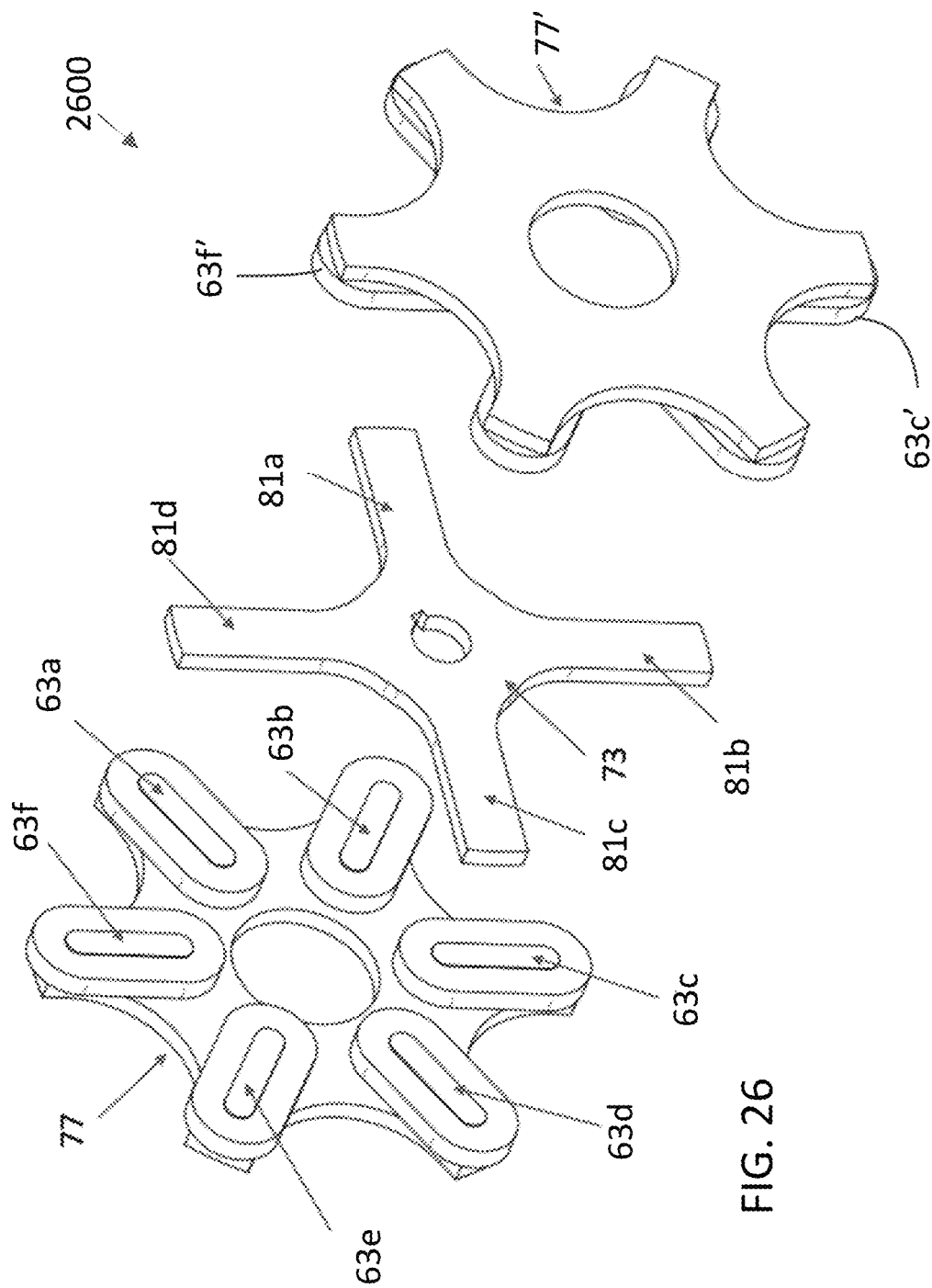
FIG. 26 is an exploded view of an AFSRM that includes two stators and one rotor, in accordance with at least some embodiments.

Referring to FIG. 26, in some cases, an example embodiment of an AFSRM 2600 comprises two stators 77 and 77' and a single rotor 73. An exploded view of the components is shown. Each of the stators 77 and 77' include three sets of pole pairs that can be energized according to phases: Phase A (e.g., comprising a first pole pair 63f and 63c), Phase B (e.g., comprising a second pole pair 63b and 63e), and Phase C (e.g., comprising a third pole pair 63a and 63d). A rotor 73 having four poles 81a, 81b, 81c, 82d. The two stators are operated by the same control circuit.

In particular, in FIG. 26, the rotor 73 is positioned between two stators. The front faces 69 of the bobbins from a first stator, and the corresponding front faces 69 of a second stator are aligned with each other and face each other. In other words, the stator 77 and the stator 77' face each other, with the rotor 73 positioned therebetween. In an example embodiment, the coils on stator poles 63f and 63c on the stator 77 and the coils on stator poles 63f' and 63c' on the stator 77' are energized at the same time. When the rotor pole 81d is aligned between both the stator poles 63f and 73f', and the rotor pole 81b is aligned between both the stator poles 63c and 63c', a magnetic flux path flows in a loop from the stator 77 (e.g., via stator pole 63f), to the rotor 73 (e.g., via rotor pole 81d), to the stator 77' (e.g., via stator pole 63f'), to another part of the stator 77' (e.g., via stator pole 63c'), to the rotor 73 (e.g., via rotor pole 81b), and back to another part of the stator 77 (e.g., via stator pole 63c). The magnetic flux path traveling from the stator pole 63f to the rotor pole 81d and to the stator pole 63f' is parallel to the axis of rotation of the rotor. The magnetic flux path traveling from the stator pole 63c' to the rotor pole 81b and to the stator pole 63c is also parallel to the axis of rotation of the rotor.

Figure 27:
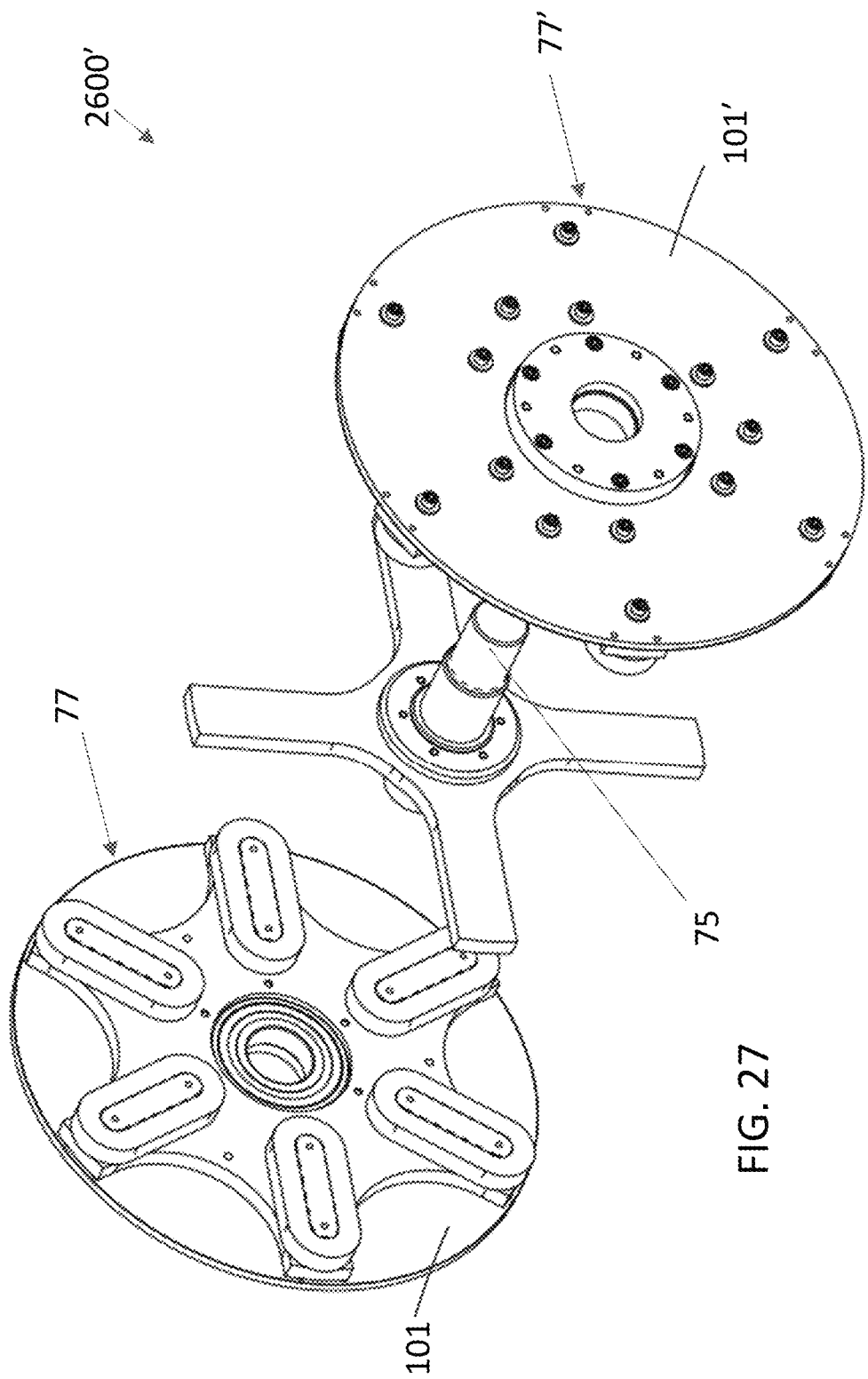
FIG. 27 is an exploded view of another AFSRM that includes two stators and one rotor, in accordance with at least some embodiments.
Figure 28:
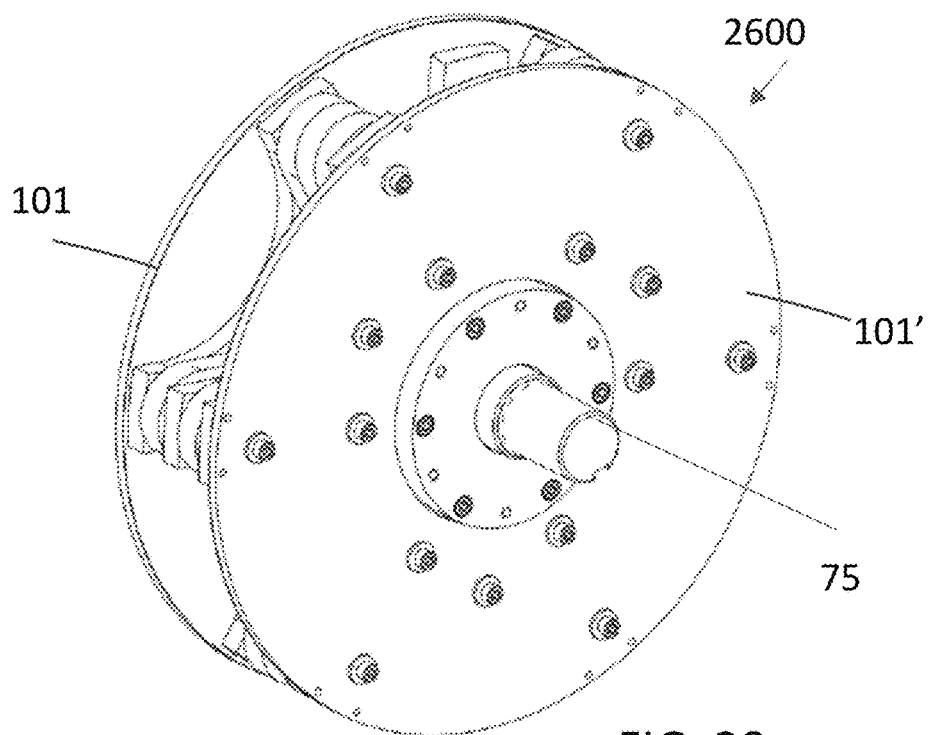
FIG. 28 is a perspective view of the AFSRM shown in FIG. 11.
Figure 29:
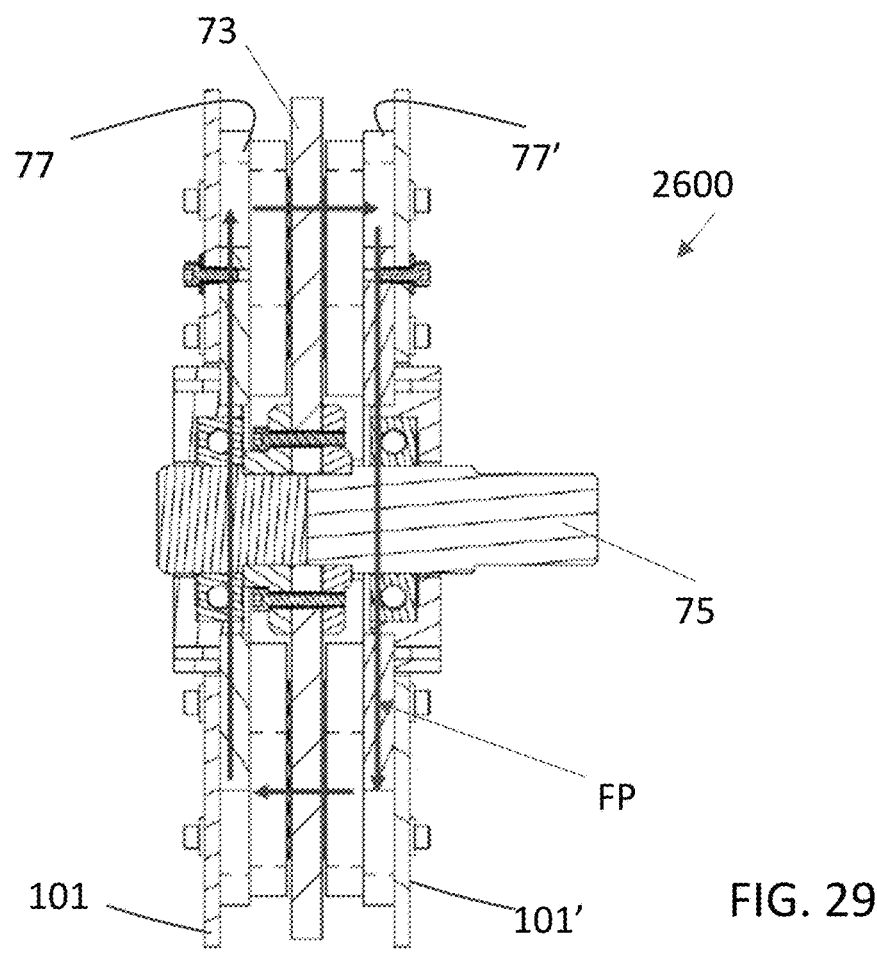
FIG. 29 is a cross-sectional side view of the AFRSRM shown in FIG. 11, and further showing a magnetic flux path, in accordance with at least some embodiments.

FIGS. 27, 28 and 29 show a similar embodiment of the AFSRM 2600, comprising two stators 77 and 77' and a single rotor 73. The AFSRM 2600' in FIGS. 27, 28 and 29 also includes backing plate 101 is fixed onto the stator 77, and a backing plate 101' is fixed onto the stator 77'. A shaft 75 runs through the center of the two stators 77 and 77' and the single rotor 73. In some cases, bearings are positioned between the shaft and the stators 77 and 77', so that the shaft can spin freely within the void of each stator 77, 77'.

FIG. 29 shows an example embodiment of a magnetic flux path FP in a loop.

Figure 30:
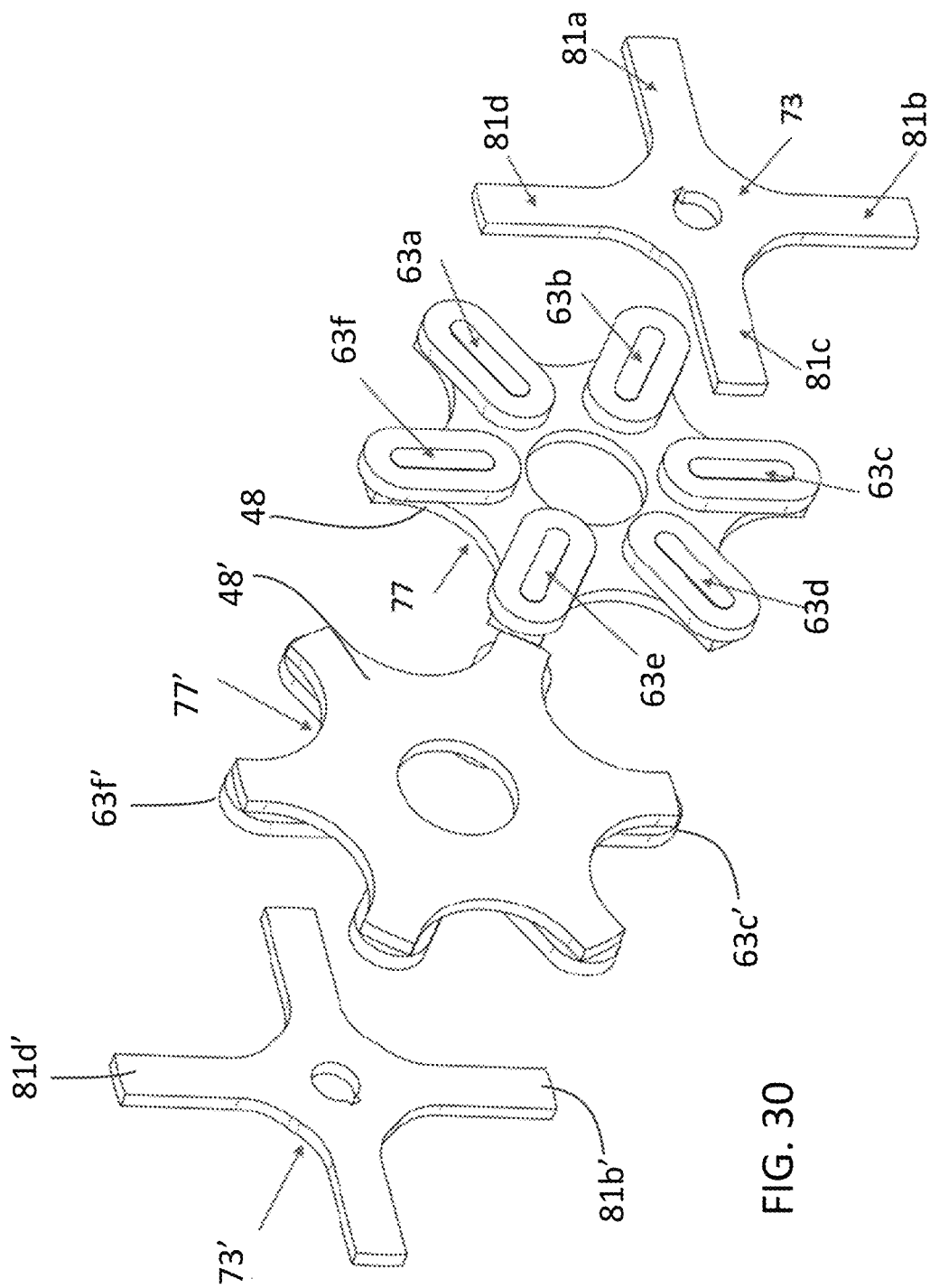
FIG. 30 is an exploded view of an AFSRM that includes two stators and two rotors, in accordance with at least some embodiments.

Referring to FIG. 30, in some cases, an AFSRM comprises an out-runner configuration with a first set of a stator 77 and a rotor 73, and a second set of a stator 77' and a rotor 73'. Each stator includes: Phase A (e.g., comprising a first pole pair 63f and 63c), Phase B (e.g., comprising a second pole pair 63b and 63e), Phase C (e.g., comprising a third pole pair 63a and 63d), two sets of rotor poles 81d and 81b, and rotor poles 81a and 81c. In some cases, the two stators 77 and 77' are operated by the same control circuit.

In some cases, the stator 77 and 77' face away from each other, or, in other words, have their rear surfaces 48 and 48' facing each other. For example, the configuration includes an assembly comprising of parts ordered as follows: a rotor 73', a stator 77', a stator 77, and a rotor 73. In other words, the rotors are on the outside surfaces. A shaft runs through the center of all these components and is coupled to the rotors 73 and 73', so that, in a motive application, two rotors 73 and 73' together act on the shaft to spin the shaft.

In some cases, the stator poles 63f' and 63f are axially aligned with each other, and the stator poles 63c' and 63c are axially aligned with each other. In some cases, the stator poles 63f' and 63f and the stator poles 63c' and 63c form Phase A, and these stator poles are electrically energized together by passing current through the respective coils.

In some cases, the AFSRM includes salient stator poles that each define a plane that is substantially perpendicular to the axis of rotation. In some cases, the AFSRM is a rotary type. In some cases, the AFSRM is a three-phase type. In some cases, the AFSRM is a single rotor, single stator configuration. In some cases, the AFSRM is dual stator, single rotor configuration. In some cases, the AFSRM is dual stator, dual rotor out runner configuration. In some cases, the AFSRM further includes an electrical control circuit operably attached to the coils of the stator. In some cases, the AFSRM is configured to operate as a motor-generator.

Figure 31A:
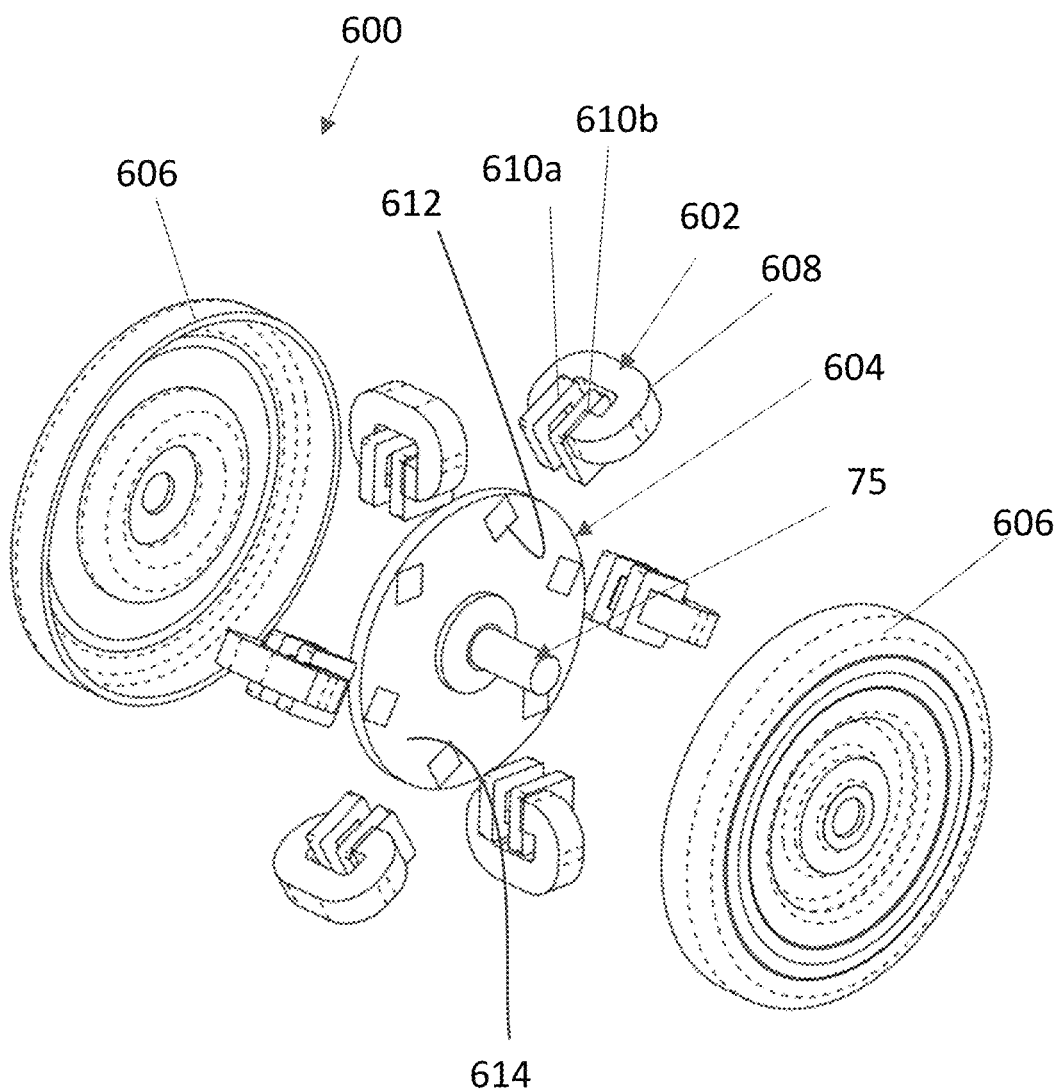
FIG. 31A is an exploded view of a single stator dual coil AFSRM, in accordance with at least some embodiments.
Figure 31B:
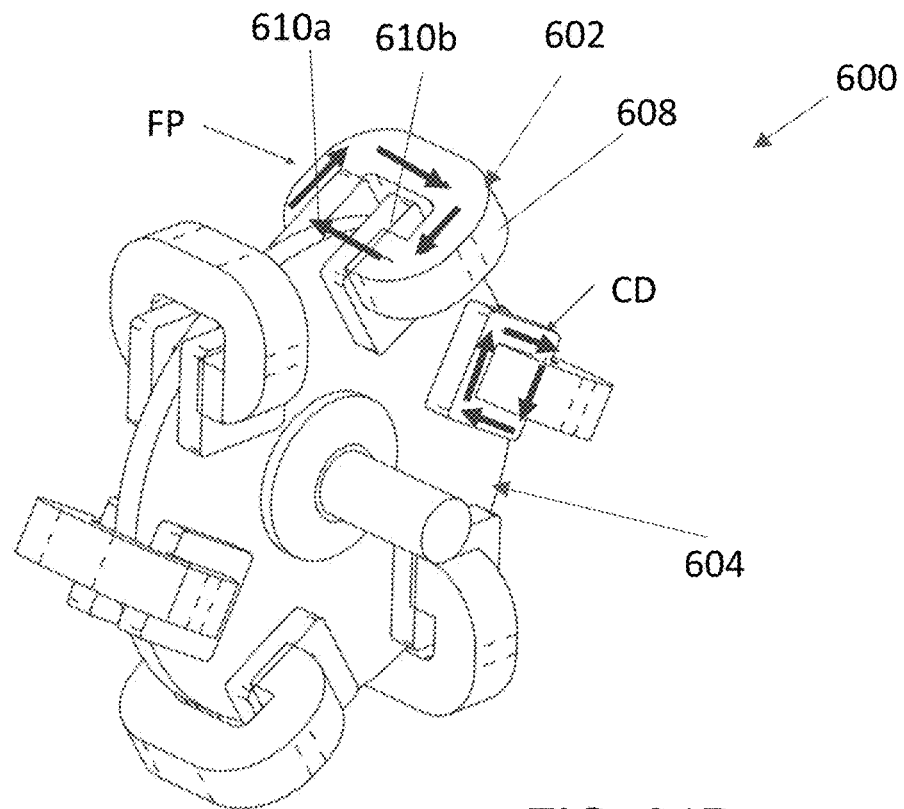
FIG. 31B is a perspective view of the AFSRM shown in FIG. 31A.
Figure 31C:
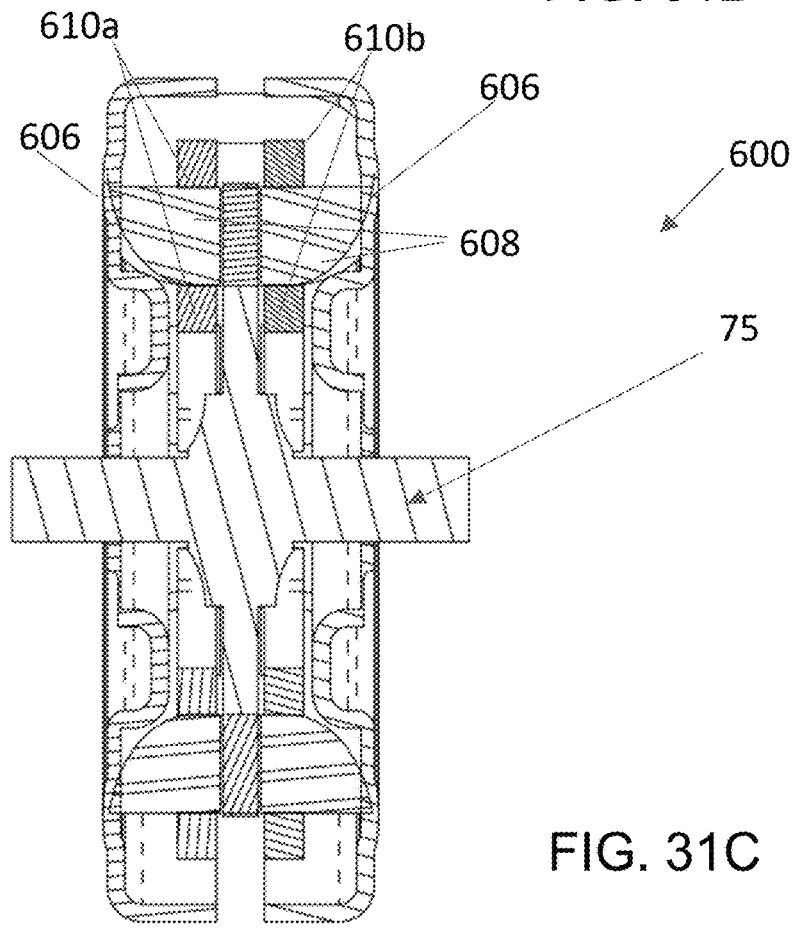
FIG. 31C is a cross-sectional view of the AFSRM shown in FIG. 31A.

FIGS. 31A, 31B and 31C show an embodiment of a single stator dual coil reluctance motor 600, which could also be applied as a generator. The motor 600 includes a rotor assembly 604 that is affixed to a shaft 75. The rotor assembly 604 is surrounded by six coil assemblies, e.g., stator poles 602, and a cover 606. The cover 606 holds the stator poles in position (i.e., stationary).

Each stator pole 602 includes a "C" shaped pole core 608 with ends that are spaced apart to allow the thickness of the rotor assembly 604 spin between the ends of the pole core. In some cases, the distance between the ends of the C-shaped pole core 608 is just slightly larger than the thickness of the rotor assembly 604. This allows magnetic flux fields to flow axially through the pole core ends and across the rotor. Each pole core end is wrapped with a coil 610a, 610b that can be simultaneously electrically energized. The pole core 602 is a ferromagnetic material, such as steel or a steel alloy, or some other matter. There are also several portions 612 embedded in the disc 614 of the rotor assembly 604. The portions 612 are, in some cases, made of a ferromagnetic material to facilitate the flow of magnetic flux through the rotor assembly, so that a magnetic field can loop through the C-shaped pole core 608 when the coils 610a, 610b are electrically energized.

As best shown in FIG. 31B, which does not include the cover 606, in some cases, the electrical current in the coils 610a, 610b flows in a clockwise direction (i.e., the electrical current direction CD). In such cases, the magnetic flux flows axially backwards through a portion 612 of the rotor 604 when the portion is at least partially aligned between the ends of the C-shaped pole core 608, and the magnetic flux path FP travels axially forwards through an arm portion of the C-shaped pole core which is positioned away from the perimeter of the rotor.

Figure 32A:
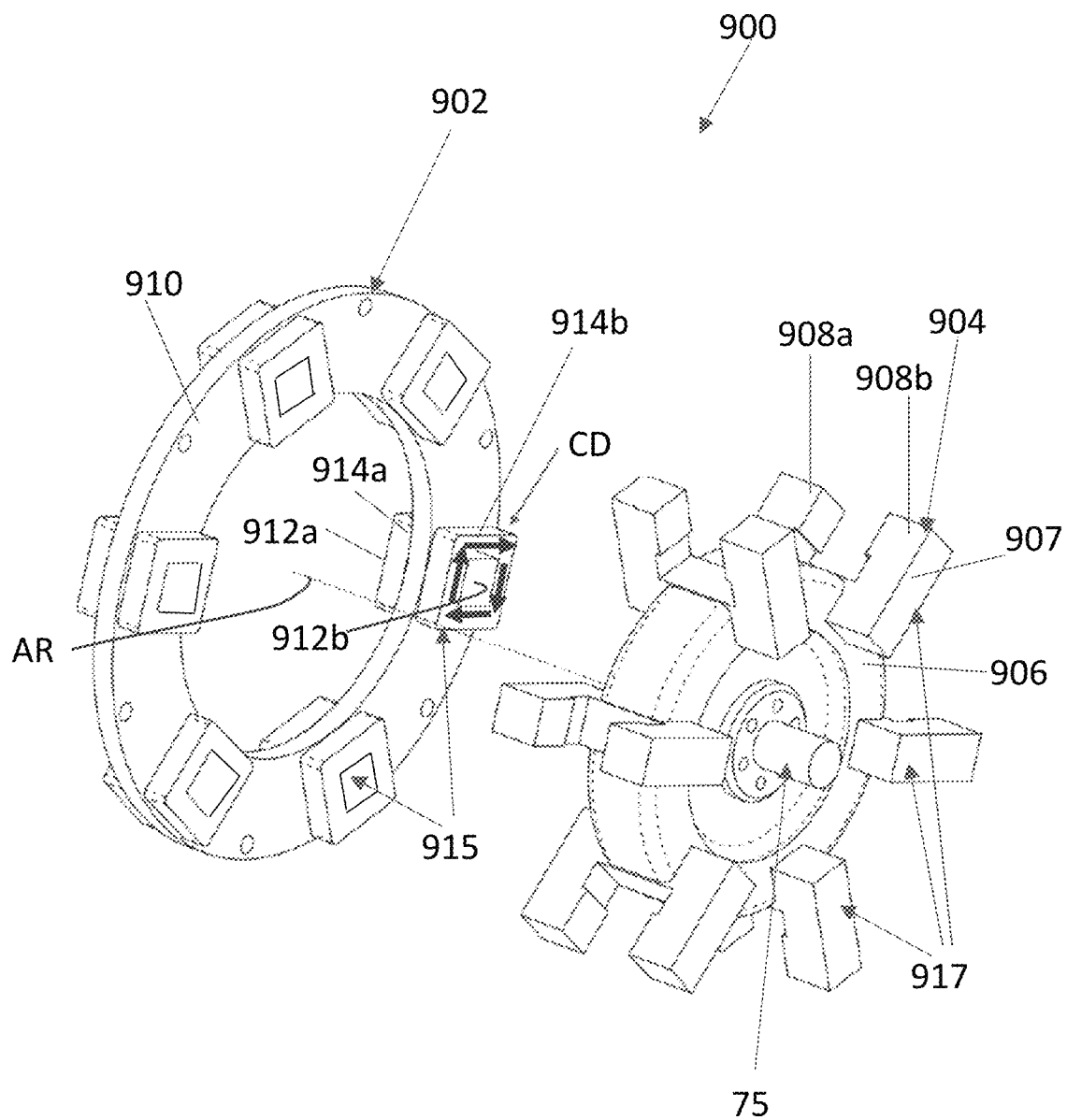
FIG. 32A is an exploded view of an out-runner single rotor AFSRM, in accordance with at least some embodiments.
Figure 32B:
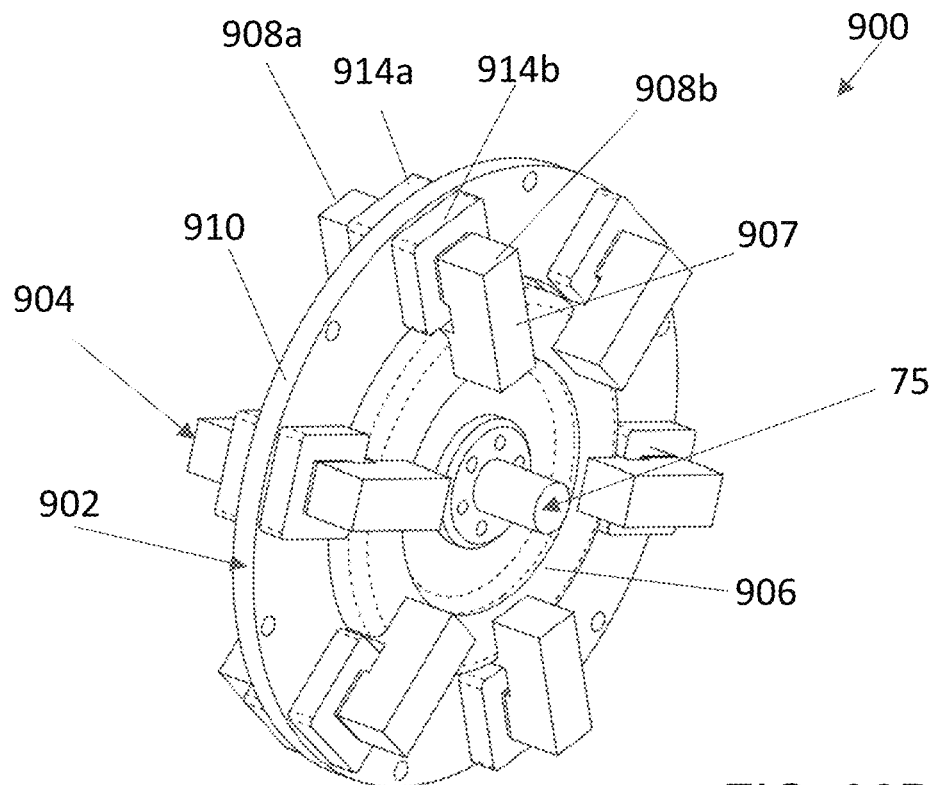
FIG. 32B is a perspective view of the AFSRM shown in FIG. 32A.
Figure 32C:
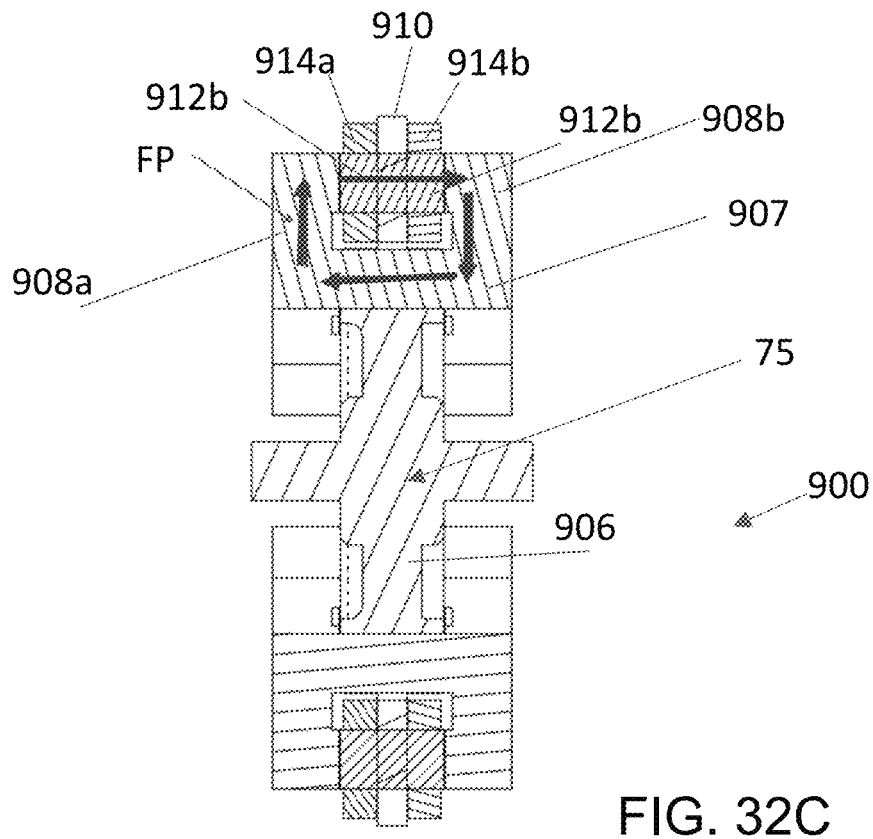
FIG. 32C is a cross-sectional view of the AFSRM shown in FIG. 32A.

FIGS. 32A, 32B, and 32C show an out-runner single rotor axial flux switched reluctance motor and/or generator 900, which includes a stator assembly 902 adjacent to rotor assembly 904. In particular, the stator assembly 902 includes a ring structure 910 that holds multiple salient stator poles 915. Each stator pole 915 includes a bobbin 912a and 912b protruding on opposite sides of the ring structure 910. The axis along which the bobbins 912a and 912b protrude is parallel to the axis of rotation AR of the rotor. In some cases, as seen in FIG. 36C, the bobbins 912a and 912b are a single component that is positioned through the ring structure 910, and oriented perpendicular to the plane defined by the ring structure 910. A coil 914a is wound around a bobbin 912a, and a coil 914b is wound around the bobbin 912b. The bobbins and the coils are illustrated with square-shaped profiles, but other profile shapes can be used, including circular shapes and other polygonal shapes.

The rotor assembly 904 includes multiple rotor poles 917. Each rotor pole 917 includes a C-shaped pole core 907 that includes two opposite facing pole core ends 908a, 908b that are separated apart from each other. In some cases, the distance between the two pole core ends 908a, 908b is just slightly larger than the distance between the ends of opposite protruding bobbins 912a, 912b.

In some cases, electrical current flows through the coils 914a, 914b and has a current flow CD in a clockwise direction, and this generates an axial magnetic flux path that travels from one end of the bobbin 912a to another end of the bobbin 912b, across to an pole core end 908b, along the pole core 907 to the opposite facing pole core end 908a, and back across to the end of the bobbin 912a. This forms a loop in the magnetic flux path FP as best seen in FIG. 36C. This occurs at each energized salient stator pole.

Figure 33A:
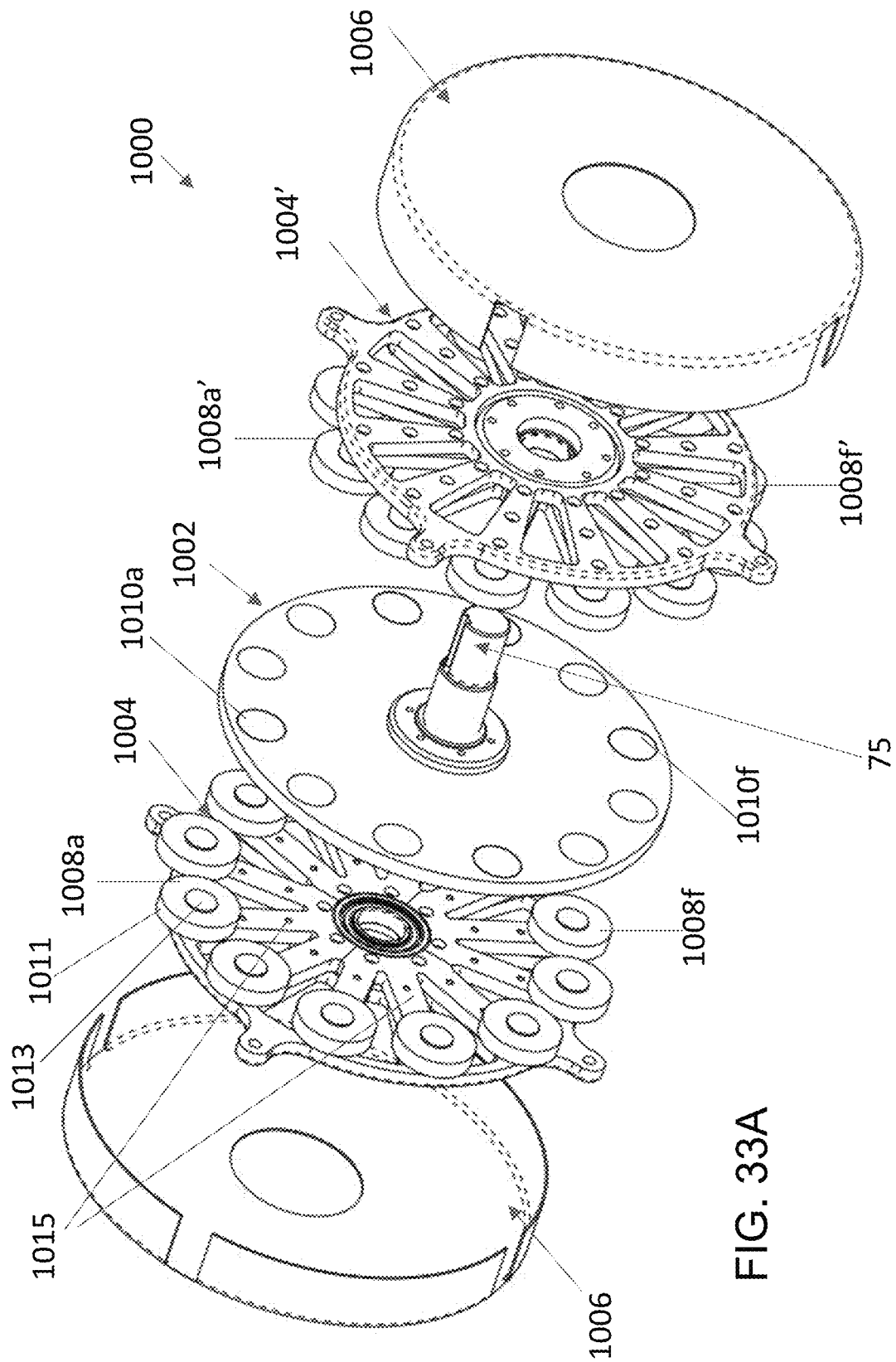
FIG. 33A is an exploded view of a zero gradient-flux dual stator AFSRM, in accordance with at least some embodiments.
Figure 33B:
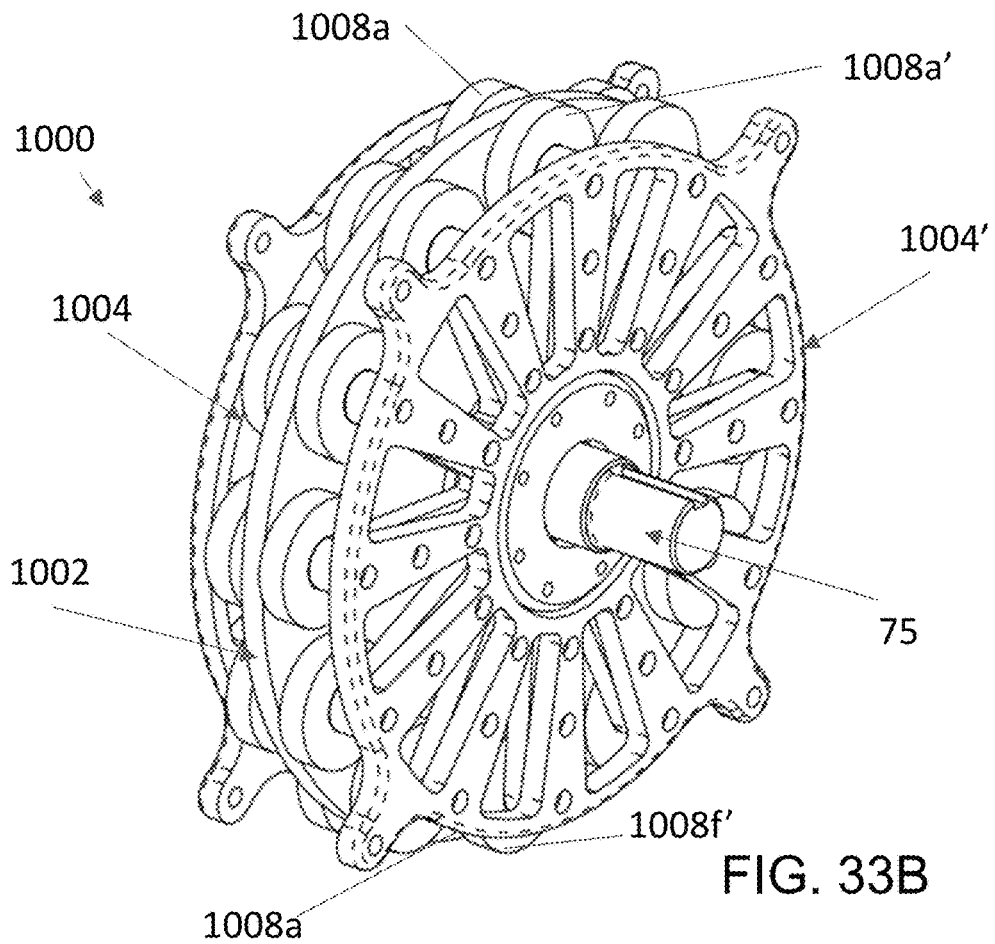
FIG. 33B is a perspective view of the AFSRM shown in FIG. 33A.
Figure 33C:
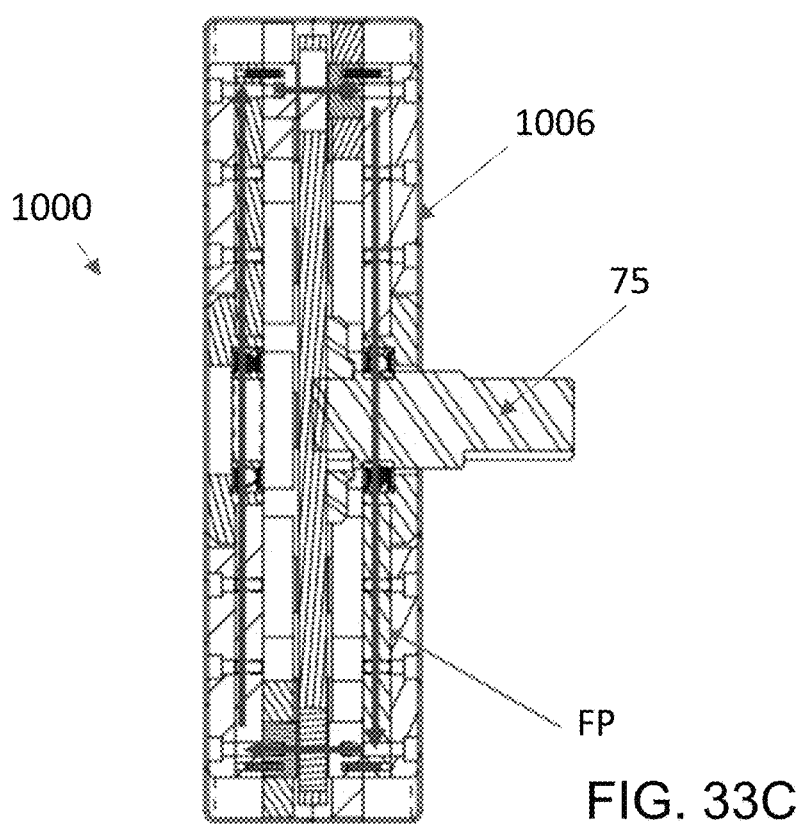
FIG. 33C is a cross-sectional view of the AFSRM shown in FIG. 33A.

Referring to FIGS. 33A, 33B, 33C, a zero gradient-flux dual stator axial flux switched reluctance motor and/or generator 1000 is provided, which includes a first stator assembly 1004, a rotor assembly 1002, and a second stator assembly 1004'. The rotor assembly 1002 is constrained at its opposite faces between the first stator assembly 1004 and the second stator assembly 1004'. A cover 1006 covers the stators and the rotor.

In this example embodiment, the stators each have twelve salient stator poles. Diametrically opposite positioned salient stator poles are considered a stator pole pair, and are electrically energized at the same time. Therefore, there are six stator pole pairs. More than one pair can be activated at the same time.

Each stator pole includes a bobbin that protrudes from the face of the stator in an axial direction parallel to the axis of rotation of the rotor. A coil is wound around the bobbin. The example of FIGS. 33A, 33B, 33C have some similarity to the embodiment of the AFSRM shown in FIGS. 26 to 29, but the embodiment of the zero gradient-flux dual stator axial flux switched reluctance motor and/or generator 1000 has more salient stator poles.

In the example shown in at least FIG. 33A, a salient stator pole 1008a and a salient stator pole 1008f on the first stator 1004, and corresponding salient stator poles 1008a' and 1008f' on the salient second stator 1004' are electrically energized at the same time by energizing the coils of these four salient stator poles. The magnetic flux path travels from the bobbin of the salient stator pole 1008a, across to one surface of a rotor pole 1010a and out an opposite facing surface of the rotor pole 1010a, across to a bobbin of the salient \ stator pole 1008a', along the stator body 1004' to a bobbin of the salient stator pole 1008f', across to one surface of a rotor pole 1010f and out an opposite facing surface of the rotor pole 1010f, across to a bobbin of the stator pole 1008f, and along the stator body 1004 back to the bobbin of the stator pole 1008a. This forms a magnetic flux path FP that loops, as best shown in FIG. 33C.

As best seen in FIG. 33A, the stator includes a spoked-wheel design with a number of spokes 1015 radially extending from the center of the stator. The front face of the spokes, which is also the front face of the stator, defines a plane. At the end of each spoke, a bobbin 1013 protrudes from the front face of the stator (or spoke). The axis along which each bobbin 1013 protrude (i.e., the bobbin's axis) is substantially parallel to the axis of rotation, and is substantially normal to the plane defined by the front face of the stator. A coil 1011 is wound around the bobbin 1013. This forms a salient stator pole. In this example embodiment, there are twelve spokes and twelve salient stator poles. The bobbin 1013 has a circular profile shape. In some cases, the bobbin's profile shape is a circle. The coil 1011 has a complementary shape, also being circular. In some cases, the coil 1011 has a circle profile shape. In some cases, the circle profile shape or circular profile shape of the bobbins and the provides a smoother flux gradient as the rotor poles pass over the salient stator poles.

In some cases, triangular or pie-shaped bobbins and coil configurations have been used in other electrical motors to optimize use of the circular shape of the motor, but this can lead to unsteady flux gradients in motor operation.

However, in some other embodiments of the AFSRM, different profile shapes can be used for the bobbin and the coil wound around the bobbin. These different profile shapes include, for example, squares, polygons, pie shapes, irregular shapes, or other round or oblong shapes.

Figure 34:
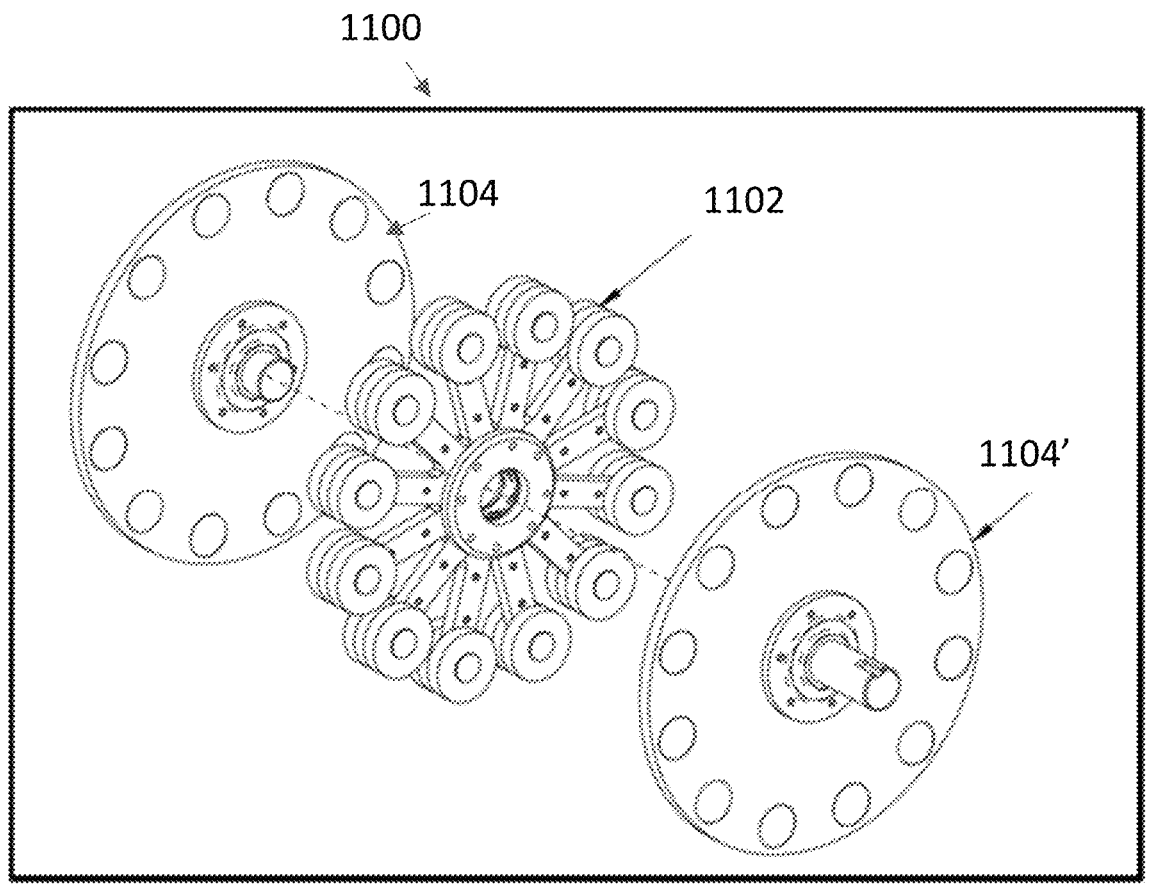
FIG. 34 is an exploded view of a zero gradient-flux out runner AFSRM, in accordance with at least some embodiments.

FIG. 34 shows a zero gradient-flux out runner axial flux switched reluctance motor and/or generator 1100, which includes a stator assembly 1102 that is positioned in between a first rotor assembly 1104 and a second rotor assembly 1104'. This is similar to the embodiment of the AFSRM shown in FIG. 30, but the zero gradient-flux out runner axial flux switched reluctance motor and/or generator 1100 has more salient stator poles.

Figure 35:
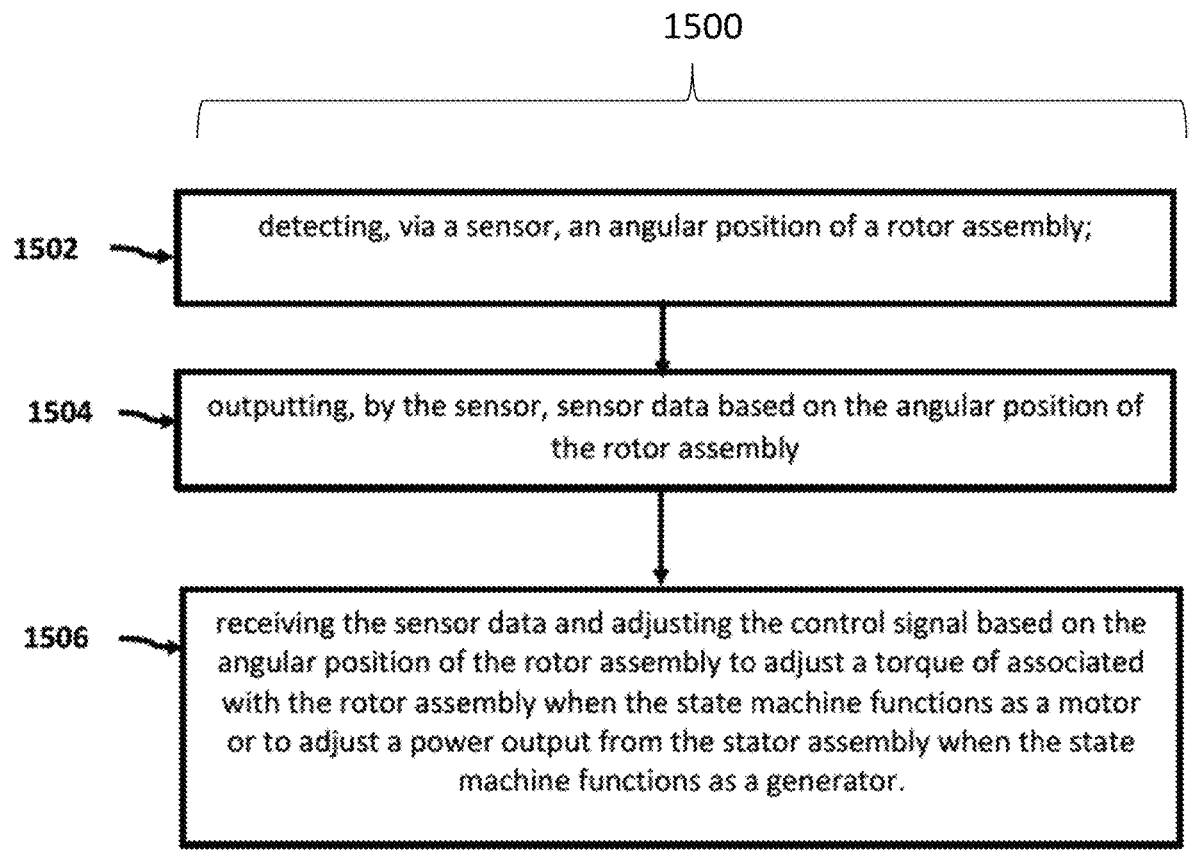
FIG. 35 is a flow diagram of a process for operating a switched reluctance motor, in accordance with at least some embodiments.

FIG. 35 shows a process 1500 for operating a reluctance motor. The process 1500 includes detecting, via a sensor such as sensor 106, an angular position of a rotor assembly such as, for example, rotor assembly 504 or 1204 (Step 1502). Outputting, by sensor 106, sensor data based on the angular position of the rotor assembly 504 or 1204 (Step 1504). Then, receiving the sensor data by a controller such as controller 102 and adjusting a control signal based on the angular position of the rotor assembly 504 or 1204 to adjust a torque of associated with the rotor assembly 504 or 1204 when the state machine 500 or 1200 functions as a motor or to adjust a power output from the stator assembly when the state machine functions as a generator (Step 1506).

It will be appreciated that the motor devices described herein can also be used as generators to generate electric power.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending on the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g., 63a, 63b, 63c, etc.). All elements with a common base number may be referred to collectively or generically using the base number without a suffix (e.g., 63).

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. An axial flux switched reluctance motor, comprising:
a stator comprising a front surface and an opposite facing rear surface, and a plurality of sidewalls that extend from the front surface to the rear surface;
the stator further comprising a plurality of salient stator poles positioned on the front surface, each one of the plurality of salient stator poles comprising:
a bobbin protruding out from the front surface in a direction along an axis of the bobbin that is substantially parallel to an axis of rotation of a rotor, the bobbin comprising a bobbin front surface that is substantially parallel to the front surface of the stator; and
a coil of electrically insulated wire wound around the bobbin;
the rotor comprising a front rotor surface and an opposite facing rear rotor surface, and further comprising a plurality of rotor poles, and
the rotor affixed to a shaft and configured to rotate about the axis of rotation that is aligned with the shaft,
wherein the rear rotor surface of each of the plurality of rotor poles is spaced apart from the bobbin front surface of each of the plurality of salient stator poles, to facilitate the rear rotor surface to rotate over the bobbin front surface and for magnetic flux to flow between the bobbin front surface of each of the plurality of salient stator poles and the rear rotor surface of each of the plurality of rotor poles,
wherein each of the plurality of salient stator poles comprises a stator protrusion extending radially from a center of the stator, the stator protrusion coplanar with the front surface and the rear surface of the stator, and each two neighboring stator protrusions are adjoined by a given sidewall from amongst the plurality of sidewalls, and each of the given sidewalls is a continuously concave curve that curves towards the center of the stator between the each two neighboring stator protrusions, and
wherein a magnetic flux path comprises: traveling along the axis of a first bobbin of a first stator pole from amongst the plurality of salient stator poles; traveling across the bobbin front surface of the first bobbin to the rear surface of a first rotor pole; traveling along the rotor to a second rotor pole that is oppositely positioned from the first rotor pole; traveling across the rear surface of the second rotor pole to the bobbin front surface of a second bobbin and along the axis of the second bobbin, and wherein the second bobbin is of a second stator pole that is oppositely positioned from the first stator pole; and traveling along the stator towards the first bobbin to complete a loop.

2. The axial flux switched reluctance motor of claim 1, wherein R1 is a radial distance between the center of the stator and an outermost edge of a given stator protrusion; R2 is a radial distance between the center of the stator and a middle point of any one of the given sidewalls, the middle point being a closest point along the continuously concave curve of the given sidewall to the center of that stator; and 0.6R1<R2<0.9R1.

3. The axial flux switched reluctance motor of claim 2, wherein R2 is substantially 0.7R1.

4. The axial flux switched reluctance motor of claim 1, wherein a middle point of each of the given sidewalls is a closest point along the continuously concave curve of the given sidewall to the center of the stator, and the middle point is in a region that is circumferentially between the bobbins that are positioned on the each two neighboring stator protrusions.

5. The axial flux switched reluctance motor of claim 4, wherein the each of the given sidewalls has a parabolic profile.

6. The axial flux switched reluctance motor of claim 1, wherein the stator comprises six salient stator poles and four rotor poles; the axial flux switched reluctance motor is configured to operate as a three-phase type; and each phase comprises electrically energizing a pair of diametrically positioned salient stator poles.

7. The axial flux switched reluctance motor of claim 1, wherein the stator comprises more than six salient stator poles and more than four rotor poles.

8. The axial flux switched reluctance motor of claim 1, wherein the coil around the first bobbin and the coil around the second bobbin are both simultaneously electrically energized; a first current direction is clockwise or counterclockwise and is substantially normal to the axis of rotation; and a second current direction is opposite to the first current direction and substantially normal to the axis of rotation.

9. The axial flux switched reluctance motor of claim 1, wherein the bobbin has an obround profile shape with a major dimension and a minor dimension, and the major dimension extends radially from the center of the stator.

10. The axial flux switched reluctance motor of claim 9, wherein the bobbin has an elliptical profile shape.

11. The axial flux switched reluctance motor of claim 1, wherein the stator and the rotor each do not include a rare earth magnet.

12. The axial flux switched reluctance motor of claim 1, further comprising a second stator and a second rotor, and the shaft passes through a center of the second stator and a center of the second rotor, wherein the second stator has a same configuration as the stator and the second rotor has a same configuration as the rotor.

13. The axial flux switched reluctance motor of claim 12, wherein the rotor and the second rotor are arranged in an out-runner configuration.

14. The axial flux switched reluctance motor of claim 12, wherein a rear surface of the second stator faces the rear surface of the stator, and a front surface of the second stator faces the second rotor.

15. The axial flux switched reluctance motor of claim 1, further comprising a control circuit configured to control electrically energizing one or more coils in the stator, and, for each phase of the axial flux switched reluctance motor, the control circuit comprising: two semiconductor power switches control current flow into the given phase and two freewheeling diodes to allow back-EMF to return to a power supply or a bypass capacitor, or both.

16. The axial flux switched reluctance motor of claim 1 configured to operate as a motor-generator to additionally generate electrical power by when the rotor shaft is attached to a prime mover.

17. A control circuit for the axial flux switched reluctance motor of claim 1, comprising:
a pulsed timing and trigger control circuit that comprises a plurality of transformers electrically respectively connected to the plurality of phases of the axial flux switched reluctance motor; and a plurality of electrical switches connected to the plurality of transformers to pulse electrical power to the axial flux switched reluctance motor; and a processor to control the electrical switches.

18. The control circuit of claim 17, further comprising a plurality of position sensors for respectively monitoring the plurality of phases, and the plurality of position sensors are electrically connected to the processor.

19. A control circuit for the axial flux switched reluctance motor of claim 1, comprising:
a pulsed timing and trigger control circuit that comprises a plurality of capacitors respectively electrically connected to the plurality of phases of the axial flux switched reluctance motor; and a plurality of electrical switches connected to the plurality of capacitors to pulse electrical power to the axial flux switched reluctance motor; and a processor to control the electrical switches.

20. The control circuit of claim 19, further comprising a plurality of position sensors for respectively monitoring the plurality of phases, and the plurality of position sensors are electrically connected to the processor.

21. An axial flux switched reluctance generator, comprising:
a stator comprising a front surface and an opposite facing rear surface, and a plurality of sidewalls that extend from the front surface to the rear surface;
the stator further comprising a plurality of salient stator poles positioned on the front surface, each one of the plurality of salient stator poles comprising:
a bobbin protruding out from the front surface in a direction along an axis of the bobbin that is perpendicular to the front surface, the bobbin comprising a bobbin front surface that is substantially parallel to the front surface of the stator;
a coil of electrically insulated wire wound around the bobbin; and
a rotor comprising a front rotor surface and an opposite facing rear rotor surface, and further comprising a plurality of rotor poles, the rotor affixed to a shaft and configured to rotate about an axis of rotation that is aligned with the shaft,
wherein the rear rotor surface of each of the plurality of rotor poles is spaced apart from the bobbin front surface of each of the plurality of salient stator poles, to facilitate the rear rotor surface to rotate over the bobbin front surface,
wherein each of the plurality of salient stator poles comprises a stator protrusion extending radially from a center of the stator, the stator protrusion coplanar with the front surface and the rear surface of the stator, and each two neighboring stator protrusions are adjoined by a given sidewall from amongst the plurality of sidewalls, and each of the given sidewalls is a continuously concave curve that curves towards the center of the stator between the each two neighboring stator protrusions, and
wherein a magnetic flux path comprises: traveling along the axis of a first bobbin of a first stator pole from amongst the plurality of salient stator poles; traveling across the bobbin front surface of the first bobbin to the rear surface of a first rotor pole; traveling along the rotor to a second rotor pole that is oppositely positioned from the first rotor pole; traveling across the rear surface of the second rotor pole to the bobbin front surface of a second bobbin and along the axis of the second bobbin, and wherein the second bobbin is of a second stator pole that is oppositely positioned from the first stator pole; and traveling along the stator towards the first bobbin to complete a loop.

22. The axial flux switched reluctance generator of claim 21, wherein the stator and the rotor each do not include a rare earth magnet.

23. The axial flux switched reluctance generator of claim 21, wherein R1 is a radial distance between the center of the stator and an outermost edge of a given stator protrusion; R2 is a radial distance between the center of the stator and a middle point of any one of the given sidewalls, the middle point being a closest point along the continuously concave curve of the given sidewall to the center of that stator; and $0.6R1 < R2 < 0.9R1$.

24. The axial flux switched reluctance generator of claim 23, wherein R2 is substantially 0.7R1.

25. The axial flux switched reluctance generator of claim 21, wherein a middle point of each of the given sidewalls is a closest point along the continuously concave curve of the given sidewall to the center of the stator, and the middle point is in a region that is circumferentially between the bobbins that are positioned on the each two neighboring stator protrusions.

* * * * *